US007783668B2

(12) United States Patent
Vogel et al.

(10) Patent No.: US 7,783,668 B2
(45) Date of Patent: Aug. 24, 2010

(54) SEARCH SYSTEM AND METHOD

(75) Inventors: Claude Vogel, Palm Desert, CA (US); Paul Gardner, Jr., Escondido, CA (US); Eric Germundson, Carlsbad, CA (US); Joshua Michael Powers, Reston, VA (US); Joel Wayne Robertson, Vista, CA (US); Jon Michael Van Winkle, Carlsbad, CA (US)

(73) Assignee: Convera Corporation, Vienna, VA (US)

( * ) Notice: Subject to any disclaimer, the term of this patent is extended or adjusted under 35 U.S.C. 154(b) by 339 days.

(21) Appl. No.: 12/015,162

(22) Filed: Jan. 16, 2008

(65) Prior Publication Data

US 2008/0133585 A1 Jun. 5, 2008

Related U.S. Application Data

(62) Division of application No. 11/212,523, filed on Aug. 26, 2005, now Pat. No. 7,668,825.

(51) Int. Cl.
*G06F 17/30* (2006.01)

(52) U.S. Cl. ........................ 707/791; 707/696; 707/777

(58) Field of Classification Search ................. 707/1–4, 707/6, 100, 101, 102, 104.1, 673, 696, 713, 707/715, 741, 777
See application file for complete search history.

(56) References Cited

U.S. PATENT DOCUMENTS

| | | | |
|---|---|---|---|
| 7,076,484 | B2 | 7/2006 | Dworkis et al. |
| 2001/0021934 | A1 | 9/2001 | Yokoi |
| 2002/0147578 | A1 | 10/2002 | O'Neil et al. |
| 2005/0091200 | A1 | 4/2005 | Melton et al. |
| 2006/0047632 | A1 | 3/2006 | Zhang |

OTHER PUBLICATIONS

PCT/US06/33222, International Search Report, Jun. 24, 2008.
PCT/US06/33222, Written Opinion, Jun. 24, 2008.

*Primary Examiner*—Cam-Linh Nguyen
(74) *Attorney, Agent, or Firm*—DLA Piper LLP US

(57) ABSTRACT

A search system and method are provided that uses taxonomies, entities, facets, and ontologies to provide a user with a more comprehensive set of search results in response to a query. The search system has an indexing engine that performs one or more indexing steps that permit the search engine to return a comprehensive set of search results. For example, the indexing engine may index a document according to a set of synsets so that the search engine may use the synsets, during retrieval of results to a query, to return a more comprehensive set of search results.

28 Claims, 52 Drawing Sheets

PGARDNER@BONES:/HOME/PGARDNER/AW/SHRD

```
20041008-14:20:50 BFSOPEN  "BFS://BFS/QCT/ELECTION/STATE.QCT" READ
20041008-14:20:50 BFSCLOSE  "QCT/ELECTION/STATE.QCT" READ.
20041008-14:20:50 BFSOPEN  "BFS://BFS/QCT/ELECTION/NEWSPAPERS.QCT" READ.
20041008-14:20:50 BFSCLOSE  "QCT/ELECTION/NEWSPAPERS.QCT" READ.
20041008-14:20:50 BFSOPEN  "BFS://BFS/QCT/ELECTION/TITLE.QCT" READ.
20041008-14:20:50 BFSCLOSE  "QCT/ELECTION/TITLE.QCT" READ.
20041008-14:20:50 BFSOPEN  "BFS://BFS/QCT/ELECTION/FIRSTNAME.QCT" READ.
20041008-14:20:50 BFSCLOSE  "QCT/ELECTION/FIRSTNAME.QCT" READ.
20041008-14:20:51 BFSOPEN  "BFS://BFS/QCT/ELECTION/LASTNAME.QCT" READ.
20041008-14:20:51 BFSCLOSE  "QCT/ELECTION/LASTNAME.QCT" READ.
20041008-14:20:56 BFSOPEN  "BFS://BFS/TARULES/EERULES.XML" READ
20041008-14:20:56 BFSCLOSE  "TARULES/EERULES.XML" READ.
20041008-14:20:56 BFSOPEN  "BFS://BFS/TARULES/EFACETS1.XML" READ.
20041008-14:20:56 BFSCLOSE  "TARULES/EFACETS1.XML" READ.
FATAL ERROR:  EXPECTED END OF TAG "AND" AT LINE: 117
20041008-14:20:56 KSEIX=290835 OFFSET=2326680
20041008-14:20:56 VECOFFSET=22997300 RDSZ=839
20041008-14:20:56 38167 DOCS
30 COLOCATIONS FOR "SADDAM", 4218 OCC
  0.024 "WEAPONS OF MASS DESTRUCTION" (S:ELECTION_ISSUES.UID395), 1522 OCC
  0.020 "IRAQ" (S:GEO_CN.SET_254), 23054 OCC
  0.018 "IRAQ WAR" (S:ELECTION_ISSUES.UID384), 3186 OCC
  0.018 "WAR" (S:ELECTION_ISSUES.UID287709), 3497 OCC
  0.015 "DICTATORSHIP" (S:ELECTION_ISSUES.UID125), 687 OCC
  0.011 "CONFLICT" (S:ELECTION_ISSUES.UID287680), 15837 OCC
  0.010 "RECOGNIZED NATION" (S:GEO_CN.UID1581), 126208 OCC
  0.008 "GEO_CN" (S:GEO_CN.SET_1), 206066 OCC
  0.008 "EPL:ANTLE", 5 OCC
  0.007 "ELECTION_ISSUES" (S:ELECTION_ISSUES.UID0), 322512 OCC
  0.006 "BAATHISM" (S:ELECTION_ISSUES.UID394), 32 OCC
  0.006 "EPL:AKERMAN", 1 OCC
  0.006 "KUWAIT" (S:GEO_CN.SET_261), 442 OCC
  0.006 "BAGHDAD" (S:GEO_CN.SET_255), 1821 OCC
  0.005 "EPL:GURWITZ", 3 OCC
  0.004 "POLITICAL SYSTEM" (S:ELECTION_ISSUES.UID111), 10721 OCC
  0.004 "INTERNATIONAL RELATIONS" (S:ELECTION_ISSUES.UID281923), 70069 OCC
  0.004 "WORLD HEALTH ORGANIZATION" (S:ELECTION_ISSUES.UID281939), 58011 OCC
  0.004 "INTERNATIONAL POLITICAL ORGANIZATION" (S:ELECTION_ISSUES.UID281929), 62629 OCC
  0.004 "ARKANSAS" (S:STATE.SET_UID4242), 124432 OCC
  0.004 "EPL:MANIA", 3 OCC
  0.004 "EPL:TARANTO", 47 OCC
  0.003 "W. JAMES ANTLE III" (S:EKNOWNENTITIES.SET_UID284158), 3 OCC
  0.003 "STATE_NAMES" (S:SSTATE.SET_UID4238), 188458 OCC
  0.003 "EPL:GLASPIE", 7 OCC
  0.003 "EPL:OLD", 21 OCC
  0.003 "JIM HOAGLAND" (S:EKNOWNENTITIES.SET_UID283756), 15 OCC
  0.003 "EPL:ILL", 4 OCC
  0.003 "REBELLION" (S:ELECTION_ISSUES.UID287700), 1056 OCC
  0.003 "EPL:BAIO", 5 OCC
20041008-14:20:56 SHARD WAITING FOR QUERY ON: BFS://BFS/PGARCRAP/S0
20041008-14:20:56 SENT 0 OF 0 HITS, 208
20041008-14:20:56 MEMORY DURING QUERY: 124.0MB
20041008-14:20:56 SHARDSERVER WAITING FOR NEXT QUERY
```

FIG. 13
EXCALIBUR SEARCH: S:CVC.000FN - MICROSOFT INTERNET EXPLORER
File Edit View Favorites Tools Help
Back
RESULTS 1-10 OF 40440 FOR CAT:BALLOT PROPOSITION (0.164 SECONDS)
REFERENDUM - WIKIPEDIA, THE FREE ENCYCLOPEDIA (DOCID : 33171249684O)
RANK : 208/154 93B2556A52ADC77A)
...REFERENDUM - WIKIPEDIA, THE FREE ENCYCLOPEDIA. REFERENDUM. FROM WIKIPEDIA...REFERENDA
BOLIVIAN GAS REFERENDUM, 2004. CARINTHIAN PLEBISCITE, 1920. CYPRUS REUNIFICATION REFERENDUM,
2004 NORWEGIAN EU REFERENDUM,...
EN. WIKIPEDIA.ORG/WIKI/REFERENDUM - 34.2KB - OCT 21, 2004 - - CACHED - ANALYZE - ENTITIES - SYNSETS -
BOXES
BRITISH REFERENDUM ON A EUROPEAN CONSTITUTION (DOCID : 19800718208
RANK : 194/130 194A9748512CAAB3)
...BRITISH REFERENDUM ON A EUROPEAN CONSTITUTION, PART 1 OF 2. FROM...,A REFERENDUM MAY
ONLY BE HELD IF THE PROPOSED CHANGE IS THOUGHT TO BE IRREVERSIBLE? A REFERENDUM MAY...
WWW.INREF.ORG/BRITISHEUREFERENDUM1.HTML - 94.3KB - AUG 16, 2003 - - CACHED - ANALYZE - ENTITIES -
SYNSETS - BOXES
REFERENDUM 51 - THE OLYMPIAN (DOCID : 436438032424 RANK : 189/135
B52A0362CCD21F6)
...REFERENDUM 51 - THE OLYMPIAN. NEWS. REFERENDUM 51. FRIDAY, NOVEMBER 15, 2002 DOT
BOSS HAS BLEAK FORECAST. OLYMPIA...
WWW.THEOLYMPIAN.COM/HOME/SPECIALSECTIONS/REFERENDUM51/ - 82.7KB - OCT 27, 2004 - - CACHED -
ANALYZE - ENTITIES - SYNSETS - BOXES
REFERENDA (DOCID : 100816181656 RANK : 181/139 A59A153255184684)
...REFERENDA. INNOVATIONS IN DEMOCRACY. REFERENDA. RETURN TO INNOVATIONS INDEX. REFERENDUM.
(PLURAL: REFERENDA). & THE SUBMISSION OF...
DEMOCRACYINNOVATIONS.ORG/REFERENDA1.HTML - 25.3KB - NOV 30, 2001 - - CACHED - ANALYZE - ENTITIES -
SYNSETS - BOXES
THE RECALL REFERENDUM IN VENEZUELA (DOCID : 73216760032 RANK : 180/129
AFCAB52A4F25A35A)
...THE RECALL REFERENDUM TO VENEZUELA. THE RECALL REFERENDUM IN VENEZUELA. A CRUSHING BLOW TO THE
COUNTERREOLUTION. BY ALAN WOODS. AT...
WWW.MARXIST.COM/LATINAM/RECALL REFERENDUM VENEZUELA.HYML - 24.5KB - OCT 12, 2004 - - CACHED -
ANALYZE - ENTITIES - SYNSETS - BOXES
DONE
INTERNET

GEOPOLITICS:
+EVENTS:
+TIMELINE:
+POLITICS:
+CONFLICT:
+ECONOMY/MARKETS:
+FINANCIAL/
[SUBTITLE:]
+POLICY
[SUBTITLE:]
+BUSINESS AND COMMERCIAL:
+HISTORY:
+SOCIETY AND CULTURE:
+REFERENCES / BIBLIOGRAPHY:
+HEALTH:
+MILITARY OPERATIONS:

FIG. 18A

MILITARY:

+NEWS
+MAPS:
+WEATHER:
+MILITARY OPERATIONS:
+EXPERTS:
+SECURITY / THREATS:
+CONFLICT:

FIG. 18B

LOGISTICS:
+NEWS:
+INFRASTRUCTURE:
+COMMUNICATIONS AND TRANSPORTATION:
+SECURITY / THREATS:
+EXPERTS:
+PROJECTS:
+HEALTH:
+FINANCIAL/
[SUBTITLE:]
+POLICY

FIG. 18C

```
<entityvector>
  <cartridge id="Entities">
    <entity id="http://www.msnbc.com/m/c/sh/s.asp?0bb=-13">
      <category id="URL"/>
      <offset paragraph="73" position+"7450"/>
  </entity>
  <entity id="Secretary Rodney Slater">
      <category id="Person"/>
      <offset paragraph="38" position="5194" words="3"/>
  </entity>
  <entity id="Masatoshi Ono">
    <category id="Person"/>
    <offset paragraph="37" position="5081" words="2"/>
  </entity>
   ...
```

FIG. 20
File Edit View Favorites Tools Help
Back Forward Reload Stop
SEARCH
PRINT
TOP UP FIRST PREVIOUS NEXT LAST DOCUMENT MORE
HOME SITEGUIDE CONTACT US SET AS HOME PAGE ADD TO FAVORITES
ALJAZEERA.NET
SEARCH ALJAZEERA
GO
ADVANCD SEARCH
HOMEPAGE
NEWS
ECONOMY
CULTURE
SCI-TECH
SPECIAL REPORTS
WEATHER
POLLS
YOUR FEEDBACK
CONTACT US
ABOUT ALJAZEERA
FREQUENCIES
ALJAZEERA MOBILE
NEWS ALERTS
E-MARKETING
NEWS GLOBAL
PROFILE: JOHN EDWARDS
BY SHAHEEN CHUGHTAL
FRIDAY 13 AUGUST 2004, 23:02 MAKKA TIME, 20:02 GMT
A MAN WHO ROSE FROM HUMBLE ORIGINS TO BECOME A RENOWNED MILLIONAIRE LAWYER, JOHN EDWARDS HAS OFTEN BEEN TOUTED AS A FUTURE US PRESIDENT.
HISTORY IS ON EDWARDS' SIDE. IN THE PAST 40 YEARS, EVERY DEMOCRATIC PRESIDENT HAS BEEN A SOUTHERNER, FROM LYNDON JOHNSON TO BILL CLINTON.
THE NORTH CAROLINA SENATOR IS SEEN AS A GOOD-LOOKING POPULIST WHO OOZES SOUTHERN CHARM AND PAINTS HIMSELF AS A "CHAMPION FOR REGULAR PEOPLE EVERY SINGLE DAY".
THE SON OF A MILL WORKER, EDWARDS HAS MADE MUCH OF THE RAGS-TO-RICHES STORY OF HIS LIFE. THIS ONLY PARTIALLY DISGUISES THE FACT THAT THE STORY OF HIS POLITICAL LIFE IS UNUSUALLY SHORT.
BUT THOUGH HIS DEMOCRAT CENTRIST APPROACH AND PRO-WORKER TENDENCIES GIVES HIM BROAD APPEAL, OTHERS SAY HE IS TOO INEXPERIENCED - ESPECIALLY ON MATTERS SUCH AS DEFENCE AND FOREIGN POLICY.
THE PERCEPTION HELPED END HIS OTHERWISE RESPECTABLE CAMPAIGN TO WIN THE DEMOCRAT PRESIDENTIAL NOMINATION. BUT HIS POPULIST CHARM WAS RECOGNISED WITH HIS SELECTION AS JOHN KERRY'S RUNNING MATE.
SUCCESSFUL LAWYER
JOHN REID EDWARDS WAS BORN ON 10 JUNE 1953 IN SOUTH CAROLINA TO A WORKING CLASS FAMILY, BUT WAS RAISED IN NORTH CAROLINA. HE GRADUATED WITH A LAW DEGREE FROM THE UNIVERSITY OF NORTH CAROLINA IN 1977 AND WENT ON TO MAKE MILLIONS AS A PERSONAL INJURY LAWYER.
THE NORTH CAROLINA SENATOR ONLY ENTERED POLITICS IN 1998
RELATED
RELATED:
HOW TO BECOME US PRESIDENT
PROFILE: JOHN KERRY
US ELECTIONS: THE CANDIDATES
TOOLS:
EMAIL ARTICLE
PRINT ARTICLE
SEND YOUR FEEDBACK

FIG. 21
EXCALIBUR SEARCH: S:S:KEC.007N8 - MICROSOFT INTERNET EXPLORER
File Edit View Favorites Tools Help
Back
RESULTS 1-10 OF 3163277 for cat 4300 PRESIDENT (2,274).
GEORGE W. BUSH (DOCID : 7612708104 RANK: 244/139 AA5A9B3A559DA6C8)
...GEORGE W. BUSH, ROTTEN, & LIBRARY &. BIOGRAPHIES. &. PRESIDENTS. & GEORGE W BUSH.
GEORGE W. BUSH. IN THE...
WWW.ROTTEN.COM/LIBRARY/BIO/PRESIDENTS/GEORGE-W-BUSH/ - 75.2KB - OCT 12, 2004 - CACHED - ANALYZE
ENTITIES - SYNSETS - BOXES
GEORGE W (DOC ID : 283314067728 RANK: 243/141 A1B2B7AA56A028D2)
...GEORGE BUSH, NEW YORK TIMES, NEWSPAPERS, 2004 ELECTION. GEORGE W. GEORGE W. BUSH.
RAGING LADY. HOME...
WWW.RAGINGLADY.COM/GEORGE_W.HTM - 30.8KB - OCT 3, 2004 - CACHED - ANALYZE - ENTITIES - SYNSETS -
BOXES
ENCYCLOPEDIA: GEORGE W. BUSH (DOCID : 39039614632 RANK: 224/144 ED1A93AA46A8806A)
.. ENCYCLOPEDIA: GEORGE W. BUSH. SUPPORTER BENEFITS. SIGNUP. LOGIN. SOURCES. HOME...: ...
(MAINARTICLE). FOREIGN POLICY OF THE GEORGE W. BUSH ADMINISTRATION.)). GEORGE W. BUSH FLANKED...
WWW.NATIONMASTER.COM/ENCYCLOPEDIA/GEORGE-W.-BUSH - 83.4KB - OCT 25, 2004 - CACHED - ANALYZE -
ENTITIES - SYNSETS - BOXES
GEORGE W. BUSH (DOCID : 34521224080 RANK: 220/140 2E9233A2572F652A)
.. GEORGE W. BUSH. ABACCIPEDIA. GEORGE W. BUSH. ABACCI. &. ABACCIPEDIA. &. GE. & GEORGE W. BUSH.'..
WWW.ABACCI.COM/WIKIPEDIA/TOPIC.ASPX?CUR_TITLE=GEROGE_W._BUSH... - 107.3KB - OCT.25 2004
- CACHED - ANALYZE - ENTITIES - SYNSETS - BOXES
JIM NEILSON: "FERTILIZING BUSH" (DOCID : 374303006788 RANK: 218/145
A94EA01A572EA5E4)
.. JIM NEILSON: &FERTILIZING BUSHS. FERTILIZING BUSH: GROWING A GREAT LEADER FOR DIFFICULT TIMES.
JIM NEILSON. 1. GEORGE W. BUSH...
WWW.ESERVER.ORG/CLOGIC/2004/NEILSON.HTML - 47.0KB - OCT 28, 2004 - CACHED - ANALYZE - ENTITIES -
SYNSETS - BOXES
DONE
INTERNET

FIG. 23
EXCALIBUR SEARCH: $:GEOCN.0000D - MICROSOFT INTERNET EXPLORER
File Edit View Favorites Tools Help
Back
RESULTS 1-10 OF 37151 FOR CAT:BAHRAIN (0.451 SECONDS)
BAHRAIN TRAVEL, BAHRAIN HOLIDAYS, BAHRAIN TOURISM, BAHRAIN TOURS, BAHRAIN MAPS, BAHRAIN HO..., (DOCID : 82658709488 RANK : 203/146 554A99569D33A255)
...BAHRAIN TRAVEL, BAHRAIN HOLIDAYS, BAHRAIN TOURISM, BAHRAIN TOURS, BAHRAIN MAPS, BAHRAIN HOTELS, MANAMA BAHRAIN, BAHRAIN UNIVERSITY...
WWW.BUDGETTRAVEL.COM/BAHRAIN.HTM - 37.0KB - OCT 25, 2004 - CACHED - ANALYZE - ENTITIES - SYNSETS - BOXES
BAHRAIN MATCHES (DOCID : 213736822160 RANK : 181/132 2A06D922A4A4A983)
...BAHRAIN MATCHES. WORLD CUP 2006. (PART OF THE. GREENE... ...BAHRAIN 1 - 2. 13-OCT-2004. SYRIA V. BAHRAIN. 17-NOV-2004. BAHRAIN. V. ..
WWW.EIFL.ORG.UK/WC2006/ZBAHRAIN.HTM - 11.0KB - SEP 9, 2004 - CACHED - ANALYZE - ENTITIES - SYNSETS - BOXES
BAHRAIN (DOCID : 220000557016 RANK : 173/132 AD32A482AE2D3656)
...BAHRAIN. (COUNTRY LISTING). (FACTBOOK. HOME PAGE). BAHRAIN. BAHRAIN. GEOGRAPHY. (TOP OF PAGE). LOCATION:...
WWW.UMSL.EDU/SERVICES/GOVDOCS/WOFACT98/24.HTM - 15.4KB - FEB 22, 1999 - CACHED - ANALYZE - ENTITIES - SYNSETS - BOXES
BAHRAIN (08/04) (DOCID : 258101656048 RANK : 171/150 835A32B2D75B3634)
...BAHRAIN (08/04). (PRINT FRIENDLY VERSION... ...BUREAU OF NEAR EASTERN AFFAIRS. AUGUST 2004. BACKGROUND NOTE: BAHRAIN. PROFILE. OFFICIAL NAME:. KINGDOM OF BAHRAIN. (...
WWW.STATE.GOV/R/PA/EI/BGN/26414.HTM - 52.2KB - OCT 25, 2004 - CACHED - ANALYZE - ENTITIES - SYNSETS - BOXES
BAHRAIN - WIKIPEDIA, THE FREE ENCYCLOPEDIA (DOCID : 8774577122 4 RANK : 152/147 3B3A93A2B2BAA6B6)
.. BAHRAIN - WIKIPEDIA, THE FREE ENCYCLOPEDIA. BAHRAIN. FROM WIKIPEDIA.....TRANSPORTATION IN BAHRAIN. MILITARY OF BAHRAIN. FOREIGN RELATIONS OF BAHRAIN. BAHRAIN INTERNATIONAL AIRPORT. LIST OF CITIES IN BAHRAIN. (...
EN.WIKIPEDIA.ORG/WIKI/BAHRAIN - 34.9KB - OCT 25, 2004 - CACHED - ANALYZE - ENTITIES - SYNSETS - BOXES
DONE
INTERNET

FIG. 25
EXCALIBUR SEARCH: S:SEOCN.0000T - MICROSOFT INTERNET EXPLORER
File Edit View Favorites Tools Help
Back
RESULTS 1-10 OF 128368 FOR CAT.ATHENS (0.345 SECONDS)
ATHENS OLYMPICS (DOCID : 2393725D1856 RANK : 202/122 0546072625258534)
...ATHENS OLYMPICS. SITE HOSTED BY. ESSEX VOLLEYBALL ASSOCIATION. (.U.P.L ATHENS OLYMPICS. THIS SECTION HAS THE FIVE PRESS RELEASES...
WWW.VOLLEYBALL.CO.UK/ESSEX/COMPETITIONS/ATHENS.HTM - 47.5KB - SEP 14, 2004 - CACHED - ANALYZE - ENTITIES - SYNSETS - BOXES
INVGR/ATHENS 2004 OLYMPIC AND PARALYMPIC GAMES - JEUX OLYMPIQUES - GREECE
(DOCID : 3546150304 RANK : 198/135 AA2D093232AD93541
...INV GR / ATHENS 2004 OLYMPIC AND PARALYMPIC GAMES - JEUX OLYMPIQUES -... ...WORLD IN ATHENS 2004.. ATHENS 2004 LAUNCH PAD. ATHENS 2004 OLYMPIC AND PARALYMPIC GAMES LAUNCH PAD. ATHENS 2004...
WWW.INVGR.COM/OLYMPICS.HTM - 81.2KB - SEP 25, 2004 - CACHED - ANALYZE - ENTITIES - SYNSETS - BOXES
ENCYCLOPEDIA: ATHENS (DOCID : 24140212152D RANK 188/140 A16A182A54B065A9)
...ENCYCLOPEDIA: ATHENS. SUPPORTER BENEFITS. SIGNUP. LOGIN. SOURCES. HOME. REVIEWS. ABOUT. QUESTIONS... ...CIVILIZATION. ATHENS METRO. SEE ALSO. CITIES NICKNAMED. ATHENS :. ATHENS OF THE EAST -. MADURAI, INDIA. ATHENS OF...
WWW.NATIONMASTER.COM/ENCYCLOPEDIA/ATHENS - 33.0KB - OCT 28, 2004 - CACHED - ANALYZE - ENTITIES - SYNSETS - BOXES
ATHENS (DOCID : 385650324456 RANK : 184/141 AB6286B2A5593488)
...ATHENS. ABACCIPEDIA. ATHENS. ABACCI. &. ABACCIPEDIA. &. AT. & ATHENS. THIS ARTICLE IS ABOUT ATHENS, A MODERN CITY OF...
WWW.ABACCI.COM/WIKIPEDIA/TOPIC.ASPX?CUR_TITLE=ATHENS - 22.0KB - OCT 28, 2004 - CACHED - ANALYZE - ENTITIES - SYNSETS - BOXES
FEATURES. ATHENS OLYMPICS 2004. ABC SPORT (DOCID : 67044499729 RANK : 181/133 B52015273520B5A4)
...FEATURES. ATHENS OLYMPICS 2004. ABC SPORT.. SKIP NAVIGATION. ATHENS OLYMPICS 2004. ABC SPORT.. HOME. FEATURES. ...
DONE
INTERNET

FIG. 38
MICROSOFT INTERNET EXPLORER
File Edit View Favorites Tools Help
Back
ADDRESS
INTERNET

1. dog
2. dog cat
3. dog OR cat
4. dog AND NOT cat
5. dog AND (cat OR mouse)
6. (german AND shepherd) AND NOT (siamese OR cat)
7. ((german AND shepherd) AND NOT (siamese OR cat)) AND d:org
   "AND" is impicit so it could also be sent as:
   ((german AND shepherd) AND NOT (siamese OR cat)) d:org
1. ((german AND shepherd) AND NOT (siamese OR cat)) AND NOT d:pets.com

FIG.44

SEARCH SYSTEM AND METHOD

PRIORITY CLAIM/RELATED APPLICATIONS

This application is a Divisional claiming priority under 35 USC 120 to U.S. patent application Ser. No. 11/212,523 filed on Aug. 26, 2005, which is incorporated herein by reference.

FIELD OF THE INVENTION

The invention relates generally to a search system and method and in particular to a computer-implemented data search system.

BACKGROUND OF THE INVENTION

The explosive growth of the Internet and email has lead to the explosive growth of the amount of data available. This tremendous amount of data has led to the need to have a tool for classifying, analyzing and organizing the available information as the massive amount of raw information is not meaningful. There are many tools for organizing the information as well as tools for searching through that information. There are many different well known search tools and search engines, such as the very popular Google search engine (www.google.com/). There are also tools designed to permit the user to understand the data collected during the search. Some of the existing tools are textual. For example, a typical search engine might provide search results in a textual form. Alternatively, some tools provide a visual display (and clustering) of the data collected during a search/mining operation. For example, U.S. Pat. No. 5,963,965 describes a system in which the text in a corpus of documents and the relationships between the various words in the corpus of documents is displayed visually in a map-type structure. The map structure permits the user to identify words that appear more often in the corpus of documents. The map also permits the user to drill down through the map structure and, at the lowest level, look at the actual documents that are associated, for example, with a particular word.

Most conventional search engines do not provide an "authoritative search" when a query is entered into the system. In particular, most conventional search engines, such as Google, generate results for a search but do not attempt to apply further processing to understand the data being retrieved or use that further processing to assist with an understanding of the data. The search engine will match the query against an index and return documents that match one or more of the query terms. Typically, the results are organized according to relevance so that the most relevant document, such as the one with the most terms that match the query terms, is presented before the less relevant documents. However, the search engine does not attempt to further analyze the results. The problem with such an approach to search is best illustrated with an example. Assume that a user is looking for documents about John Adams (the composer) and enters the query "John Adams" into the search engine. The search results will likely include documents that contain the words ("John" and "Adams"), but are not actually about the composer entity. Thus, it is desirable to provide a search engine that performs additional processing, to provide a more authoritative search to the user such as the identification and disambiguation of specific named entities.

In addition, most conventional search engines do not consolidate or index content from heterogeneous sources. Nor do these search engines present results that are then ranked according to the relevance of the content from the heterogeneous sources. For example, most conventional search engines do not blend the results of a web-based search with the results of an intranet search so that the results of the user's search include both content from the web that meets the query criteria and content from the intranet that meets the query criteria. It is desirable to provide a search engine that provides this "blending" of content from the heterogeneous sources.

It is also desirable that a search engine provides additional features including a long term archive of search queries and results, vertical content that may be provided with semantic indexing, localization of search results, multimedia display of the search results, mining tools and personalization of the search experience for the user. Thus, it is desirable to provide a search system and method that overcomes the limitations of the conventional systems and provides the desirable features set forth above and it is to this end that the present invention is directed.

SUMMARY OF THE INVENTION

The search system and method in accordance with the invention, in a preferred embodiment, is implemented as one or more pieces of software executed by a computer system that provides search results to a user. The search engine provides authoritative search results in which sophisticated functionalities are applied to the indexing operations using semantics, taxonomies and ontologies to understand the Web and thus deliver better search results to the user in response to a query. In particular, the system can eliminate noise (the unwanted search results typically provided by a typical search engine), identify experts in a particular area of content and utilize proprietary content sources. The system, using such sophisticated functionalities, has an understanding of the content in multiple languages. Further, the system may analyze format, genre, entities and facets (both static and dynamic) from the content, and use semantic analysis to determine the meaning of the content. The system may also use taxonomies and ontologies to categorize the content.

In a preferred embodiment, the system may be implemented as an unbranded service that provides intranet and web searching to a corporate entity. The actual search system could be co-located at Tier 1 co-location facilities, and could provide results to an employee of the corporate entity over the web. In accordance with the invention, the search system provides results that are synergistic with proprietary content in that web results can be blended with Intranet results. For example, system may blend internal content, external content, proprietary content and web content together. Furthermore, paid listings could be displayed in context with the content and each facet (as described below in more detail) is one channel to information to the user. The system may also provide a long term archive (known as "Never Lost" links) and vertical content due to the semantic indexing performed by the system. The search system may also provide localization of the search results and the multimedia display of the search results, which is known as video indexing. The system may also provide analytic tools for mining and personalization using profiles. The system may include personalized results including profiles and alerts and results localized to user proximity.

Thus, in accordance with the invention, a search system for a corpus of pieces of content is provided. The system includes a computer system having one or more software pieces each having a plurality of lines of computer instructions wherein the computer instructions are executed by the computer system. The pieces of software of the system may include an index engine and a query engine. The index engine may index each piece of content in the corpus to generate one or more indexes for each piece of content and the index engine may include a synset assignment engine that assigns a synset to each piece of content based on a term contained in the piece of content wherein the synset contains a group of words having similar meaning to the term contained in the piece of content. The query engine may retrieve a set of pieces of content in response to a query. The query engine may include a synset expansion engine that expands the query based on a particular synset associated with a query term which retrieves pieces of content from the corpus having the any of the group of words contained in the synset.

In accordance with another aspect of the invention, a computer implemented method for searching a corpus of pieces of content is provided. In the method, each piece of content in the corpus is indexed to generate one or more indexes for each piece of content to generate a set of indexed pieces of content. In addition, a synset is assigned to each piece of content based on a term contained in the piece of content wherein the synset contains a group of words having similar meaning to the term contained in the piece of content. In addition, the indexed pieces of content expand the query based on a particular synset associated with a query term which retrieves pieces of content from the corpus having the any of the group of words contained in the synset.

BRIEF DESCRIPTION OF THE DRAWINGS

FIGS. 4A and 4B are examples of the processing that occurs to generate the shards stored in the database in accordance with the invention;

FIGS. 18A-C illustrate examples of the ontologies used by the search system in accordance with the invention;

FIG. 19 is an example of the entity extraction in accordance with the invention;

FIG. 44 illustrates examples of Boolean queries in accordance with the invention;

DETAILED DESCRIPTION OF A PREFERRED EMBODIMENT

The invention is particularly applicable to a computer-based intranet search system and method and it is in this context that the invention will be described. It will be appreciated, however, that the system and method in accordance with the invention has greater utility since the system may be utilized over the Internet or any other network.

Figure 1:
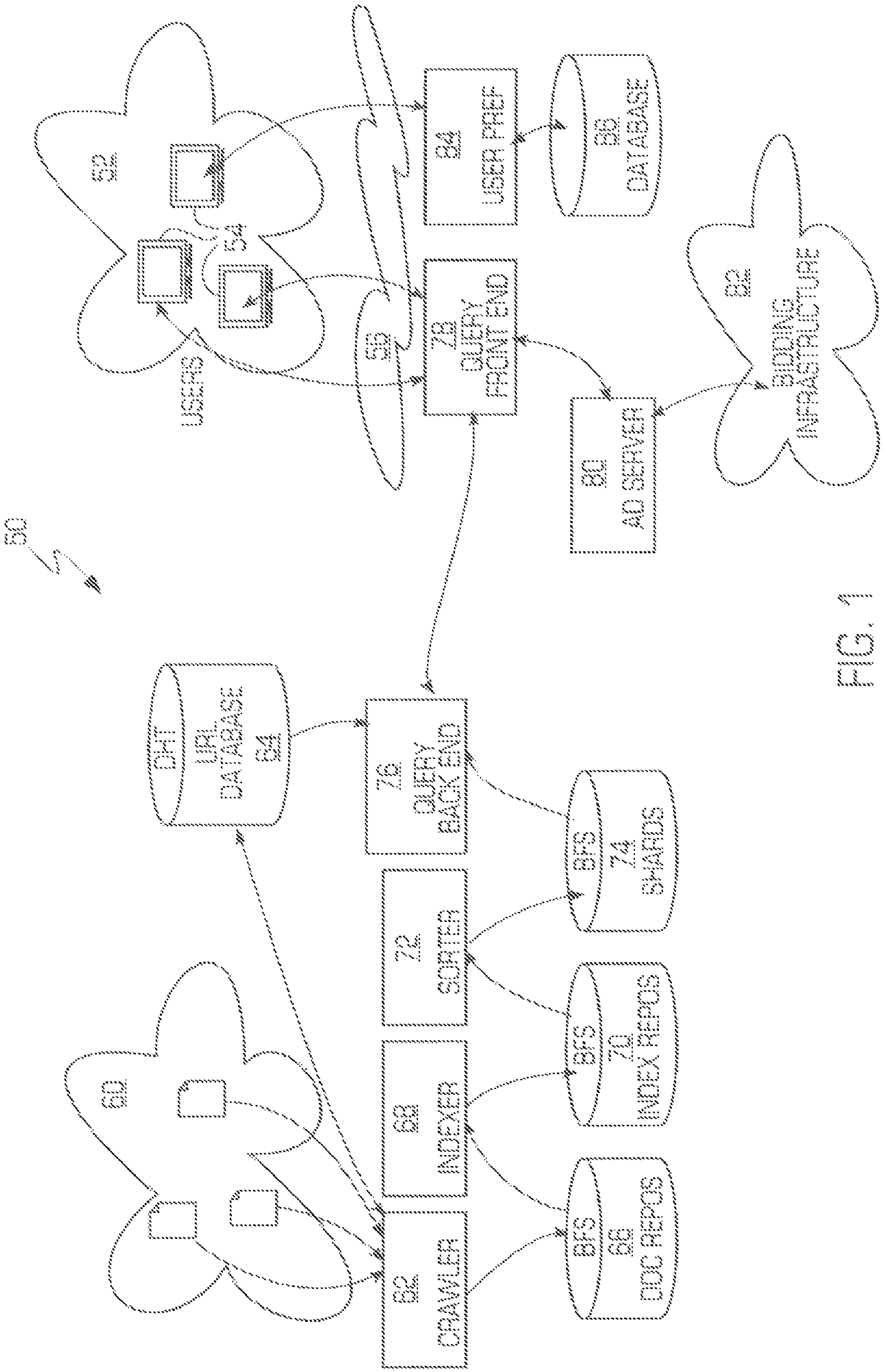
FIG. 1 is a diagram of a search system in accordance with the invention.
Figure 2:
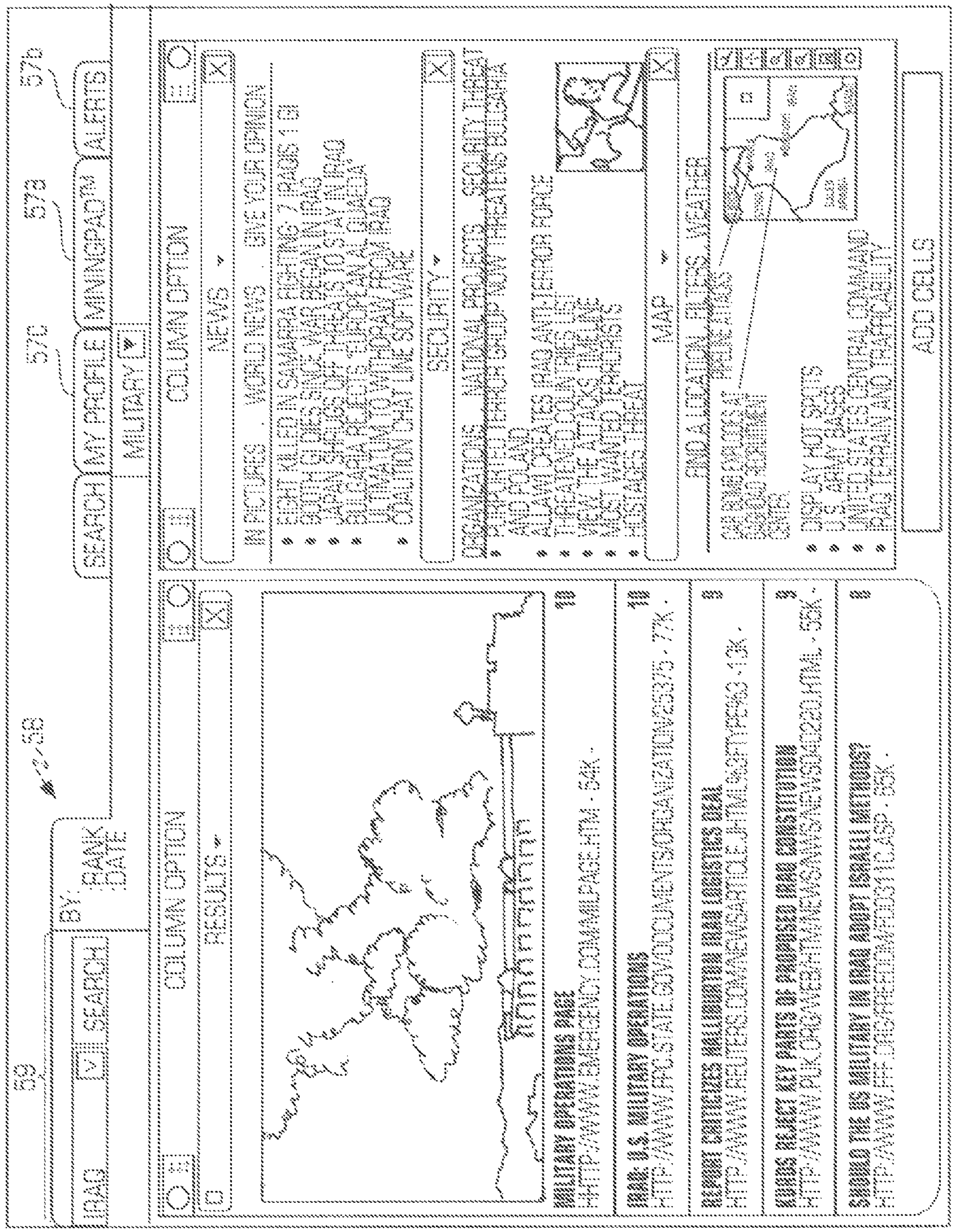
FIG. 2 illustrates an example of the user interface presented to a user of the search system shown in FIG. 1.

FIG. 1 is a diagram of a search system 50 in accordance with the invention. In a preferred embodiment, the search system is implemented in software having a plurality of lines of computer code that are executed by a computer system as shown in FIG. 1. However, the invention is not limited to the computer system shown in FIG. 1 and may be implemented in hardware or in a combination of hardware and software. Furthermore, the invention is not limited to any particular type of computer system, such as the typical client/server Internet model shown in FIG. 1, as the search system may be implemented using various well known computer system architectures. In the example shown in FIG. 1, the search system 50 is implemented in a client/server type architecture in which the one or more users 52 each using a computer device 54 connect to the search system over a communications network 56, such as the Internet, an internal Ethernet network or any other communications or computer network, using a known protocol. In a preferred embodiment, the system 50 is implemented over an intranet using the typical Ethernet/HTTP protocol wherein the users 52 are individuals at a particular company and the search system is hosted at the particular company or by a third party. Each computer device 54 may be any type of computer with sufficient processing capabilities and memory to implement the search system. For example, each computer device 54 may be a personal computer, a laptop computer, a wireless PDA, a wireless email device, such as the RIM Blackberry, a tablet computer, a cellular phone and the like and the invention is not limited to any particular computer device. Broadly, FIG. 2 shows the user may enter a query 59 into a user interface 58 and the search system may perform the searching and mining operations and then return the search and mining results to the user. The search system user interface 58 may also include a mining pad tab 57*a*, an alerts tab 57*b* that is described in more detail below with reference to FIG. 49 and a My Profile tab 57*c* that is described in more detail below with reference to FIG. 50.

Returning to FIG. 1, the search system 50 crawls through a corpus 60 of documents using a crawler engine 62. The crawler 62 also uses information from a uniform resource locator (URL) database 64 as well as loads URL data into the database 64. The crawler gathers the documents from the corpus and stores them in a document repository 66. An indexer engine 68 then indexes the documents as described in more detail below and stores the indexes in an index repository 70. A sorter engine 72 retrieves the stored indexes and sorts them into one or more shards as described in more detail below that are stored in a shard store 74. Then, the data from the shards store 74 and URL database 64 are input into a query back end module 76 that does some of the preliminary data processing for a query and whose function is described below in more detail. The query back end module 76 is in turn connected to a query front end module 78 that receives queries from the users 52 and generates the user interface 58 as shown in FIG. 2. The query front end module 78 may be connected to an ad server 80 with a bidding infrastructure 82 or other ad management system or infrastructure that permits the search system to incorporate ads into the search and mining results presented to the user. The system may further include a user preference module 84 connected to a preference database 86 that permits the system to store user preferences. To better understand the system and its operation, an example of the search system is provided starting with FIG. 3.

Figure 1A:
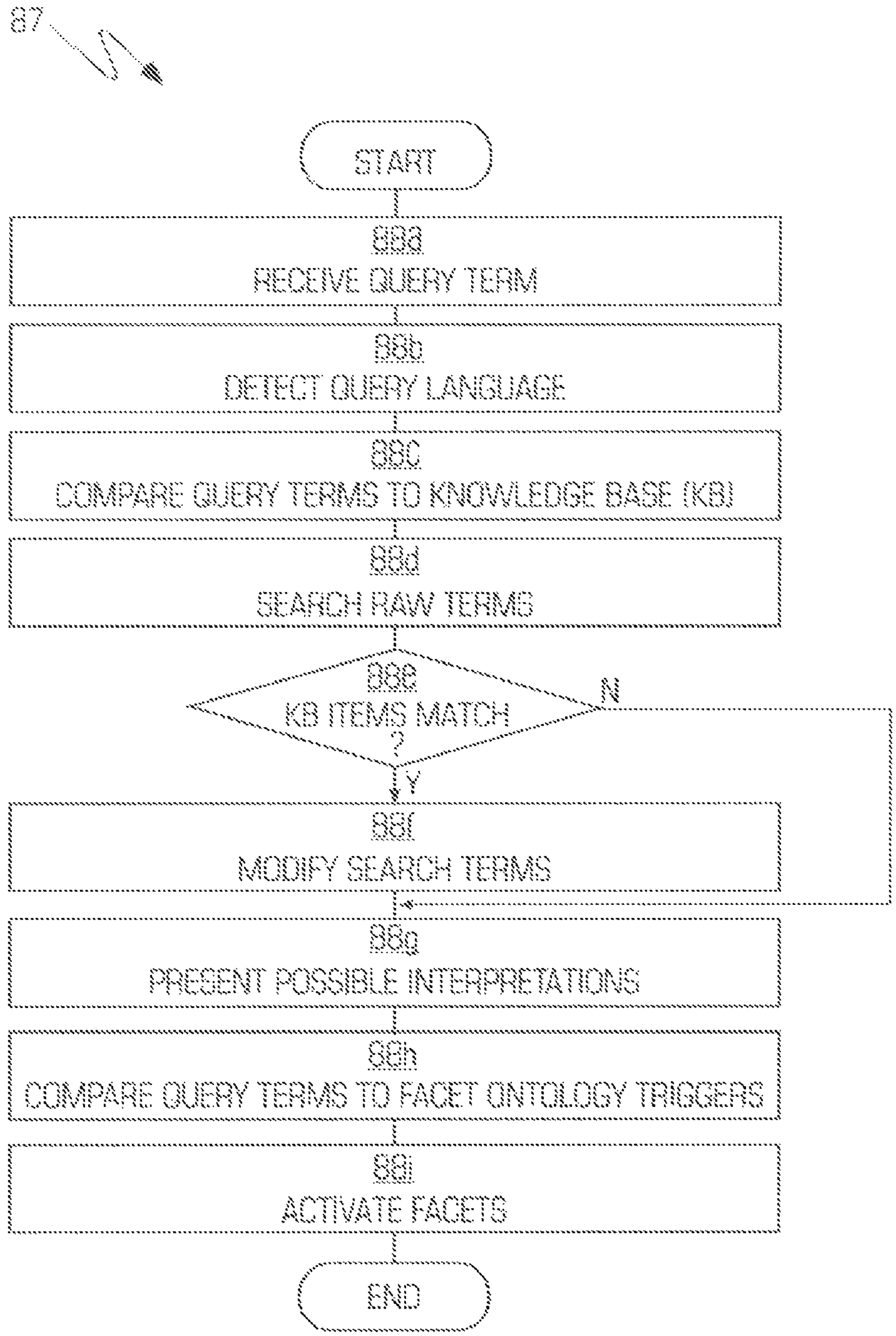
FIG. 1A is a high-level flowchart illustrating a method for query processing in accordance with the invention.

FIG. 1A is a flowchart of a query processing method 87 in accordance with the invention in which a query is interpreted based on formally represented/expressed knowledge items stored in a knowledge base. These formally represented knowledge items may include knowledge that has been edited, analyzed and/or indexed and may include, for example declarative entity lists, topic maps, thesauri, ontologies, taxonomies and semantic networks. These formally represented knowledge items are contrasted to typical computer-based knowledge, such as the frequency of terms in the query, that are used in typical search systems.

In the method 87, the search system interprets a query based on formally represented knowledge, indexed content and language-specific features. In step 88*a*, the query with one or more terms is received by the search system. In step 88*b*, an incoming query term's language is detected, either by explicit user preferences, or by comparing the languages of indexed documents that have that search term. In step 88*c*, the knowledge base is then consulted so that, if a term or terms in the knowledge base at least partially matches the query term, this fact is noted. In step 88*d*, the one or more terms of the query are then searched for over the index in its 'raw' form, meaning it is not searched for in the context of one or more knowledge base items.

In step 88*e*, the system determines if the documents returned by the raw query match any knowledge base items. If the documents returned by this raw query are found to possess knowledge base items in their indexes that overlap with those found by the earlier lookup of the search term, then the interpretation of the search term is modified in step 88*f* from its raw form to the matching knowledge base item(s). For a multi-term search, this process is accomplished mutually, so that the interpretations of each term are shared across the returned documents. Several acceptable interpretations of the query are possible, in which case the user is presented the information in step 88*g* that there are more than one valid query for their original terms. In step 88*h*, once the matching of search terms to the knowledge base is complete, the query terms are compared to the facet ontology triggers. In step 88*i*, these triggers activate one or more 'facets' which are typically represented as cells or tabs of information related to the query but not exactly matching the query. Now, an example of the overall search method is described.

Figure 3:
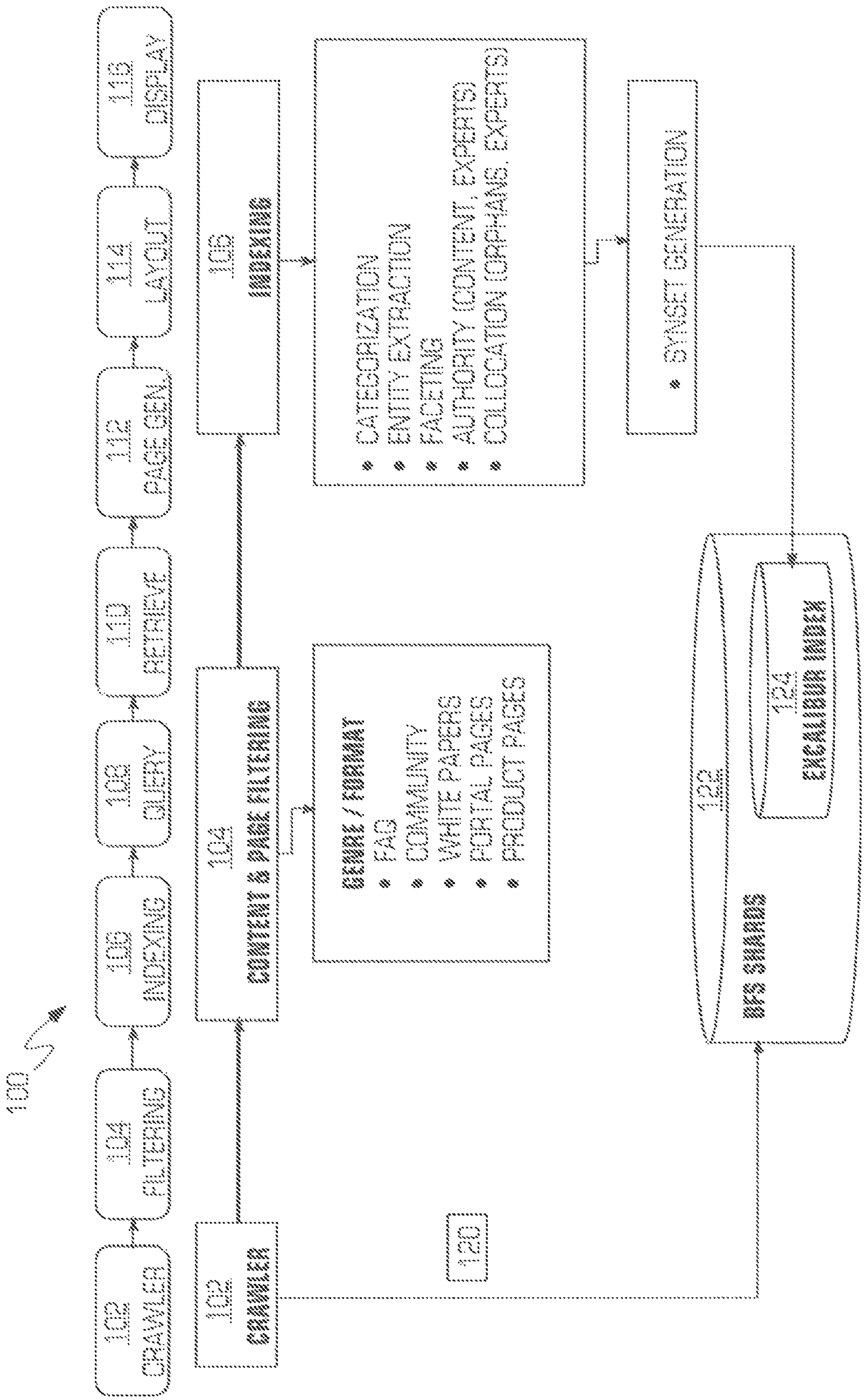
FIG. 3 is a diagram illustrating an example of a search method in accordance with the invention.

FIG. 3 is an example of a search method 100 in accordance with the invention. The search method and its steps and processes are described with reference to the example contained in FIGS. 3 and 30-37. However, the invention is broader than the example shown and the example is merely used for illustrative purposes. In the example in FIGS. 3 and 30-37, the query term "Iraq" is used to illustrate the search methodology. In general, the search method 100 may include a crawling step/process 102, a filtering step/process 104, an indexing step/process, a query step/process 108, a retrieve step/process 110, a page generation step/process 112, a layout step/process 114 and a display step/process 116.

The crawling process 102 is primarily a content gathering function and performs little if any additional information processing. The crawling function does have a significant element of identifying and managing duplicate content such that it tries to minimize the download of the same document or content more than once. This duplication occurs because there typically are many different routes (aka urls) to the same page or content.

In a preferred embodiment of the invention, each process and step described below may be implemented in a piece of software that has a plurality of computer instructions that implement the particular function described below. Each piece of software may be referred to as a software engine. For example, the indexing process may be performed by an index engine. As shown in FIG. 3, the crawler step may generate one or more shards 120 that are stored in a file system or database 122 wherein the file system also stores an index 124 that is generated based on the shards. Now, the shards generated by the system in accordance with the invention will be described in more detail.

Figure 5:
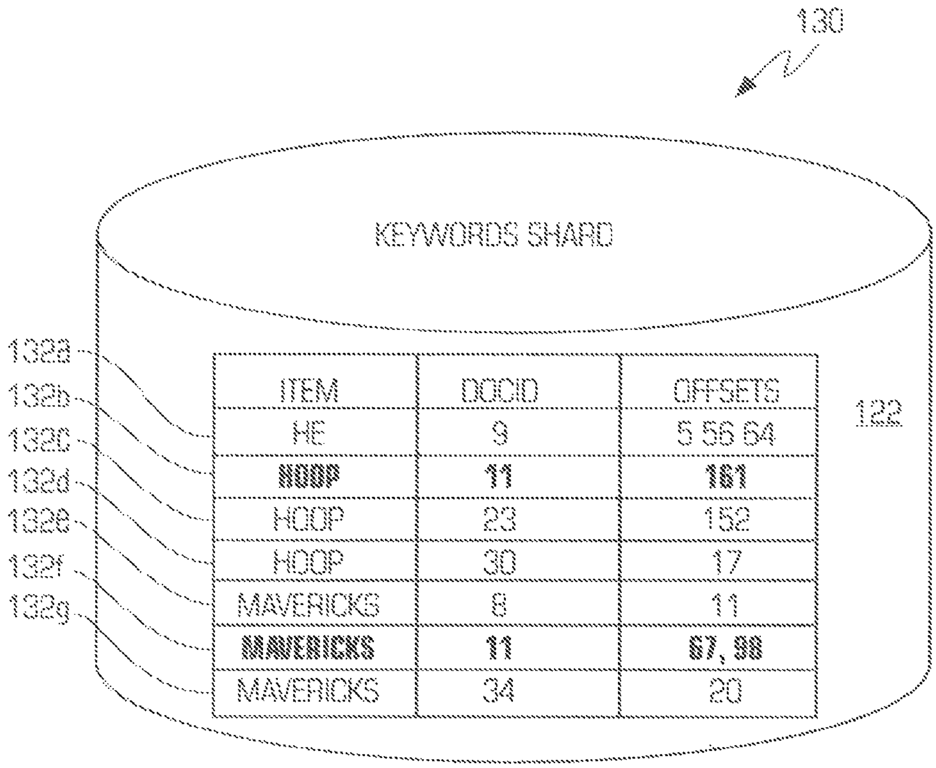
FIG. 5 is a first example of a shard in accordance with the invention.
Figure 6:
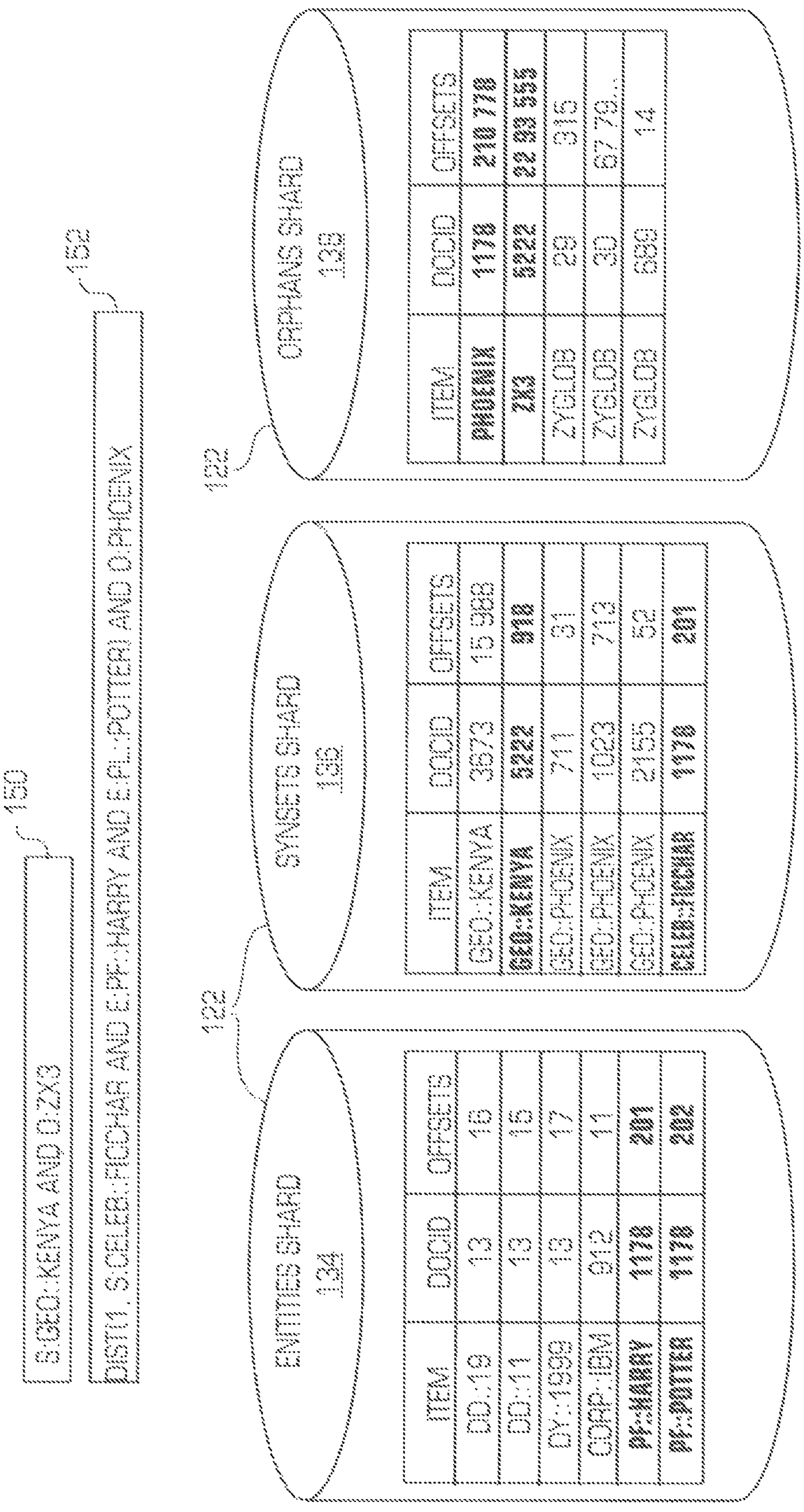
FIG. 6 is a second example of a shard in accordance with the invention.

The shards are generated by indexing the content obtained by crawling the content source (which may include one or more different content sources such as internal intranet sources, external sources, the web, proprietary source, etc.) using the crawling process 102 shown in FIG. 3. The shards in accordance with the invention have one or more unique characteristics. In particular, each shard contains a subset of all of the content sources and the shards may be mini-shards or full shards. In a preferred embodiment, a mini-shard could contain the index to some 100,000 documents, and a full shard the index to 3,500,000 documents; however, such sizes are not inherent to the invention. Each shard may be of a particular type such as a keyword shard (an example of which is shown in FIG. 5), an entity shard, a synset shard and an orphan shard (all of which are shown in the example in FIG. 6.) In accordance with the invention, the intersection of different types of shards (as shown in FIG. 6) permits powerful queries. The shards typically have co-location tables such as shown in the examples in FIGS. 5 and 6.

Figure 4B:
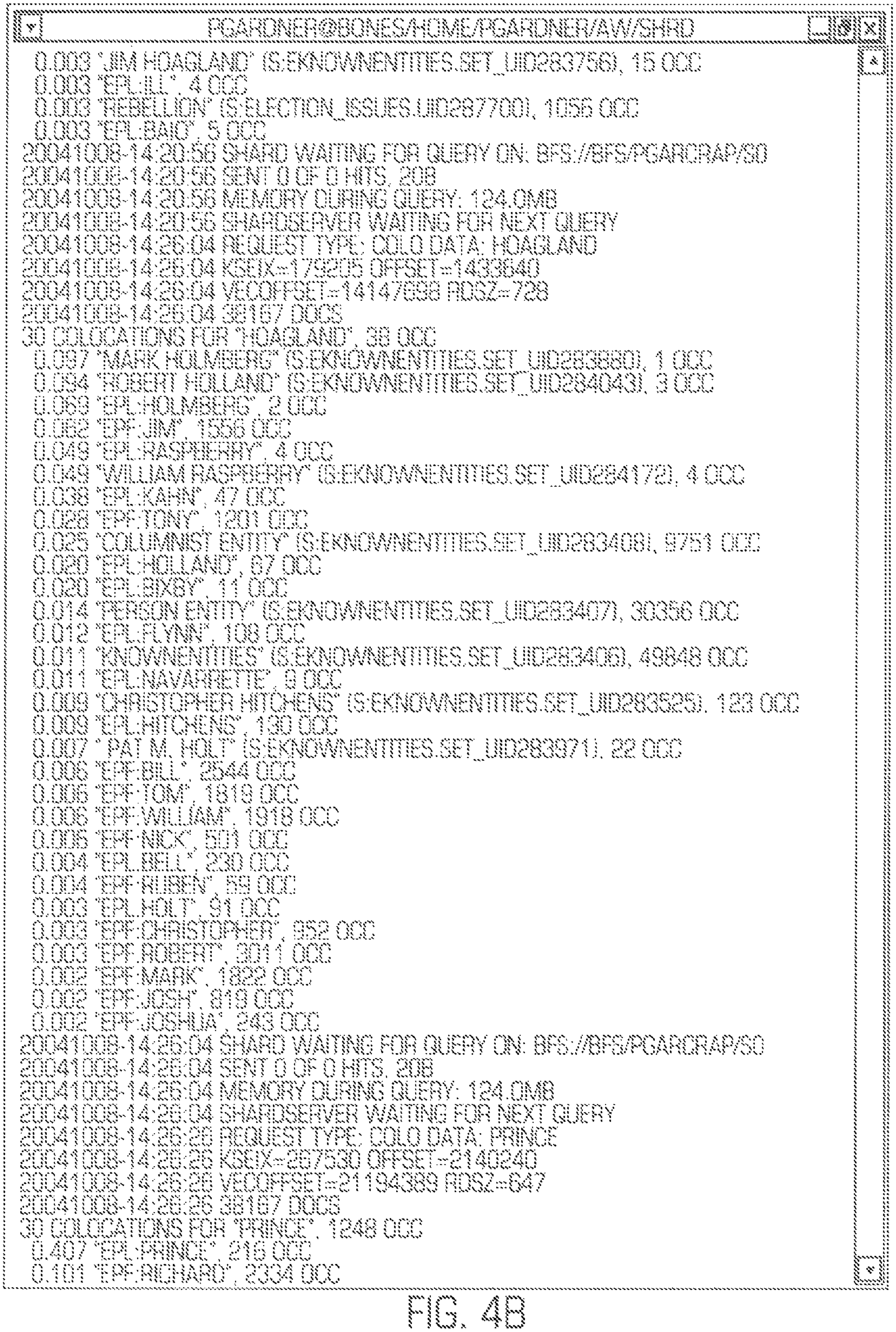

FIGS. 4A and 4B are examples of the processing that occurs to generate the shards stored in the database in accordance with the invention. Each shard is one or more pieces of information from the content sources that have relationships with each other. For example, FIG. 5 shows how shards for "mavericks" and "hoop" are used to generate the result for a query of "mavericks and hoop." FIG. 5 is an example 130 of keyword shards contained in the database 122 which may be a separate database from the main database or may be housed on a shard server. In particular, each shard 132*a*-132*g* is generated from a particular document set identified by the document identification number (Docid field in FIG. 5) and the one or more location(s) in the document of the keyword (offset(s) field in FIG. 5). When the user enters the query "mavericks" and "hoop", the shards used to identify a relevant document is the shards 132*b* and 132*f* since those terms are contained in the same document (docid=11).

FIG. 6 illustrates an example of the database 122 containing entity shards 134, synset shards 136 and/or orphans shards 138. In accordance with the invention, the database may contain one or more of each of the shards that may be used to perform better searching. FIG. 6 also illustrates an example of a first query 150 and a second query 152 that may be performed using the shards shown. A synset is a group of one or more words that have the same meaning (such as "ballot proposition", "referendum" and "referenda") that are grouped together for purposes of queries and the like. The synset will be described in more detail below with reference to the indexing step 106 as shown in FIG. 3. As with FIG. 5, each shard is contained in a co-location table that resides in the database. In this example, each shard of the entities shard has been categorized by the type of entity, such as 19th day (the dd prefix), 11th month (the dm prefix), the year 1999 (the dy prefix) or a corporation, such as IBM (corp prefix). A similar categorization has been performed for the synset shards such as a celebrity categorization (a celeb prefix) and a geography categorization (the geo prefix.) The orphan shards are not categorized, as those shards do not fit into the other categorizations. As shown, certain shards (those shaded in FIG. 6) are used to generate a response to the queries 150, 152 in accordance with the invention. In accordance with the invention, the shards permit better searches to be performed since the keywords, entities and synsets have been categorized and collocated.

Figure 7:
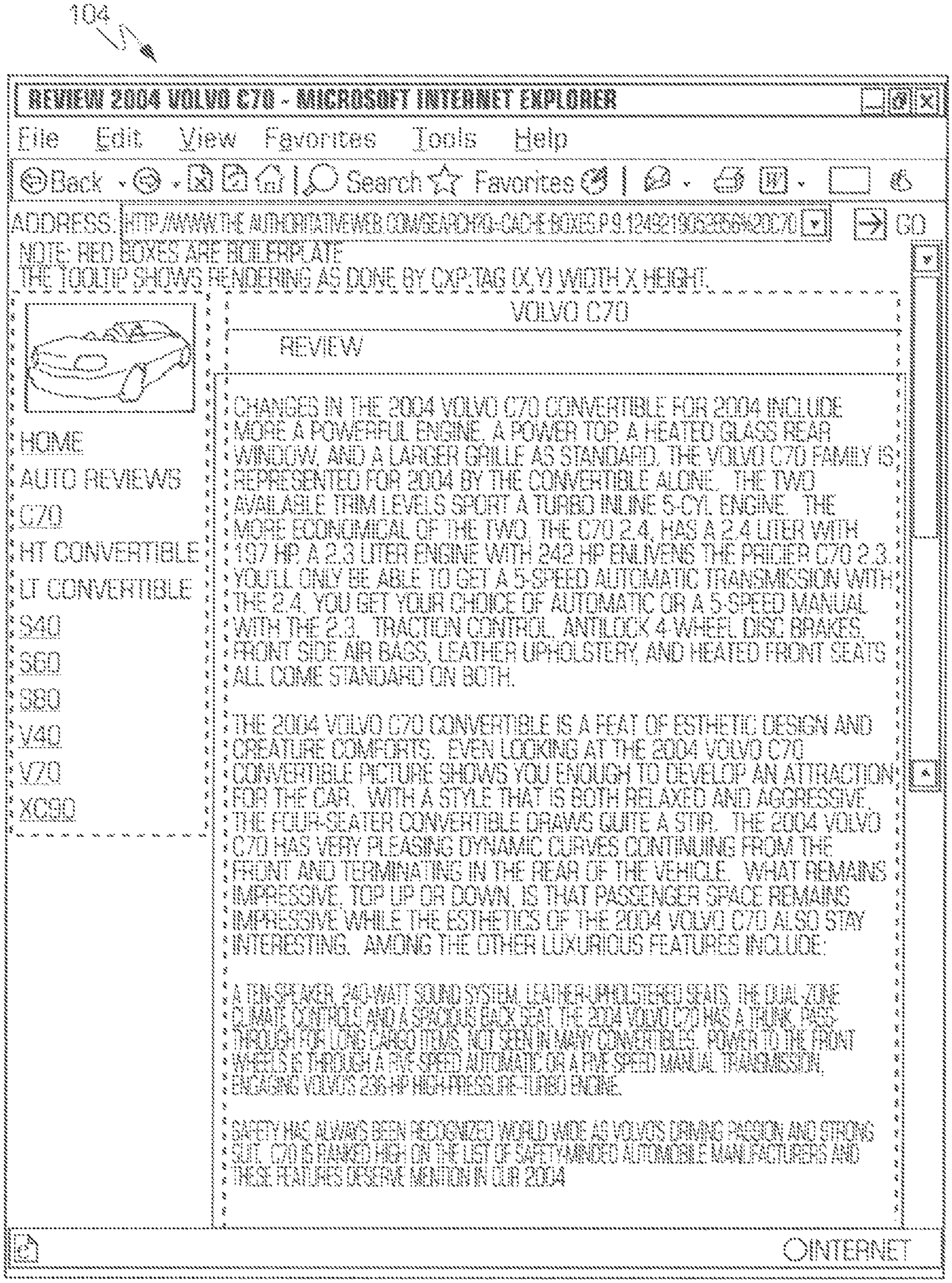
FIG. 7 illustrates an example of the filtering step in accordance with the invention.

Returning to FIG. 3 and the content and page filtering step 104, the system may perform genre and format filtering in which the content is sorted into one or more format/genre categories including, for example, an FAQ format, a community, white papers, portal pages, product pages, spam and pornography as shown in FIG. 3. The content and page filtering permits the system to begin to categorize the content by its document/source. FIG. 7 illustrates an example of the content filtering process 104 in accordance with the invention. In this example, boilerplate content (known to be boilerplate based on the type of content and page formatting) is removed and stories in the content are grouped together. The boilerplate portion of the content is on the left-hand portion of FIG. 7 surrounded by a dotted box. In a preferred embodiment of the invention, the output of the filtering step is an eXtended Mark-up Language (XML) format document that may be input into the indexer. However, the invention is not limited to any particular output format of the filtering step as other known or yet to be generated formats may be used and are within the scope of the invention. In the preferred embodiment, the XML structure may be very structured (per genre) or loose and fields may be used (and may re-use mini-ontologies and normalization) which are useful for a later query. The text in the XML structure preferably is UTF-8 with HTML tags to preserve word offsets and assist in indexing and also have an index into the original HTML file (assuming that a web page is being filtered). An exemplary XML output 160 of the filtering step is shown in FIG. 7. In this example, a resume has been filtered into the XML structure with the offsets shown. In this manner, each piece of content, such as a web page, PDF file, Word document, text file, or any other input, is filtered to put the data of the piece of content into a form that may be more readily indexed in accordance with the invention.

Figure 8:
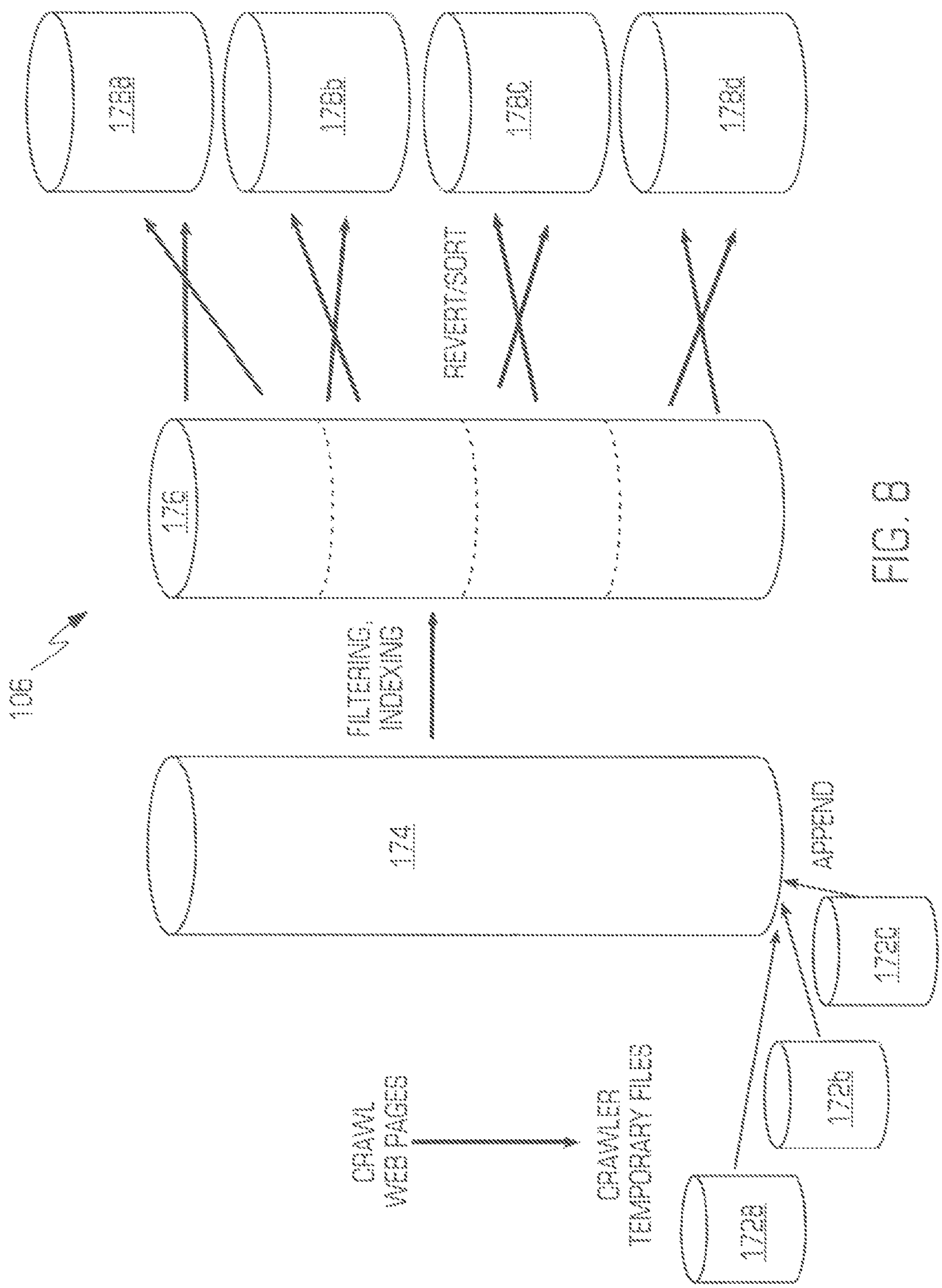
FIG. 8 illustrates an example of the data flow during the indexing step in accordance with the invention.

Returning to FIG. 3 and the indexing step 106, the system may perform one or more of: categorization, entity extraction, faceting, authority (content and/or experts), collocation (orphans and/or experts) and synset generation. The output of the indexing step is fed back into the database 122 and stored in the index 124, such as the synset shards and the entity shards. FIG. 8 illustrates an example of the data flow during the indexing step 106 in accordance with the invention as well as the one or more files/repositories contained in the database created during the crawling, filtering and indexing processes. As shown, the crawling process generates one or more temporary files (files 172*a*-*c* in this example) that are appended to a document repository 174. The content contained in the document repository is then filtered and indexed and then stored in an index repository 176. The data in the index repository 176 is then reverted/sorted into one or more shard repositories 178 (such as shard repositories 178*a*, 178*b*, 178*c* and 178*d*) that may correspond to the orphan shard repository, an entity shard repository, a synset shard repository and a keyword shard repository. In accordance with the invention, the search system, unlike typical search engines that utilize keywords, uses taxonomies and ontologies to be more intelligent about the indexing of the content, which results in better searching as described below. During the indexing processes in accordance with the invention, one or more different steps are performed during a first level and a second level of indexing.

During the first level of indexing, the search system identifies keywords, synsets and entities with each document which are then stored in the database as the index for that document. In addition, any orphans are identified which are terms/words that are not part of a synset, are not an entity, are not a stop word, and are not an empty word. In addition, entities may be normalized, the taxonomies can influence the indexing based upon the depth and specificity of nodes in the taxonomy and degree to which they occur in a document or in the user query, tokenization and morphology is performed, parts of speech may be identified, case normalization is performed and probabilities, spell-checking and spam detection is performed.

When the first level of indexing is completed, the second level of indexing uses the features extracted from the first level of indexing. In the second level of indexing, facet detection and ranking/authoritative value determination occurs. During the facet detection, the document is classified according to a facet ontology (examples of ontologies in accordance with the invention are shown in FIGS. 18A-C). The facets may be, for example, expert, shopping, gossip, education, diagnosis, prevention, real estate, financial, etc. During the ranking/authoritative value determination, factors including specificity, author, URL, co-citation, etc. may be used to rank the documents. The determination also uses experts mentioned (cited) by other (co-citation analysis) to determine the authoritative value of each document.

Figure 9A:
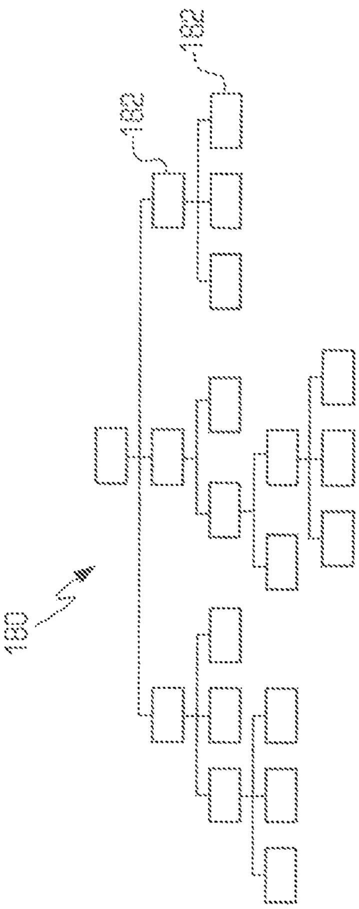
FIGS. 9A-C illustrate examples of a taxonomy and a synset in accordance with the invention.
Figure 9B:
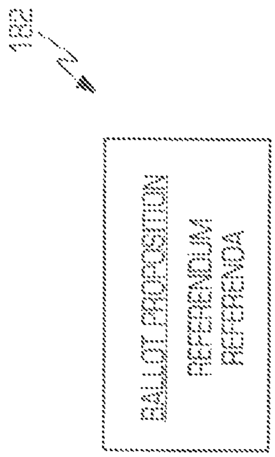
Figure 9C:
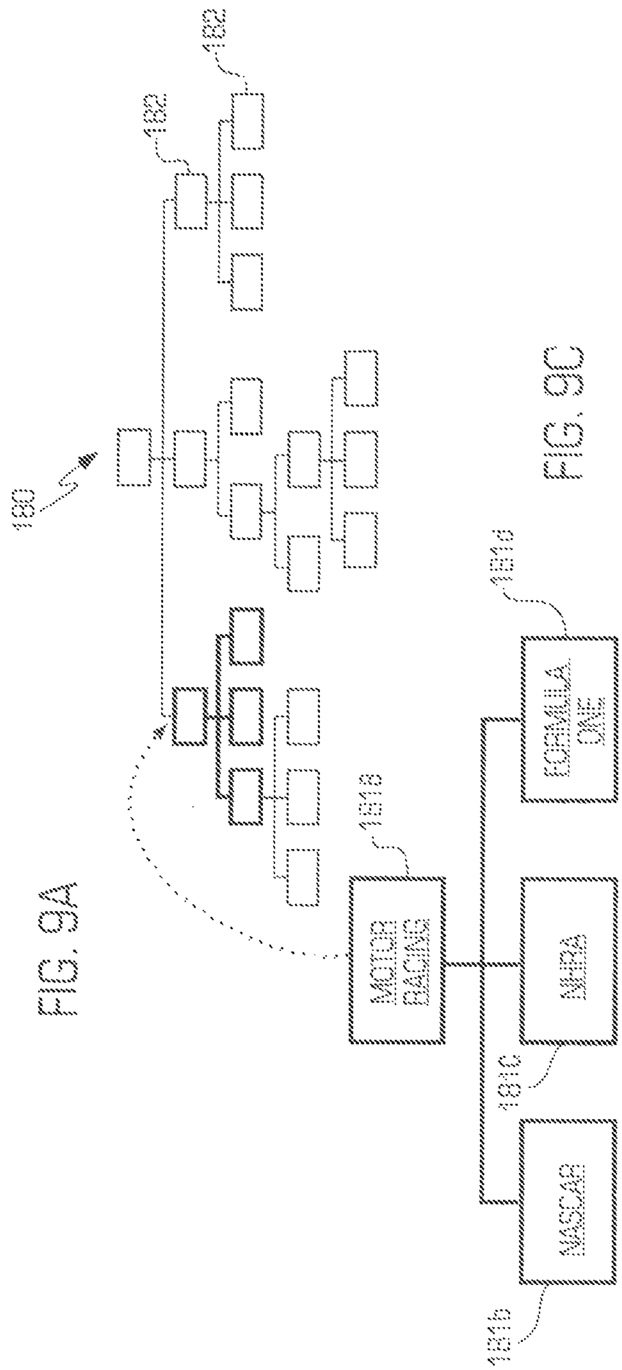

To understand the indexing processes, it is important to understand the difference between synsets, categories and taxonomies. FIGS. 9A, 9B and 9C illustrate a taxonomy 180, a category/synset 182 and more details of the taxonomy, respectively. As is well known, the taxonomy 180 is a hierarchical tree that contains words that have a hierarchical relationship with each other. For example, as shown in FIG. 9C, a term 181*a* "Motor Racing" has a parent relationship to and includes a first term 181*b* "NASCAR", a second term 181*c* "NHRA" and a third term 181*d* "Formula One". Using this known hierarchical relationship, a query for the term "motor racing" would be expanded in accordance with the invention to include the other terms that are related to that term. In this manner, the search system automatically is able to expand a search to include related terms known from a plurality of taxonomies associated with the search system. In accordance with the invention, the search system may have a plurality of taxonomies (currently totaling more than 1 million categories) linked to the system in order to perform the taxonomy expansion. The taxonomies cover a broad spectrum of different areas such as geography, social science, news, life sciences, various horizontal markets, business, hard science, government and the like. The invention is not limited to any particular number of and type of taxonomies, but may use the taxonomies to improve searches as described below in more detail. The taxonomies may also include localized taxonomies including for example foreign language taxonomies, such as French or Spanish.

FIG. 9B illustrates a category 182 that forms each node of the hierarchical tree shown in FIG. 9A. Each category may contain words that share the same meaning. When the words with the same meaning are taken together with the category name, they are known as a synset. For example, as shown in FIG. 9B a ballot proposition (category name) synset includes the word "ballot proposition", the word "referendum" and the word "referenda". Thus, a query that includes the term "ballot proposition" will be expanded based on the synset so that the terms "referendum" and "referenda" are included in the query. The synsets are derived from a variety of sources including but not limited to authoritative sources such as industry standards; proprietary customer controlled vocabulary terms; and manual input to one or more taxonomy categories.

Figure 10:
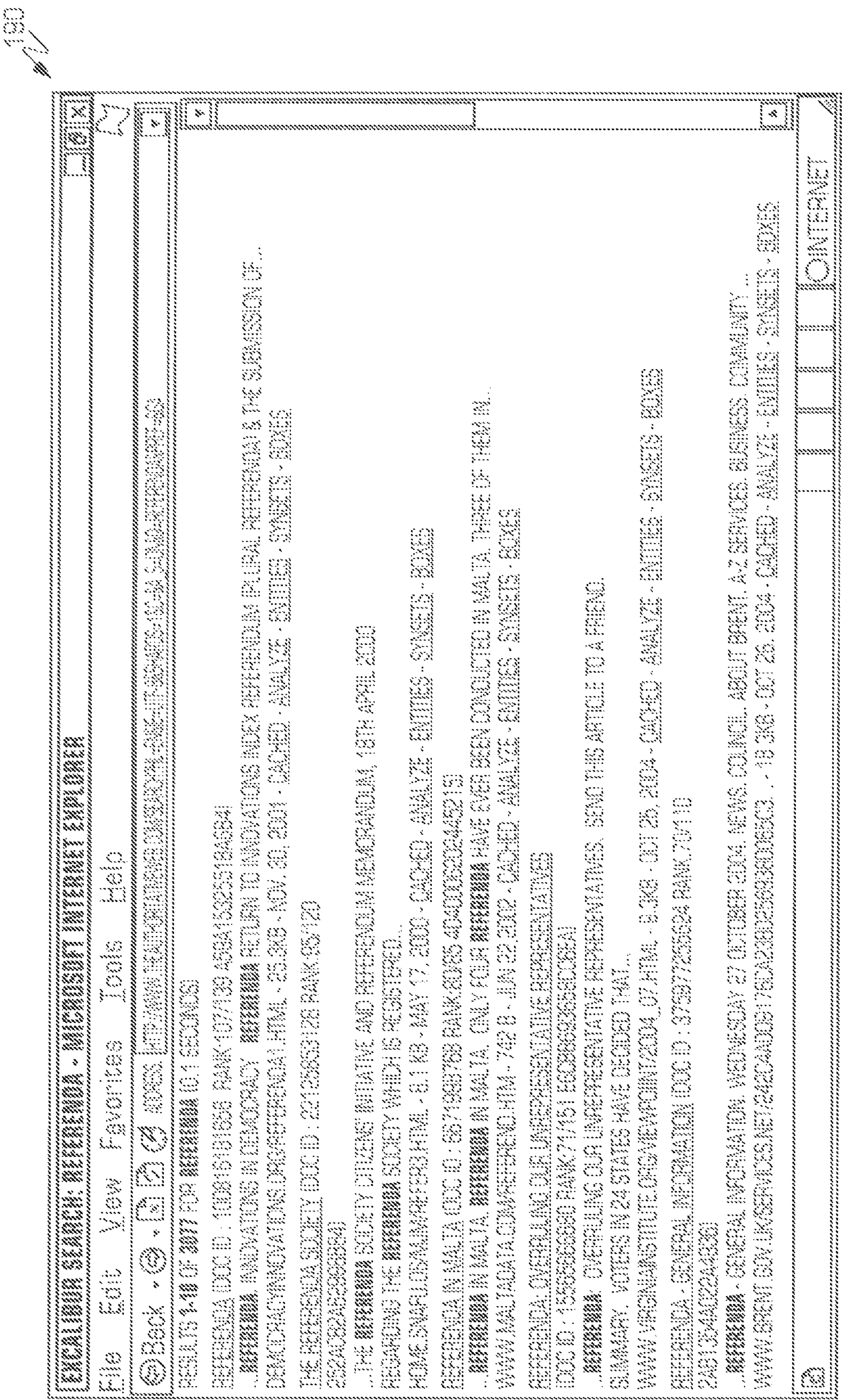
FIG. 10 illustrates an example of the search results from a query without synset expansion.
Figure 11:
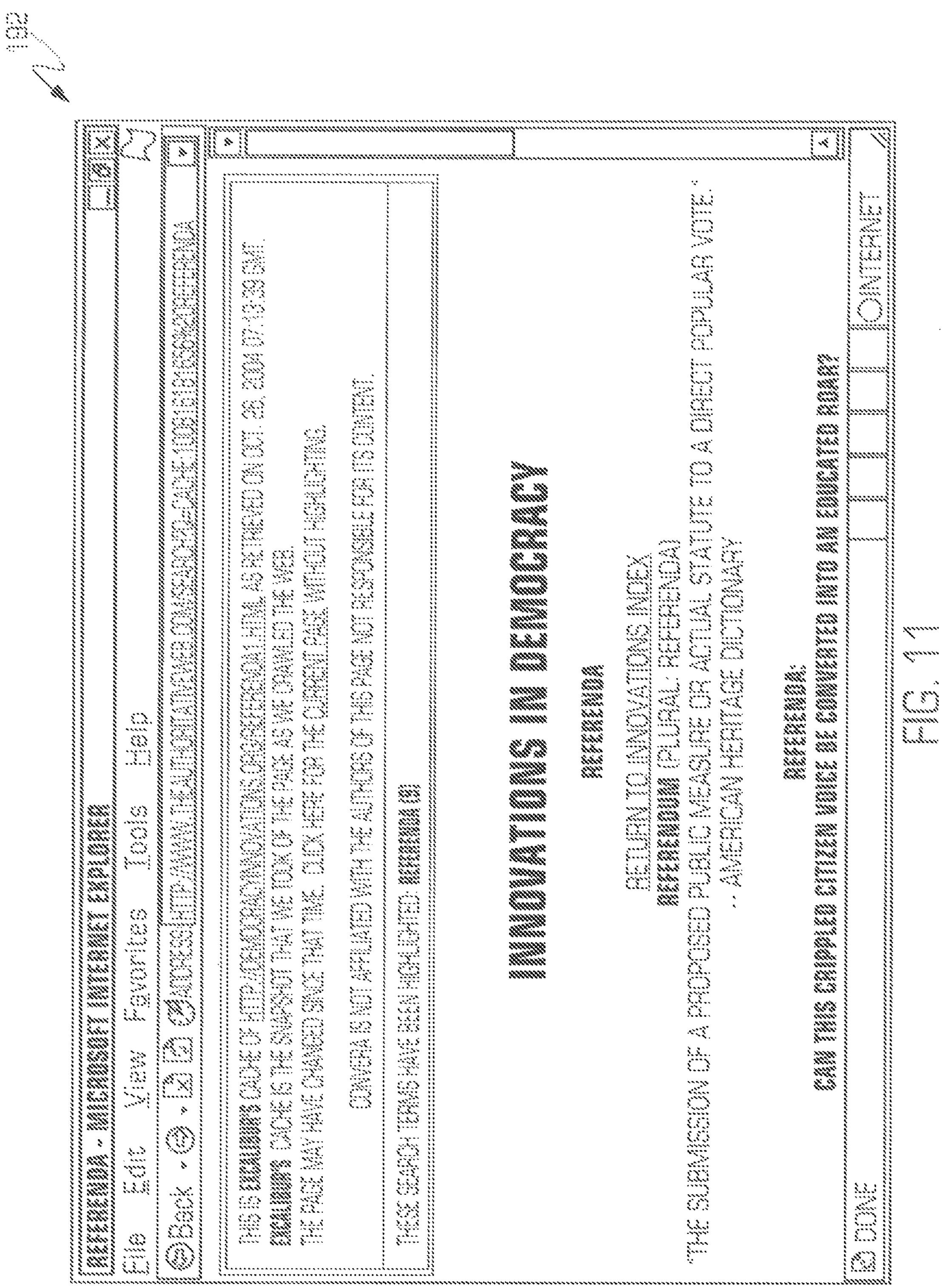
FIG. 11 is an example of a document returned from the query in FIG. 10.

The synset expansion and generation is now described in greater detail. In particular, the synset expansion and generation is described using query results to illustrate the effect of the synset expansion on the search results returned for a particular query. FIG. 10 illustrates a search results user interface 190 for the query "referenda" without the query analysis tool of the search system. As shown, the results without the query analysis generate results that contain the term "referenda." An example of a document 192 returned by the search for "referenda" without the query analysis tool is shown in FIG. 11. The term 'referenda' and occurrences of 'referenda' are highlighted in the results as shown in FIG. 10. As shown in FIG. 11, the document returned also contains the term 'referendum' which is singular form of 'referenda.' Typically, when someone performs the search for "referenda" they would also be interested in the term "referendum."

Figure 12:
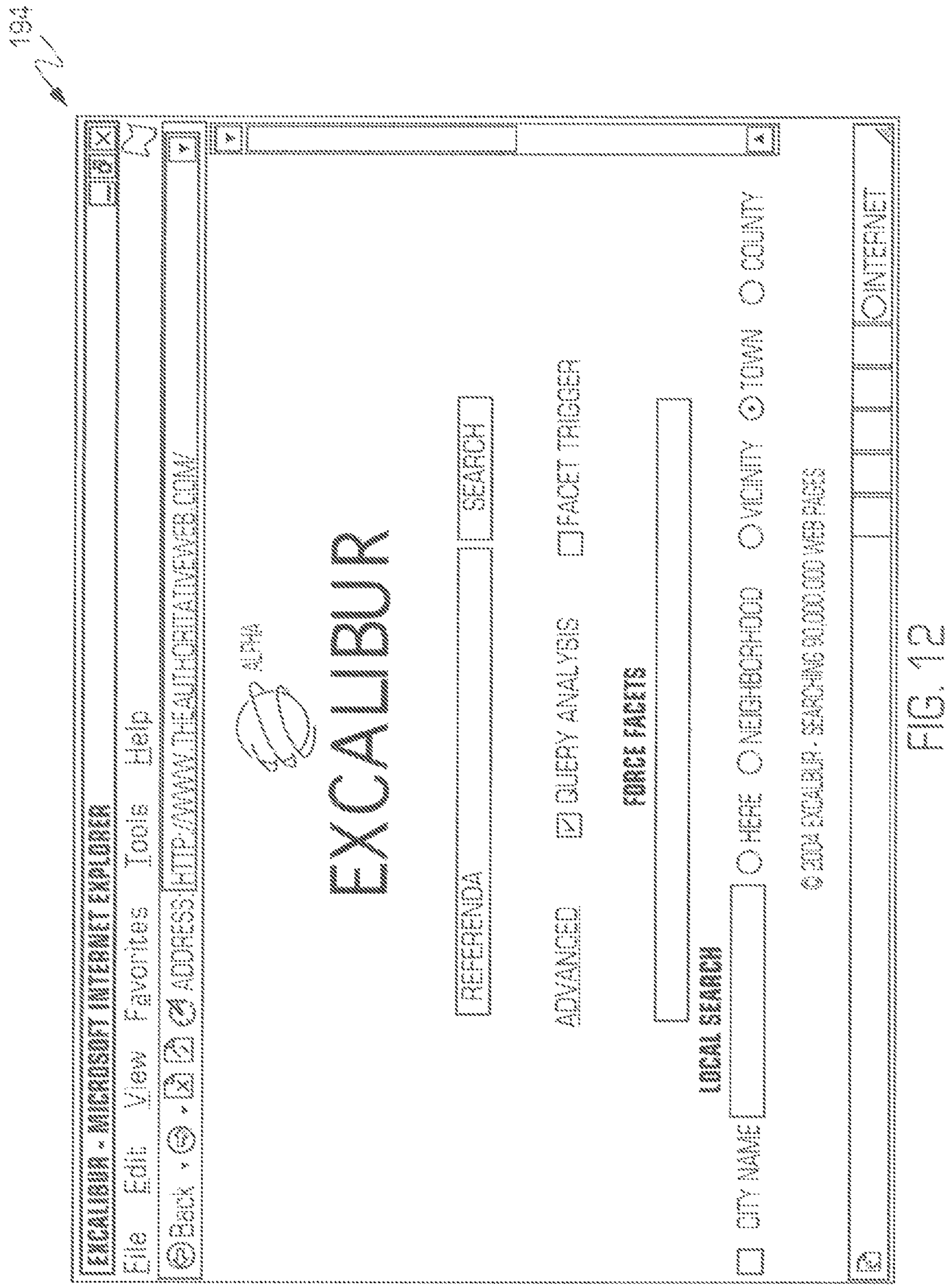
FIG. 12 is an example of the query user interface of the search system in accordance with the invention.

FIG. 12 illustrates a query user interface 194 of the search system in accordance with the invention. As shown in FIG. 12, the query analysis tool has been selected which causes the synset expansion in accordance with the invention to be performed during the query. The query analysis will expand the search terms automatically to include words with similar meaning. The synset expansion is somewhat similar to stemming except that no other search system has the automatic intelligence to automatically expand a search term to include similar meaning terms which even an experienced searcher might not use in the query. For example, when the user enters "referenda" as shown in FIG. 12, the search system performs a search with the following keywords: referenda (the actual search term), referendum (the singular form or referenda) and ballot proposition (a term with similar meaning to referenda) as shown in FIG. 13.

Figure 13:
FIG. 13 is an example of the search results for a query with the synset expansion.

FIG. 13 is an example of the search results 196 for a query with the synset expansion in which the category of "ballot proposition" is searched. The "Cat:Ballot proposition" term shown in FIG. 13 indicates that Synset expansion has taken place on 'referenda' and the query was expanded to include all terms considered to have the same meaning as 'Ballot proposition' which includes the original query term "referenda." Thus, using the synset expansion in accordance with the invention, a more comprehensive search is performed. (In accordance with the invention, the query analysis tool and the synset expansion may be turned off.) As can been seen, a slightly different set of documents are returned to the user since the multiple terms (in this example, referenda, referendum and ballot proposition) are simultaneously searched for and certain documents are more highly ranked in accordance with the invention. In the results, some documents contain 'referenda', some 'referendum', and some both, and this query is done without needing to explicitly query for all of the terms. In fact, the search system permits the user to perform a "concept" search and find documents containing words with the same meaning as their query without explicitly using all the terms in the query itself. In accordance with the invention, the search system is able to perform synset expansion since each document has its synsets identified when it is indexed.

Figure 14:
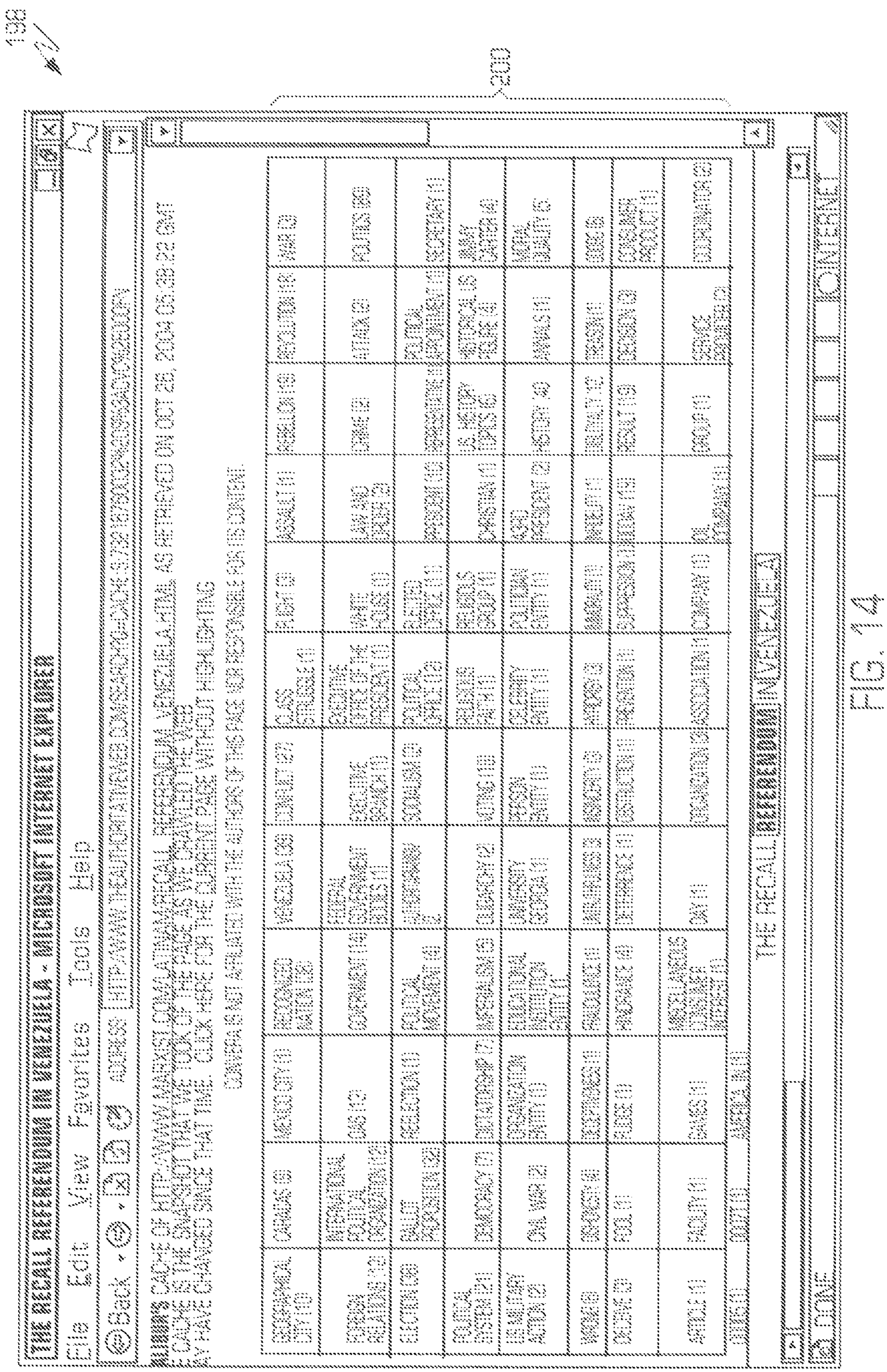
FIG. 14 is an example of a synsets view of a document returned from the search query shown in FIG. 13.
Figure 15:
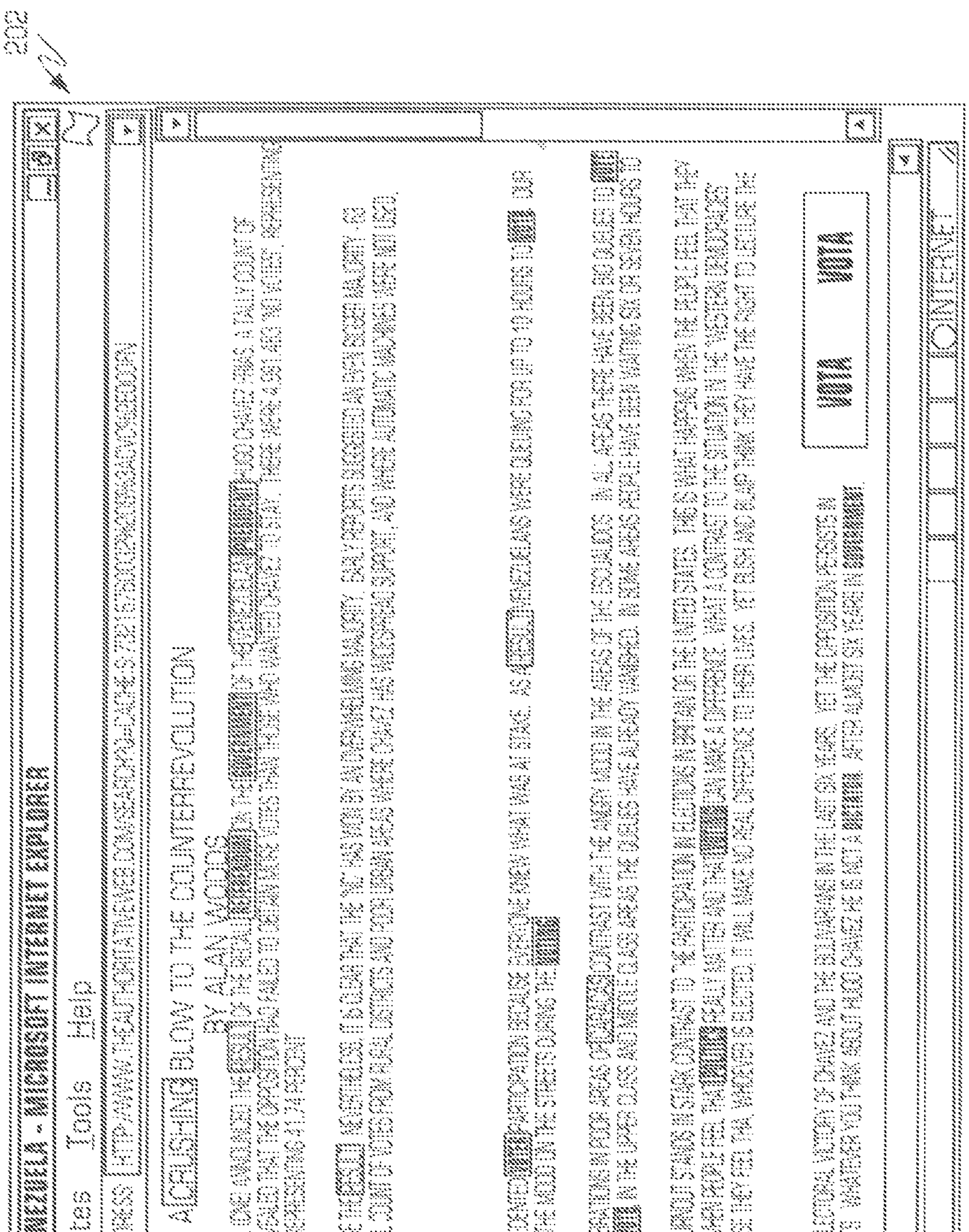
FIG. 15 is an example of a document returned from the query in FIG. 13.

FIG. 14 is an example of a synsets view 198 of a document returned from the search query shown in FIG. 13. An upper portion 200 of the indexed document contains the synsets that have been identified in the particular document. FIG. 15 is an example of a document 202 returned from the query in FIG. 13 in which the Synset words shown in FIG. 14 are highlighted in the positions where they are located in the document. Thus, in accordance with the invention, during the indexing process, any synsets contained in the document are identified and stored in the database to permit synset expansion during a query. In accordance with the invention, each document is indexed not only for its words but also for any concepts that are represented by any of the synsets.

Figure 16:
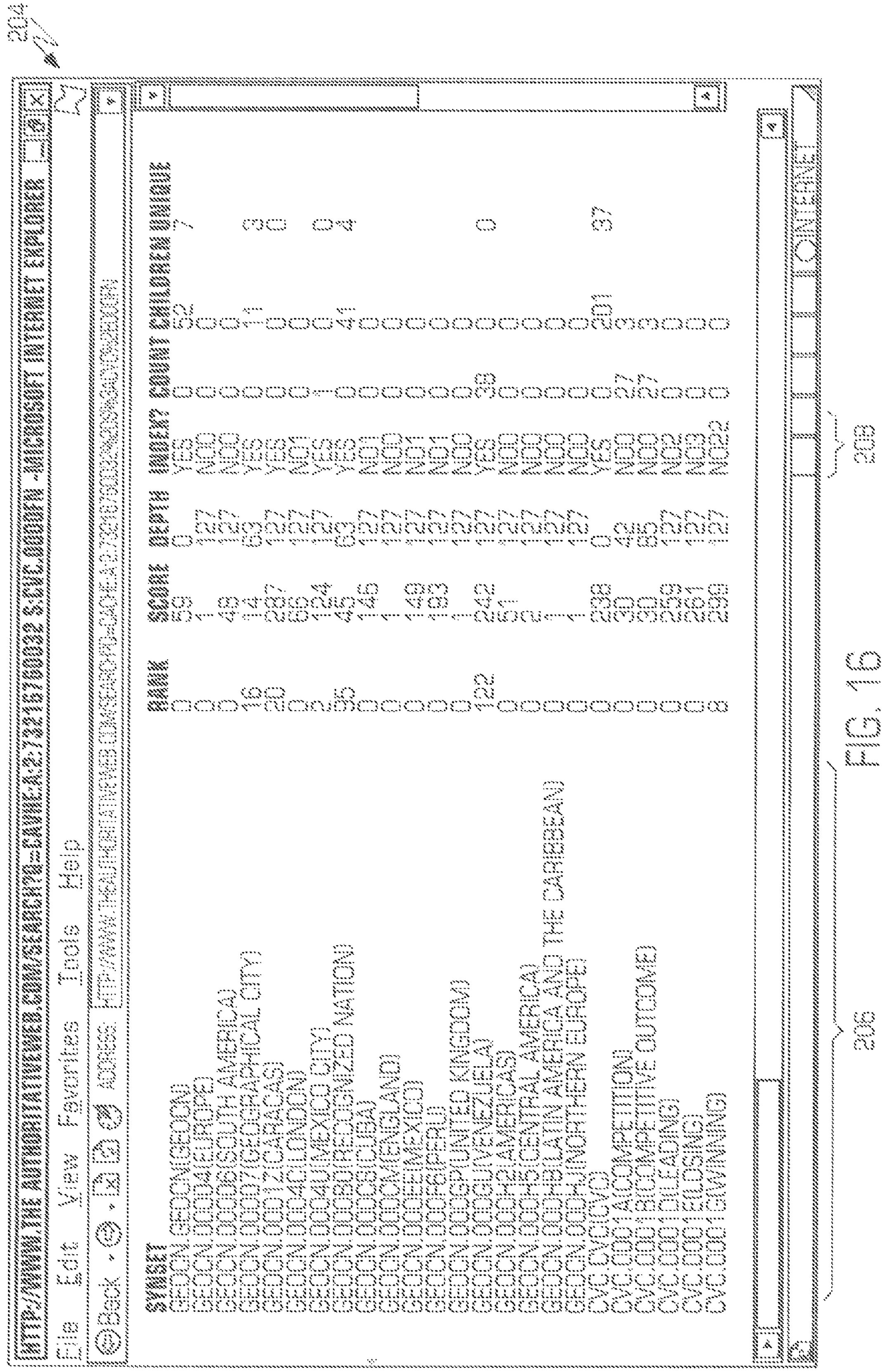
FIG. 16 is a user interface illustrating the indexing of a document with synsets in accordance with the invention.

FIG. 16 is a user interface 204 illustrating the indexing of a document with synsets in accordance with the invention. In particular, this shows the synset indexing performed against a document with the different synsets 206 listed down the left hand side of the view that the search system has reason to believe are present in the document. The synsets are chosen based on the words in the document so that each document may have a unique set of synsets associated with the document. Another column 208 contains a decision by the search system about whether or not the document is indexed against the particular synset. The invention associates keywords that it extracted from the document to determine which synsets are appropriate. For example, the invention located the keyword "Caracas" in the document and therefore identified such synsets as "Caracas" and "Venezuela" as appropriate for indexing.

Figure 17:
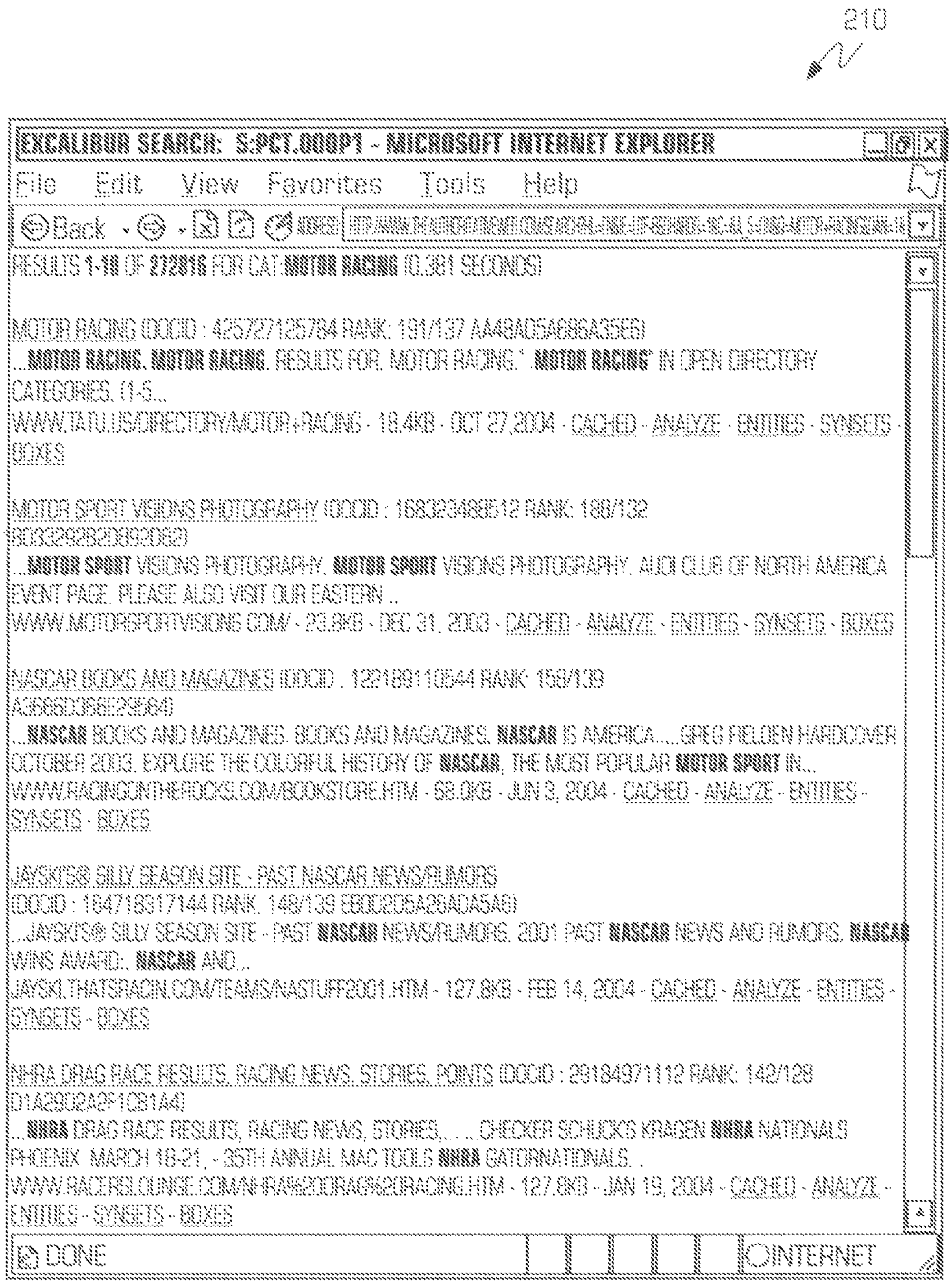
FIG. 17 illustrates an example of taxonomy expansion in accordance with the invention.

FIG. 17 is a diagram 201 illustrating the search results from a query of "motor racing" in which taxonomy expansion is performed in accordance with the invention. As with synset expansion, the taxonomy expansion is performed when the query analysis tool is selected. Unlike synsets, which are similar words, the taxonomy expansion permits related words to be grouped together and searched. For example, as shown in FIG. 9C the term "motor racing" has the terms "NHRA", "NASCAR" and "Formula One" associated with it as well as the term "motor sport", so that a query for "motor racing" with taxonomy expansion includes the other terms. As shown in FIG. 17, the returned documents contain the various taxonomy expansion terms. Some of the documents shown in FIG. 17 would not be found by a typical search engine that does not perform taxonomy expansion.

Figure 20:
FIG. 20 shows a web page with the entities identified in the web page.

Another step in the indexing is entity extraction and indexing based on knowledge contained in the search system about various entities. The resources from which the search system may draw its entity knowledge may include name lists (for example, athletes, entertainers, politicians and/or scientists), name rules (for example, first names, last names, personal titles and/or suffixes/prefixes), organization lists (for example, public and private companies, associations/NGO, government bodies and/or sports teams), organization rules (for example, suffixes and/or organization words) and regular expression entities (for example, phone numbers, dates, IP Addresses, URLs and/or social security numbers). During the first level of indexing as described above, the entities are extracted from each document. The entity extraction occurs using a set of parsing rules in combination with known entities (such as first name and last name.) An example of the results of the entity extraction (in the preferred XML format as described above) is shown in FIG. 19 while FIG. 20 shows an example of a piece of content (a web page in this example) with the entities highlighted in the piece of content.

Figure 21:
FIG. 21 is an example of the search results for the query "43rd President"
Figure 22:
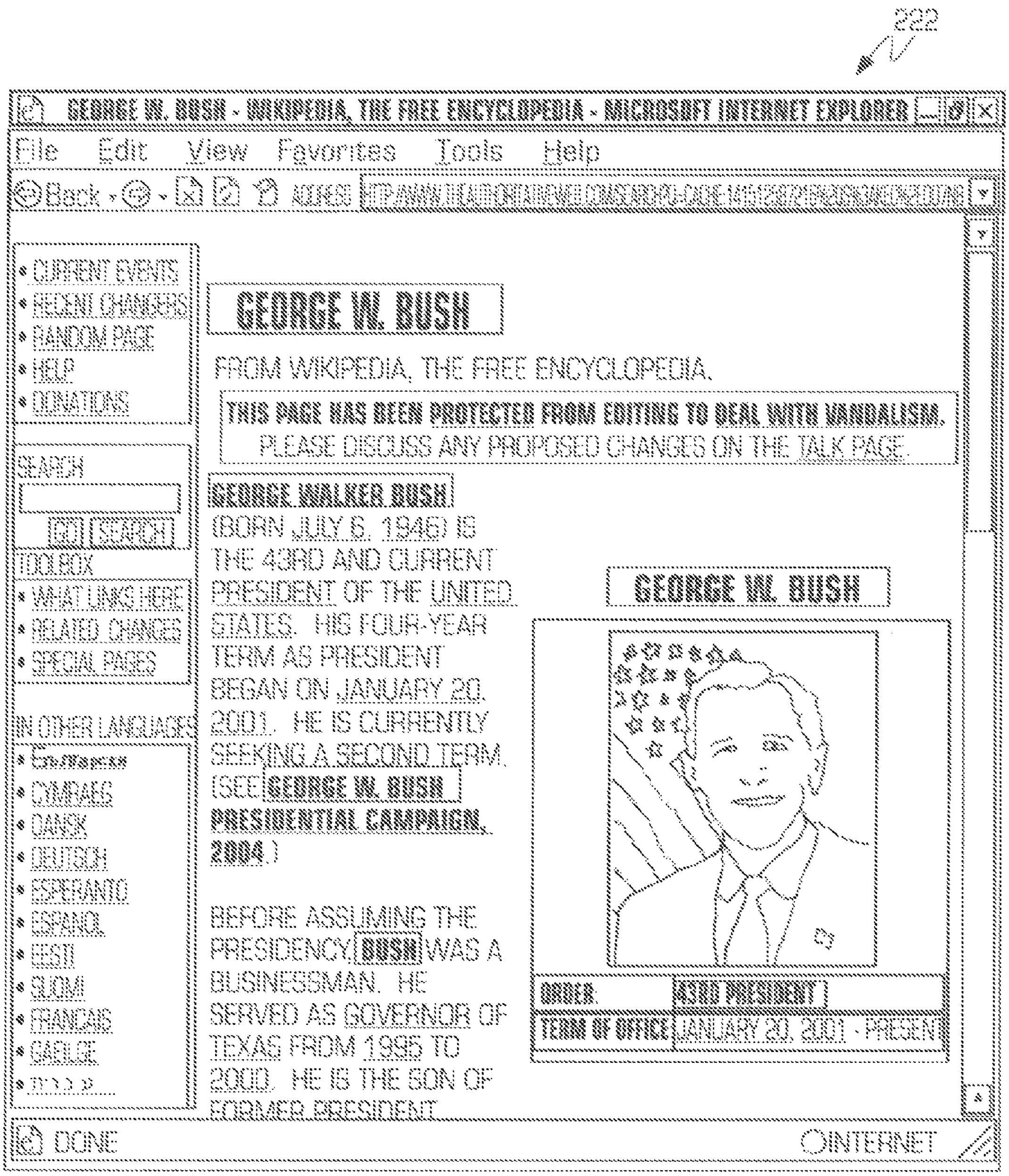
FIG. 22 is an example of a piece of content identified in FIG. 21.

In accordance with the invention, the search system may perform entity consolidation in which one or more different ways to refer to the same entity are consolidated so that a query for any of the ways to refer to the entity will return results to all of the different ways to refer to the entity. FIGS. 21 and 22 show static entity consolidation about a known entity. For example, a query for "41st president" returns results including references to "Former-President Bush," "Ex-President Bush" and "George H. W. Bush" which are all different ways to refer to George Bush.

FIG. 21 is an example of the search results 220 for the query "43rd President" and FIG. 22 is an example of a piece of content 222 identified in FIG. 21. Note in FIG. 21 that various representations of GWB are highlighted—George W. Bush, George Walker Bush (not shown in FIG. 21) and Bush. This shows the entity consolidation in that the many different ways of referring to the entity GWB are consolidated. Note in FIG. 22 that the system even highlights the term "Bush" since it knows that that term is one way to refer to George W. Bush. Due to the entity knowledge that the 43rd president is George W. Bush, George Walker Bush, and similar synonymous terms, permits the search system in accordance with the invention to perform a more comprehensive search. A typical search system would likely return far fewer relevant results. In addition to known (Static) entities, the search system is able to identify entities it doesn't already have knowledge of, but has extracted from a document.

Figure 23:
FIG. 23 is an example of the search results for the query "Bahrein"
Figure 24:
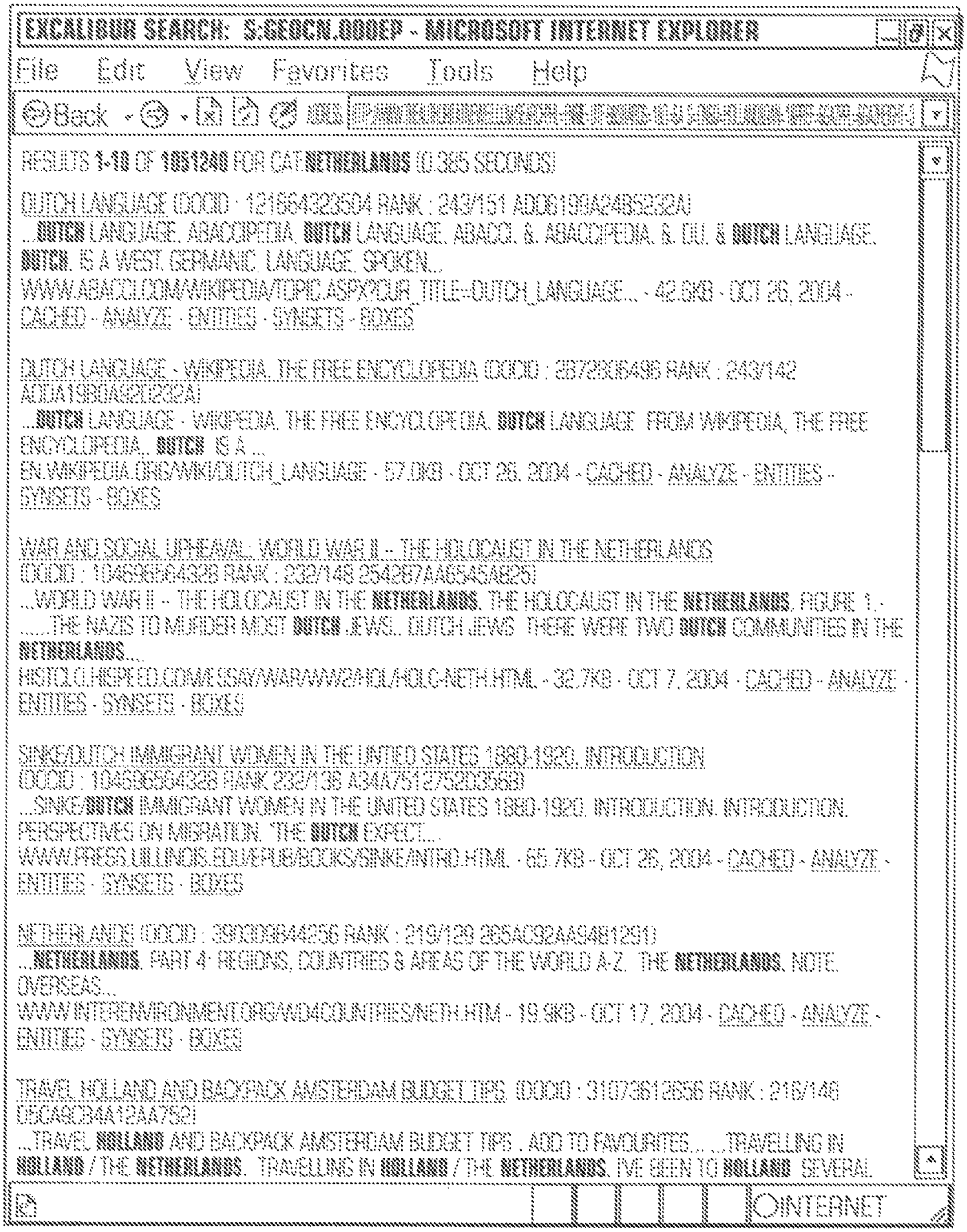
FIG. 24 is an example of the search results for the query "Holland"

The search system may also perform geography entity consolidations. For example, FIG. 23 is an example of the search results for the query "Bahrein" in which the search system applies a synset (Cat:Bahrain) which includes "Bahrein" and "Bahrain" which covers the typical misspelling of the geographic location. FIG. 24 is an example of the search results for the query "Holland" in which geographical knowledge coupled with synset expansion (Cat:Netherlands) is used. In this example, the synset "Netherlands" includes the terms "Holland" and "Dutch" so that the results includes documents with the terms Netherlands and Dutch highlighted since those terms were included in the search in accordance with the invention.

Figure 25:
FIG. 25 illustrates the search results for "Athens"
Figure 26:
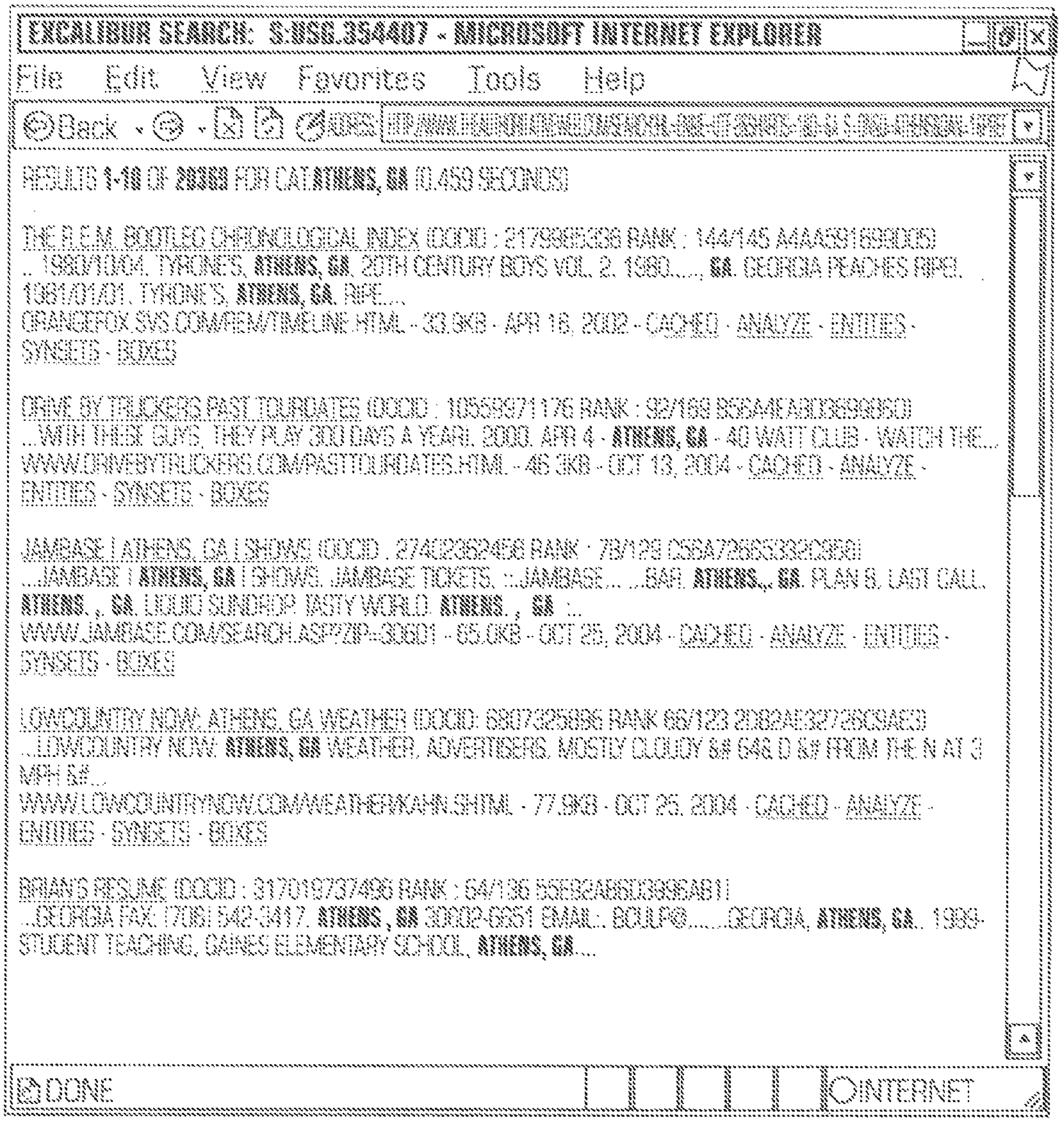
FIG. 26 illustrates the search results for "Athens, Ga."
Figure 27:
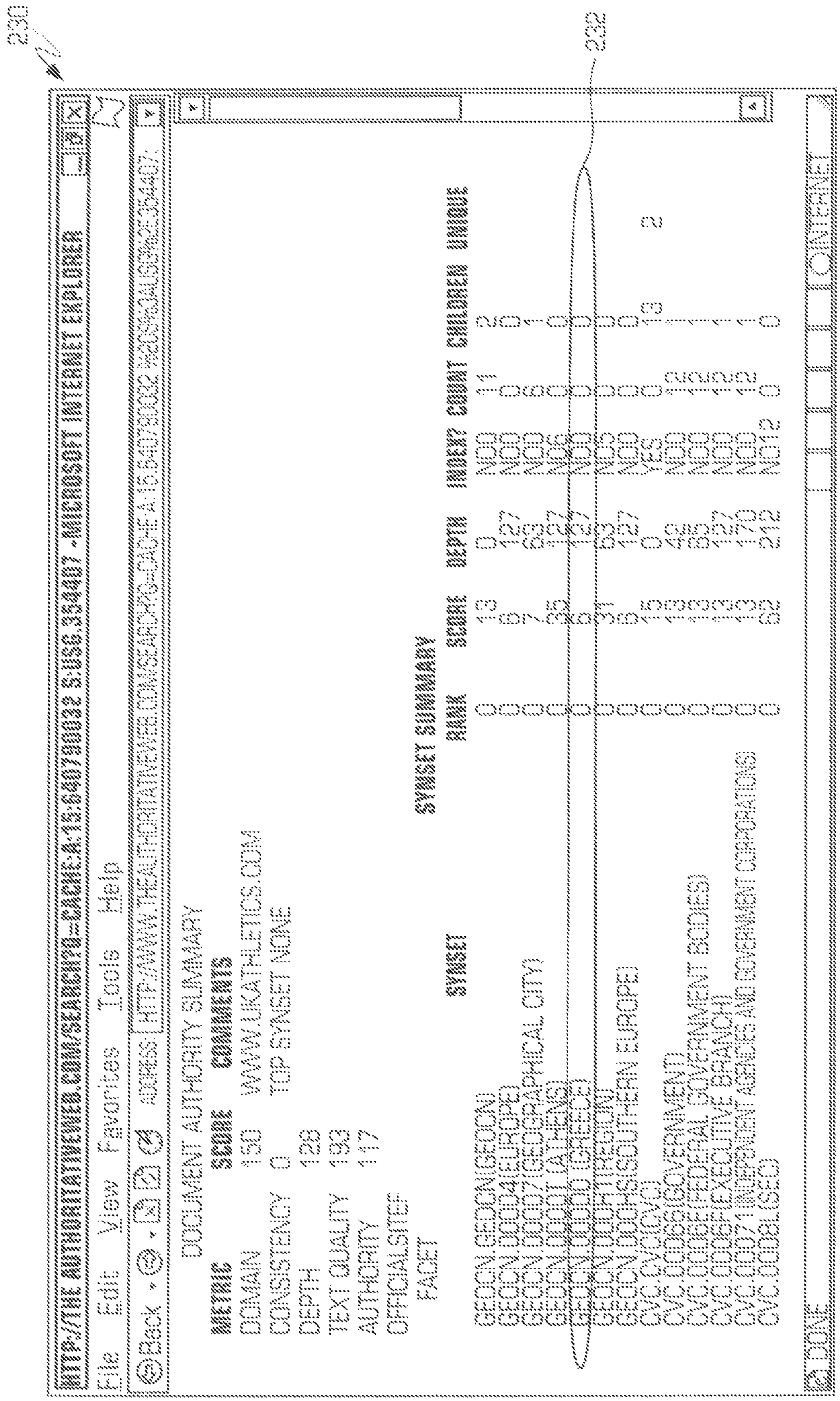
FIG. 27 is a user interface illustrating the indexing of a document with synsets illustrating disambiguation in accordance with the invention.

FIG. 25 illustrates a search results listing for "Athens" for the query "Athens". As one might expect, there are many "Athens" in the world and the results contain pieces of content about the Athens Olympics and Athens, Greece and the most significant one is the capital of Greece. Note that the results of this unspecific query are mostly relevant to Athens, Greece. Disambiguation is the process by which the search system is able to differentiate between for example Athens, Greece and Athens, Ga. based on the indexing of the documents. FIG. 26 illustrates the search results for "Athens, Ga." in which the results are relevant to Athens, Ga. FIG. 27 is a user interface 230 illustrating the indexing of a document with synsets illustrating disambiguation in accordance with the invention. In the document index shown in FIG. 27, the synset "Greece" 232 was considered as a candidate, but was rejected because the search system did not find enough supporting evidence. Thus, the search system, due to the indexing and synsets is able to differentiate between similar terms, such as Athens, Greece and Athens, Ga.

The preceding has been concerned with the search system using the power of its taxonomic resources to categorize the words and terms within a document during indexing. However, the search system also categorizes the document as a whole, by deciding which of many "Facet" designations apply to it. Thus, during the indexing, one or more facet designations may be associated with a document such as shown in FIG. 27 in which an official site facet (officialSiteF facet in the upper portion of FIG. 27) has been associated with the document that is about the Athens Olympics. Thus, when the "official site" facet is shown to a user, it will contain this document.

Figure 28:
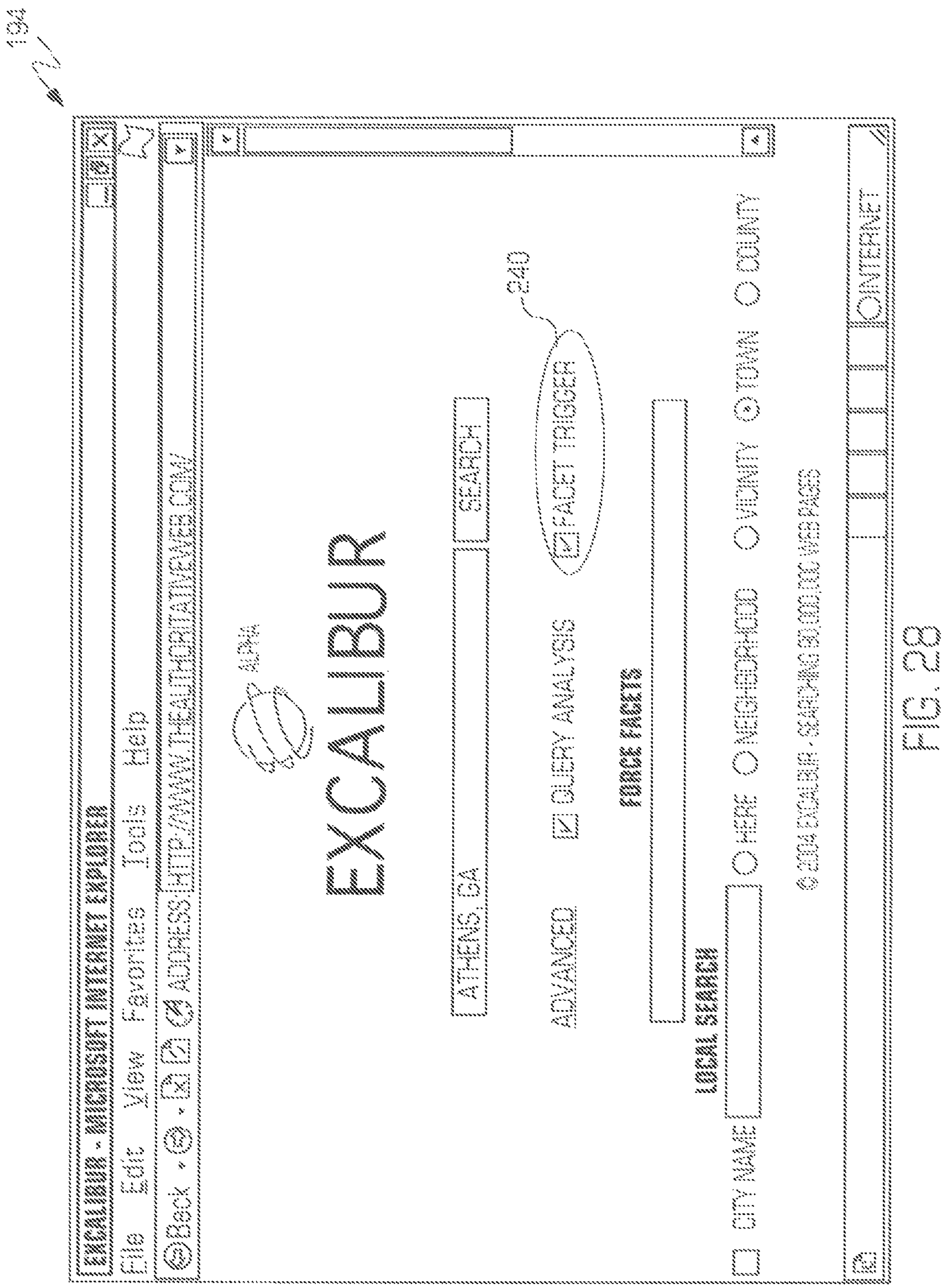
FIG. 28 is an example of the query user interface with the facet trigger selected.
Figure 29:
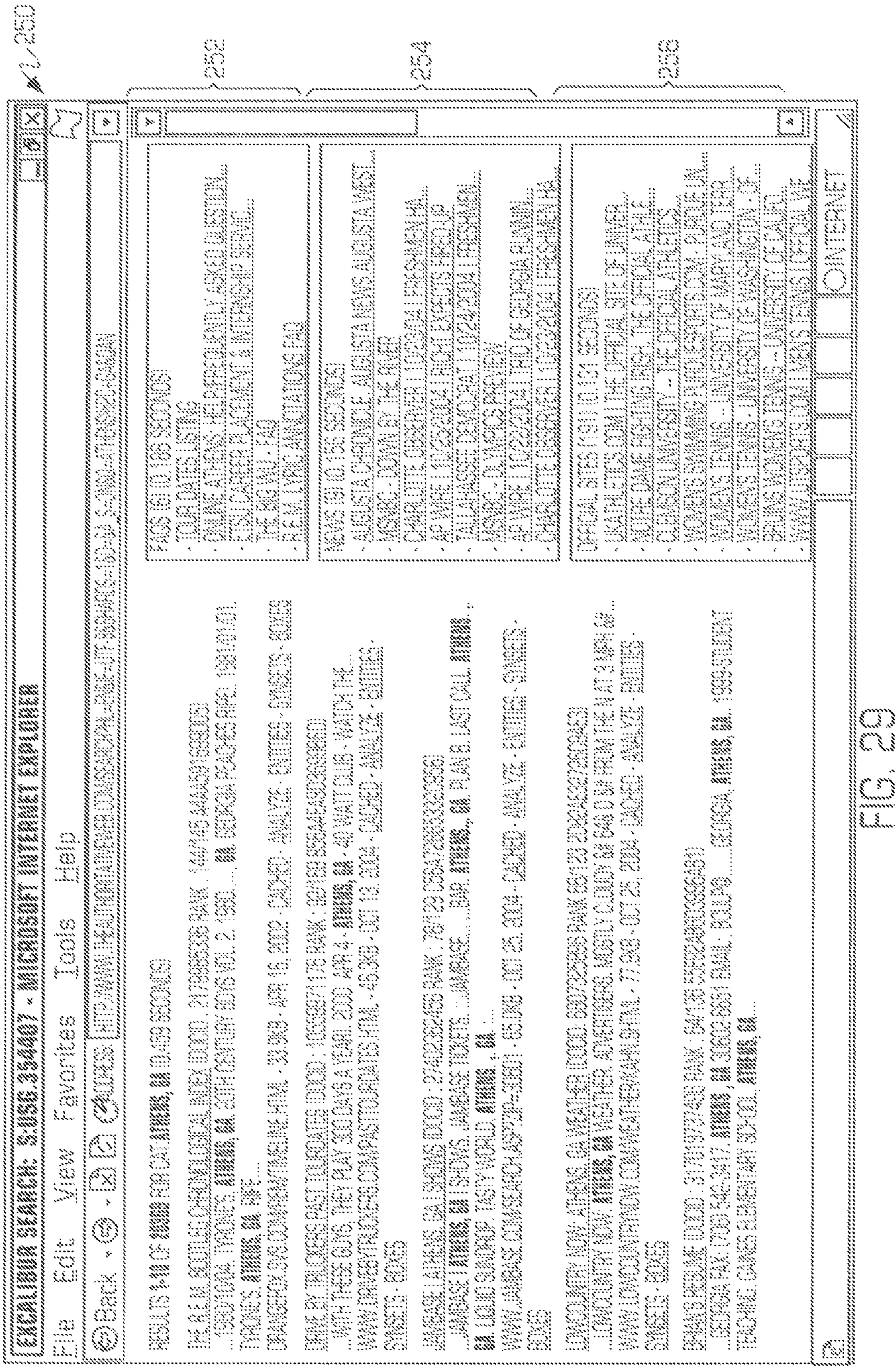
FIG. 29 is an example of the search results from the query shown in FIG. 28.

FIG. 28 is an example of the query user interface 194 with a facet trigger 240 selected to perform the query "Athens, Ga." FIG. 29 is an example of a user interface 250 with search results from the query shown in FIG. 28. This user interface contains one or more facets associated with the returned documents such as a FAQs facet 252, a news facet 254 and an official site facet 256 in this example. Also note that the document identified in FIG. 27 (www.ukathletics.com) is listed in the "Official Sites" Facet. In accordance with the invention, the documents displayed within a particular Facet have been designated by the search system as belonging to that Facet. The power of these facets is that they permit the search system to filter results into groups of similar documents. In contrast, other search engines are limited to returning a single, monolithic results list with documents of all sorts mixed together. The faceting in accordance with the invention has facets which are pre-defined, and the definitions are created with purpose to be meaningful to the query at hand. These are known as "facet ontologies" which will now be described in more detail.

Figure 30:
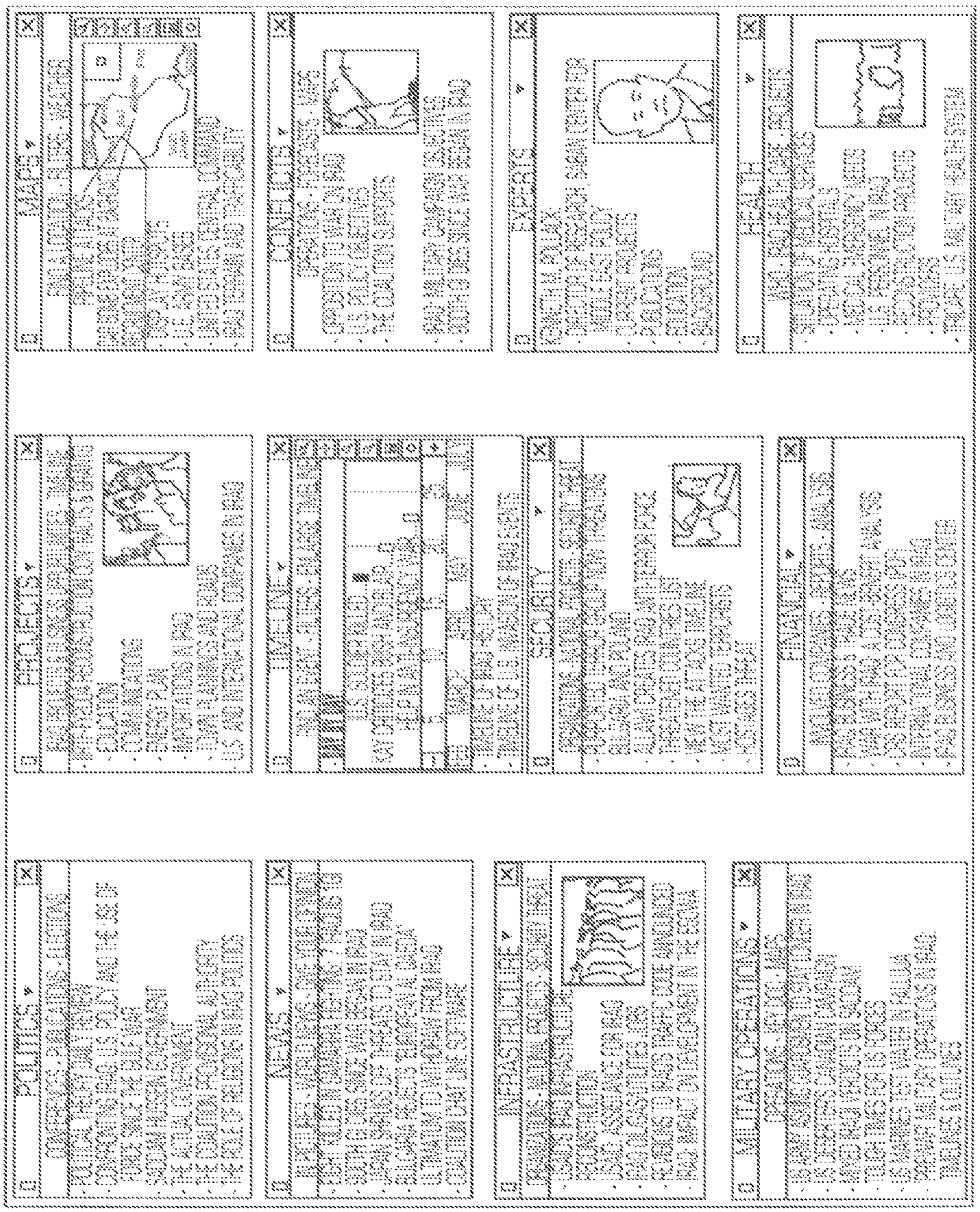
FIG. 30 illustrates one or more prebuilt facets in accordance with the invention.
Figure 31:
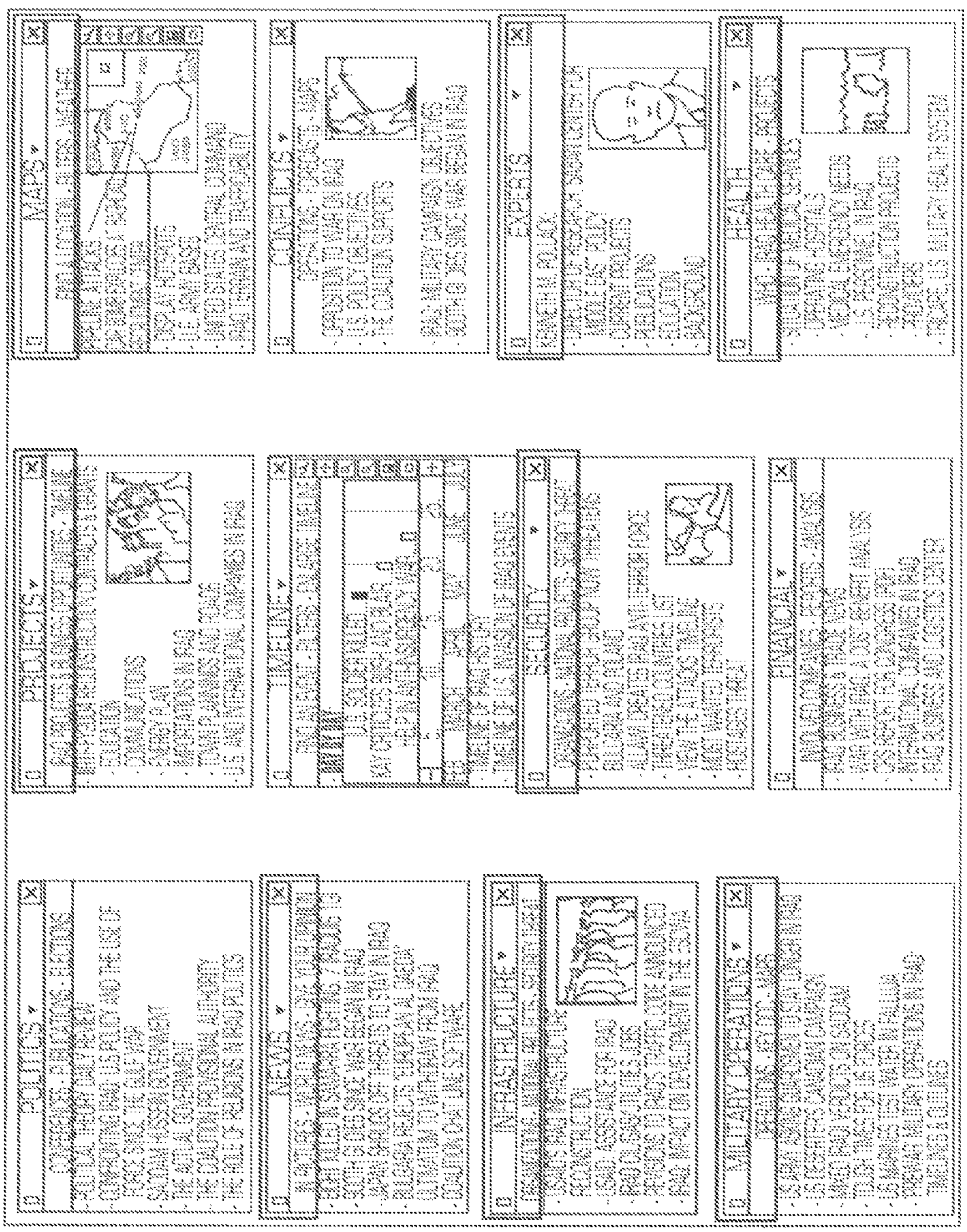
FIG. 31 illustrates an example of the facets for a geopolitics ontology.
Figure 32:
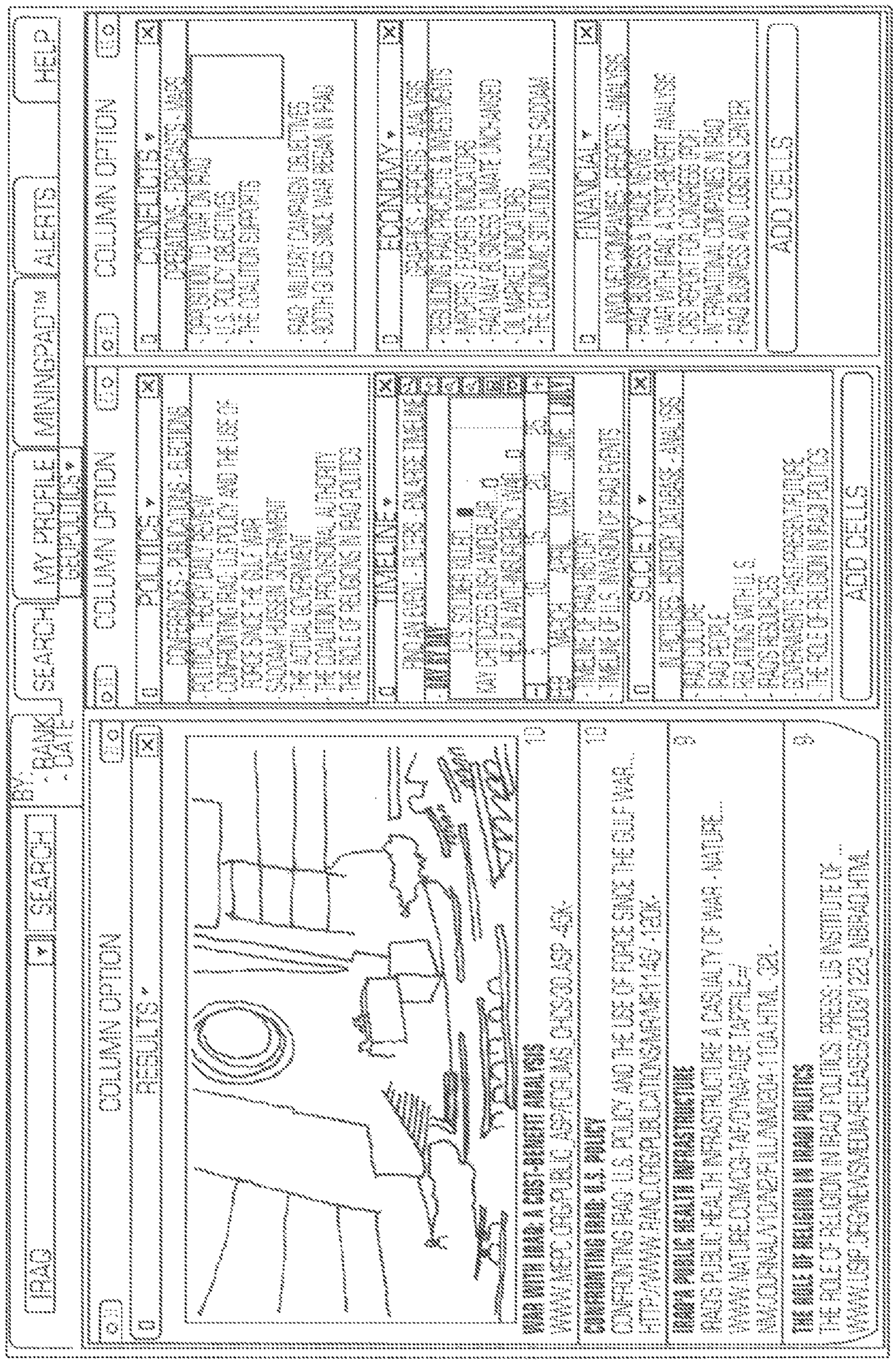
FIG. 32 illustrates an example of the search results using the geopolitics ontology and facets.
Figure 33:
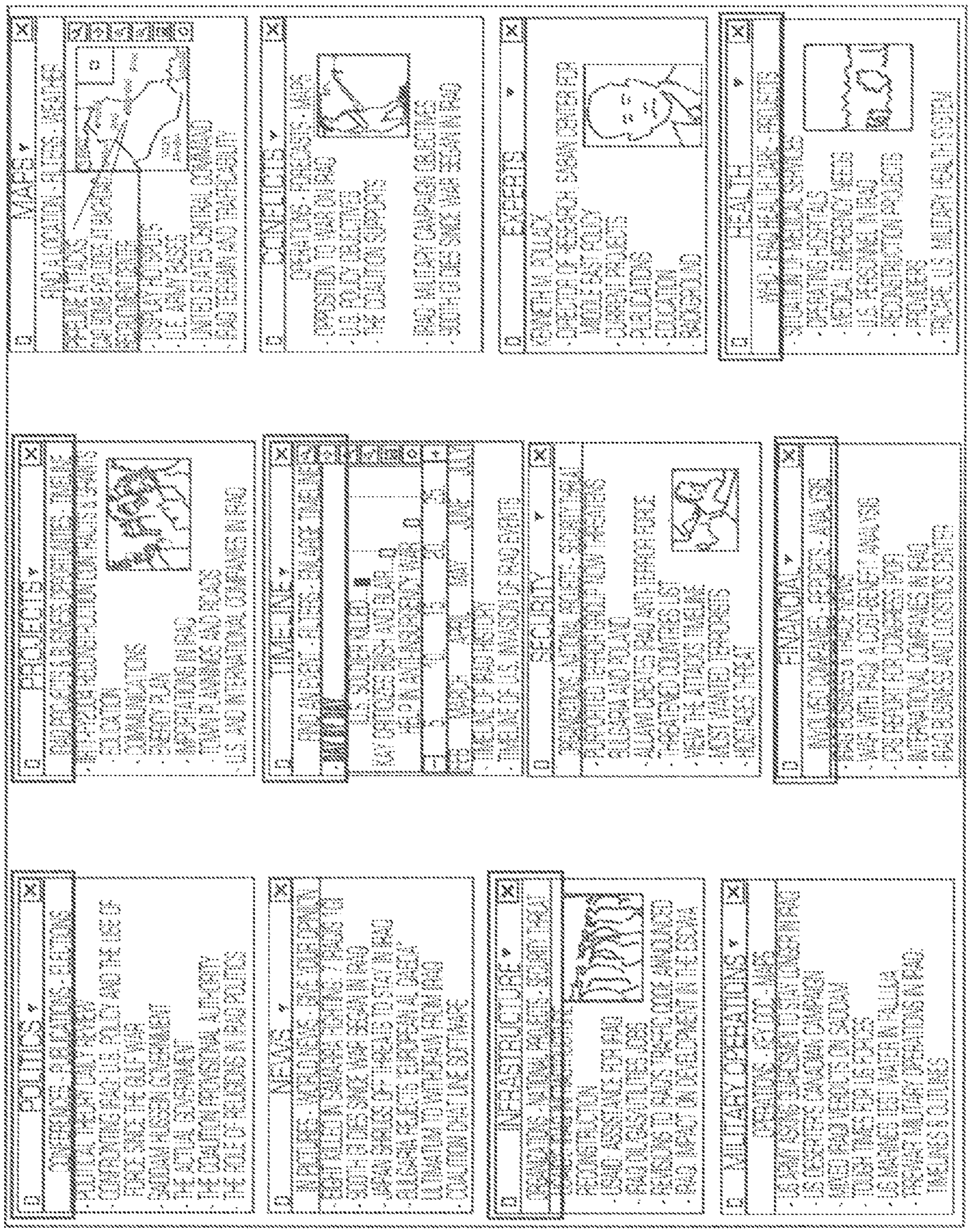
FIG. 33 illustrates an example of the facets for a military ontology.
Figure 34:
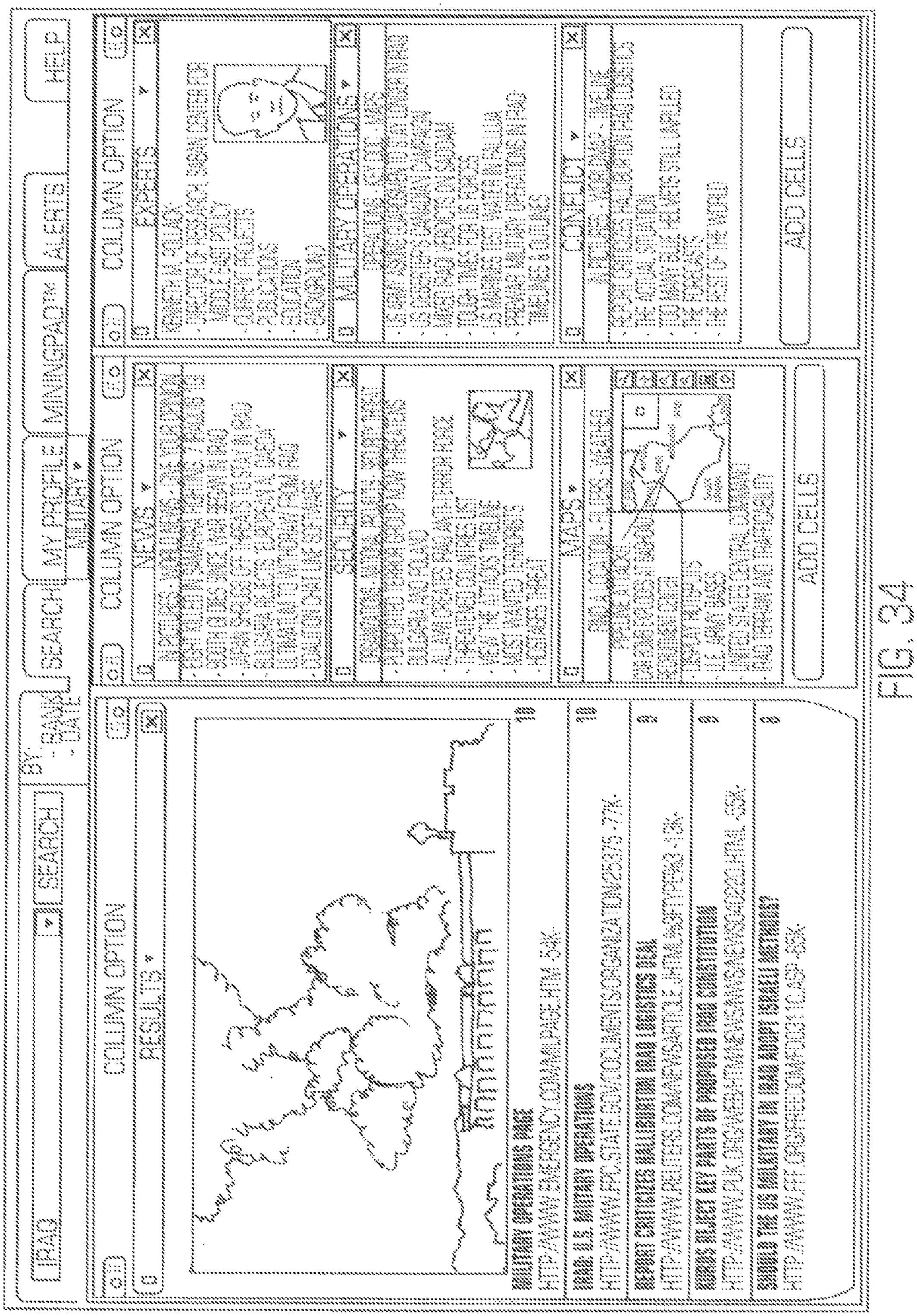
FIG. 34 illustrates an example of the search results using the military ontology and facets.
Figure 35:
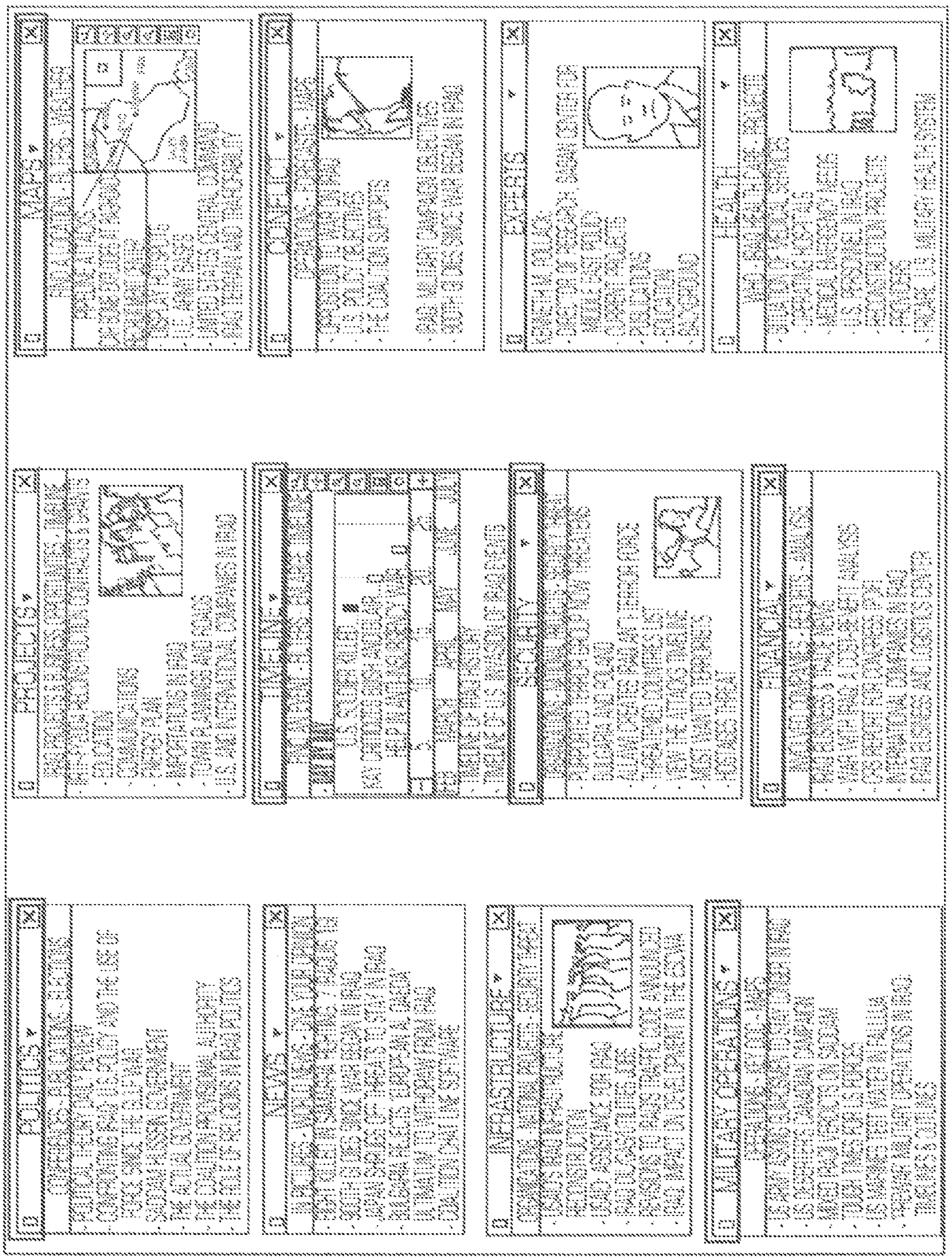
FIG. 35 illustrates an example of the facets for a logistics ontology.
Figure 36:
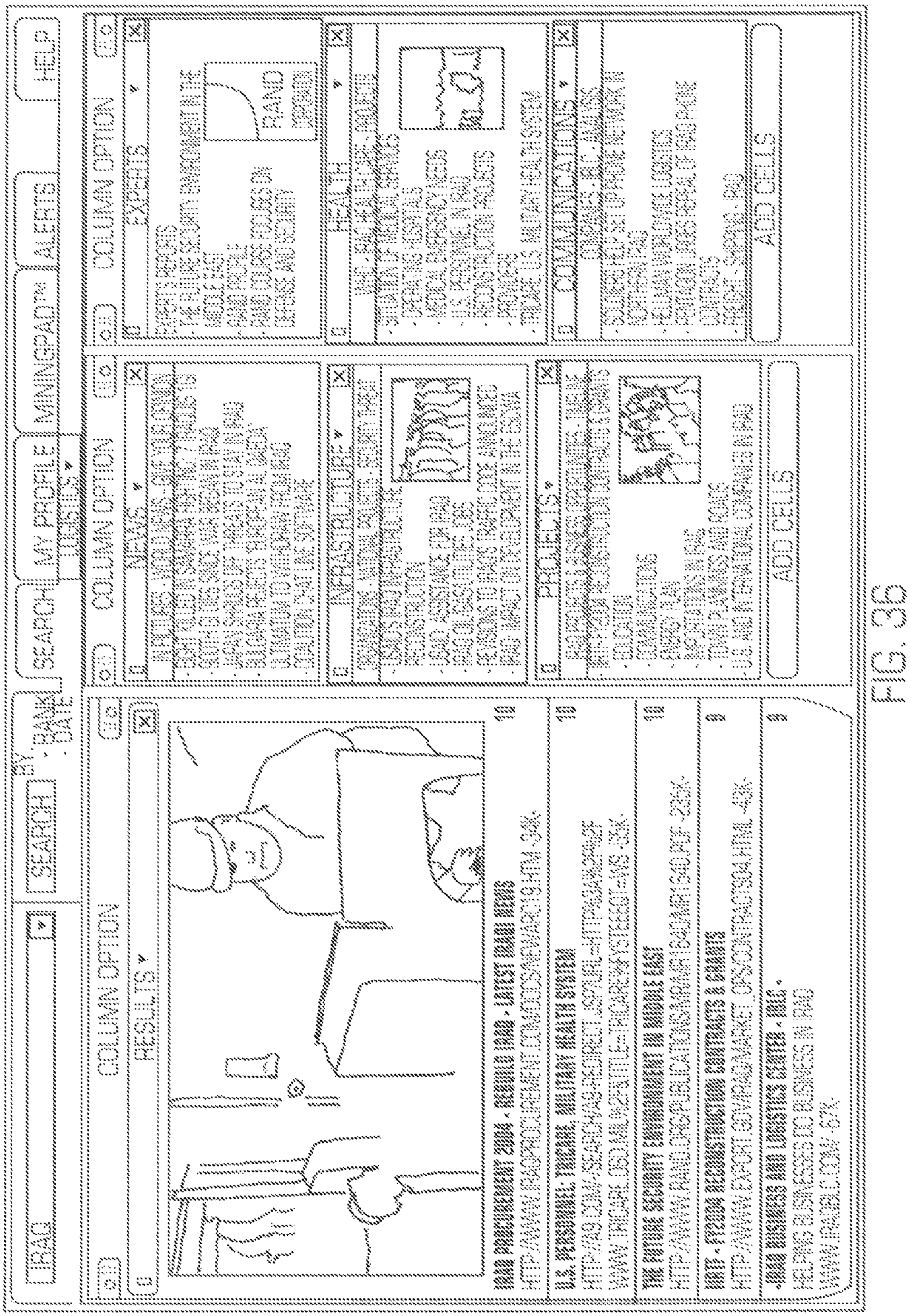
FIG. 36 illustrates an example of the search results using the logistics ontology and facets.

The facet ontologies are used during the query step 108 (shown in FIG. 3), but are described here. FIG. 30 illustrates the graphical display of one or more prebuilt facets in accordance with the invention. The invention however is not limited to the number of facets or actual facets shown in FIG. 30. In the example in FIG. 30, the prebuilt facets may include a politics facet, a news facet, an infrastructure facet, a military operations facet, a projects facet, a timeline facet, a security facet, a financial facet, a map facet, a conflicts facet, an experts facet and a health facet. FIG. 31 illustrates an example of the facets for a geopolitics ontology (shown in FIG. 18A above) and FIG. 32 illustrates an example of the search results using the geopolitics ontology and facets. FIG. 33 illustrates an example of the facets for a military ontology (shown in FIG. 18B above) and FIG. 34 illustrates an example of the search results using the military ontology and facets. Similarly, FIG. 35 illustrates an example of the facets for a logistics ontology (shown in FIG. 18C above) and FIG. 36 illustrates an example of the search results using the logistics ontology and facets. Note that the facets for each different ontology vary depending on the profile and associated onotology selected by the user.

Figure 37:
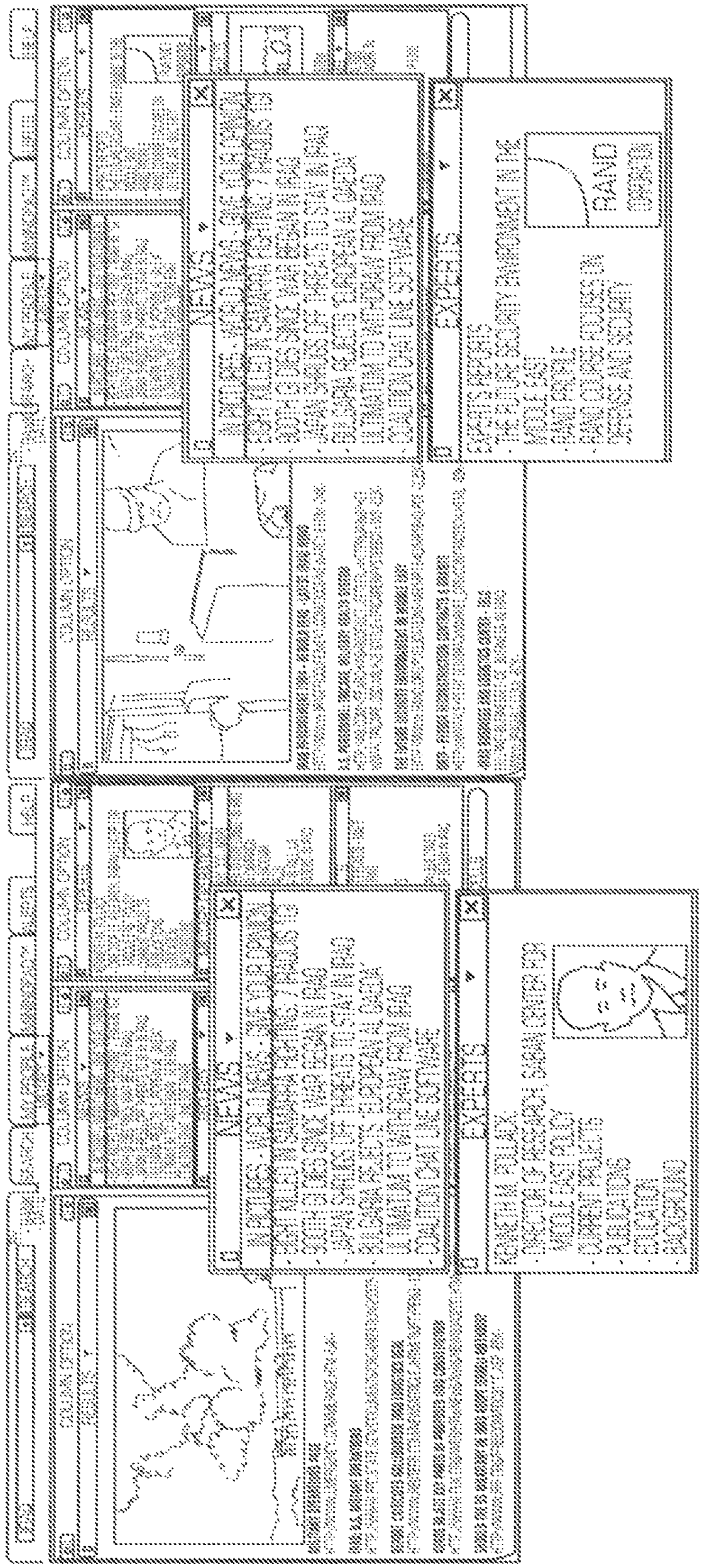
FIG. 37 illustrates the same facets with different contexts in accordance with the invention.

FIG. 37 illustrates the same facets in accordance with the invention with different contexts in accordance with the invention. Thus, as shown, the expert facet for the military ontology shown on the left side of the figure has different information than the expert facet for the military ontology shown on the right side of the figure. Thus, the facets and facet ontologies permit the user to select his area of interest (the ontology) and then the search system generates a display that displays facets according to the ontology selected by the user so that the user is provided with a more comprehensive search results in accordance with the invention.

Figure 38:
FIG. 38 is an example of a search results page that includes one or more facets in accordance with the invention.

FIG. 38 is an example of a search results page that includes one or more facets in accordance with the invention. In particular, this search results page includes the Conflict, Events and History facets shown along the right side of the interface. The query was "immigration" and "homeland security" so that the facets shown are relevant to the query. In accordance with the invention, the decision to display these facets and not others was accomplished by the facet ontology that was defined for the taxonomic categories present in the query.

Figure 39:
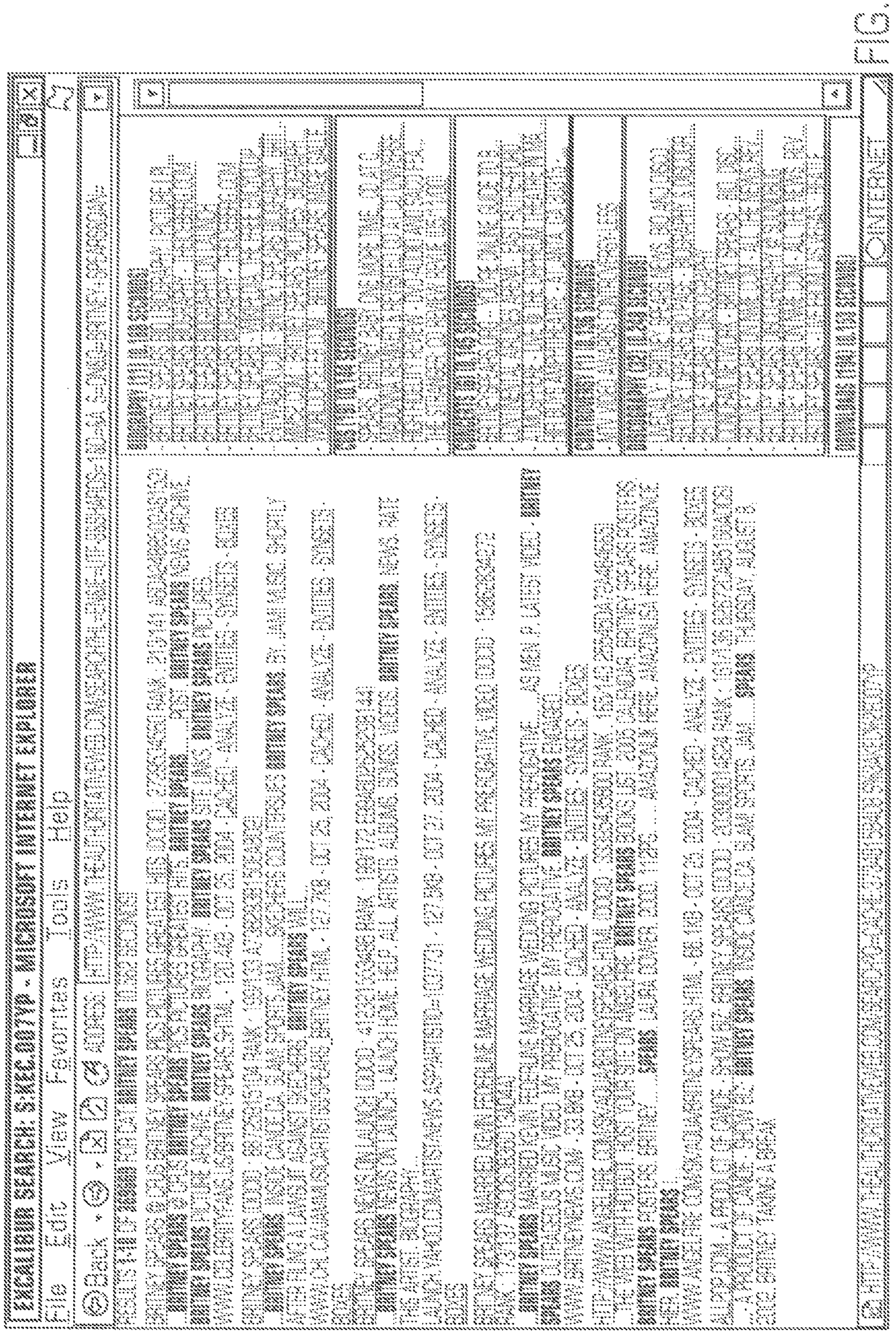
FIG. 39 is another example of a search results page that includes one or more facets in accordance with the invention based on the query.

FIG. 39 is another example of a search results page that includes one or more facets in accordance with the invention based on the query. In this example, the query was "Britney Spears" and the facets displayed along the right side of the results (biography, CDs, concerts, controversy, discography and downloads) are appropriate because Britney Spears is a person (Biography), a celebrity (Gossip, Photo Gallery, Fan Clubs), a music artist (CDs, Downloads, Reviews). In accordance with the invention, the documents containing information about Britney Spears have associated with them these facets.

Figure 40:
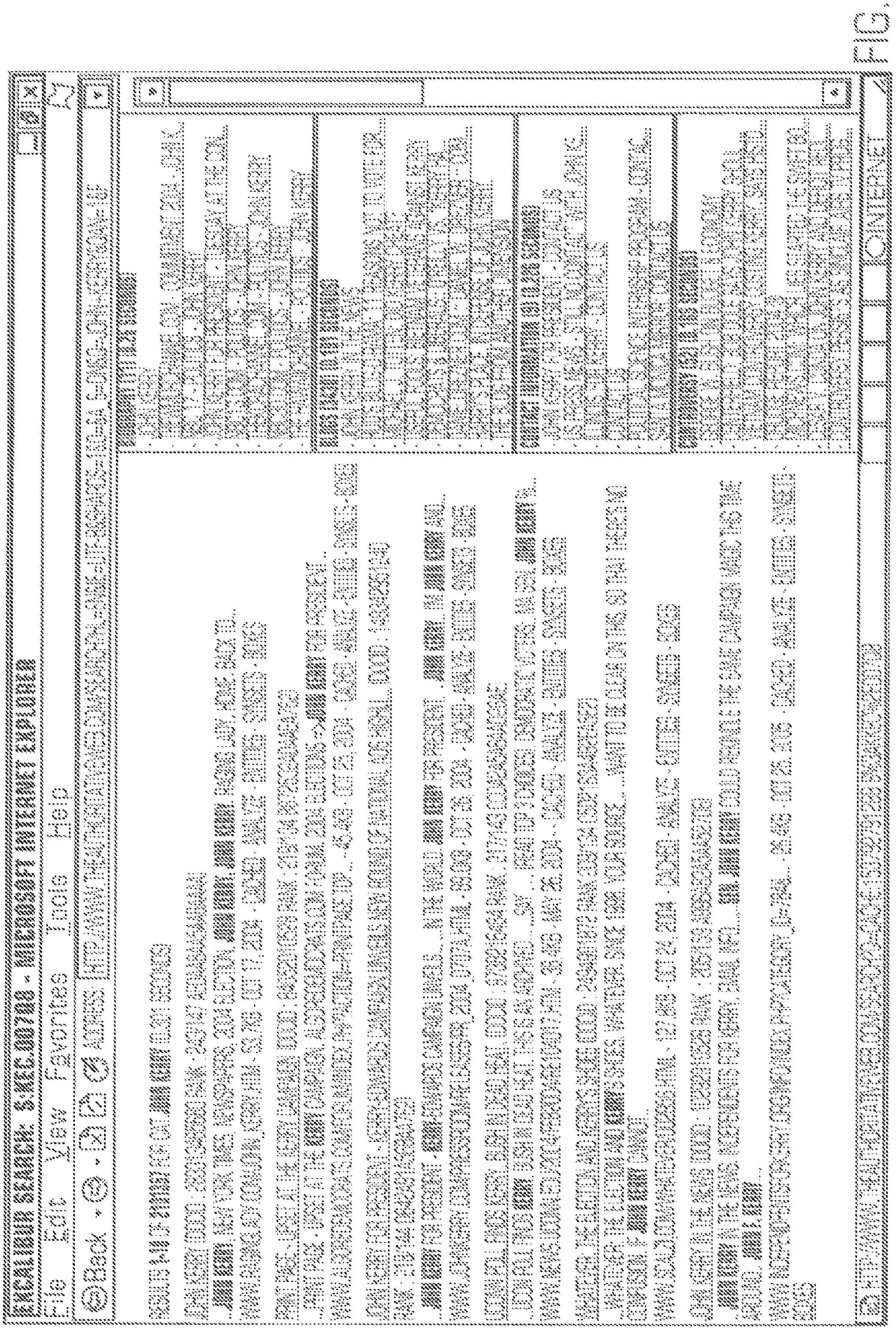
FIG. 40 is another example of a search results page that includes one or more facets in accordance with the invention based on the query.

FIG. 40 is another example of a search results page that includes one or more facets in accordance with the invention based on the query. In this case, the query is "John Kerry" so that a different set of facets is displayed. In particular, he is a person, so Biography is present again, but now there are facets that reflect the fact that he is a politician (e.g. Poll Results which is not shown in FIG. 40). Thus, depending of the query and the ontology applicable for the query, different facets will be displayed to the user.

If a query is performed that mixes both these individuals, such as "John Kerry OR Britney Spears", the displayed facets would cover both of these individuals including some facets that would not be displayed when "Kerry" is queried (e.g. Downloads). For such a mixed query, the documents in each facet come from the overall results list, so they all contain reference to both Kerry and Britney. In accordance with the invention, if no facet ontology is defined for a particular query, the search system will fall back on a small set of default facets and check to see if any of the search results belong to them (such as FAQs, News, Official Sites and Shopping in a preferred embodiment).

Figure 41:
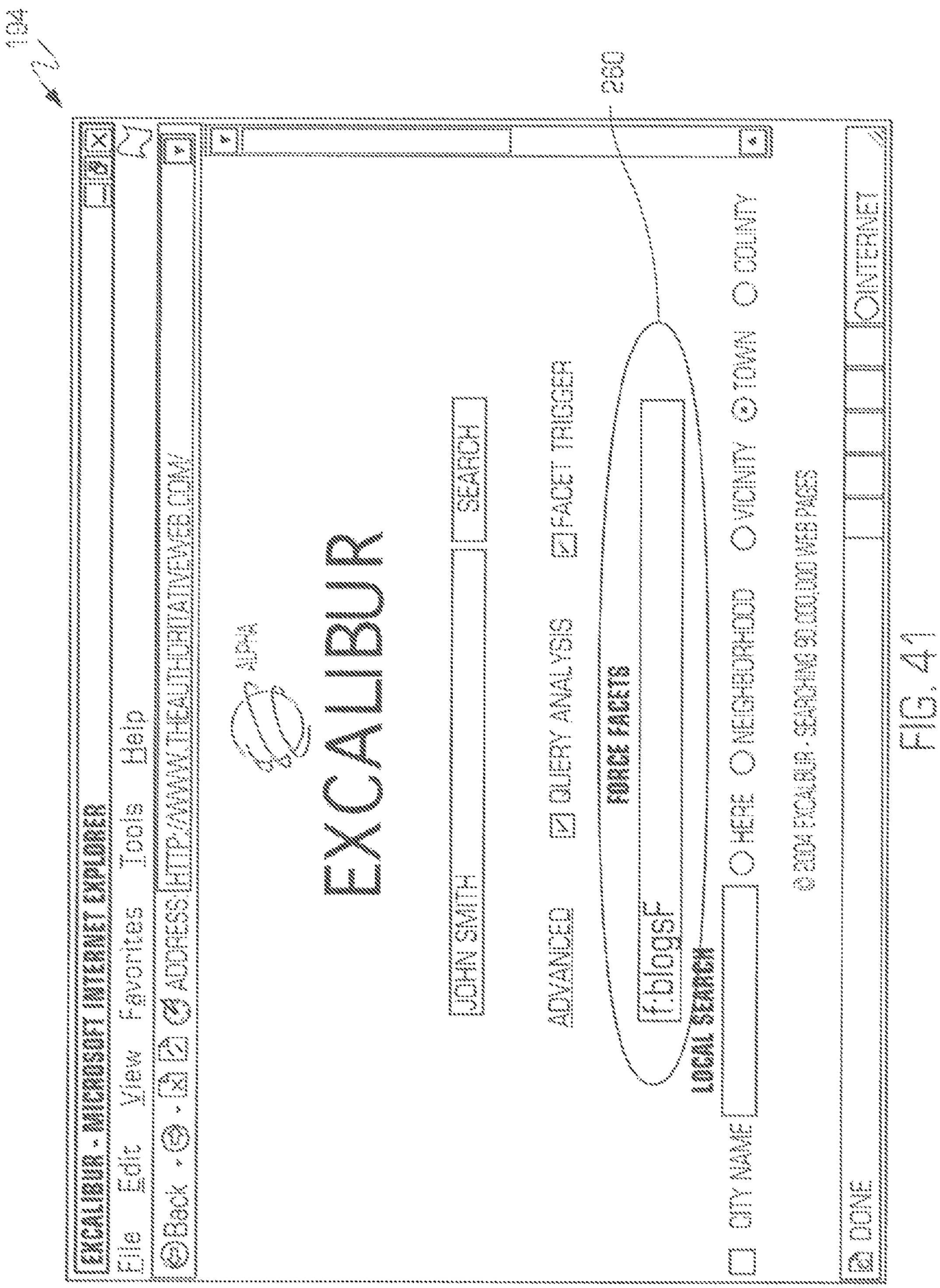
FIG. 41 illustrates an example of the search user interface in which a particular facet is forced.
Figure 42:
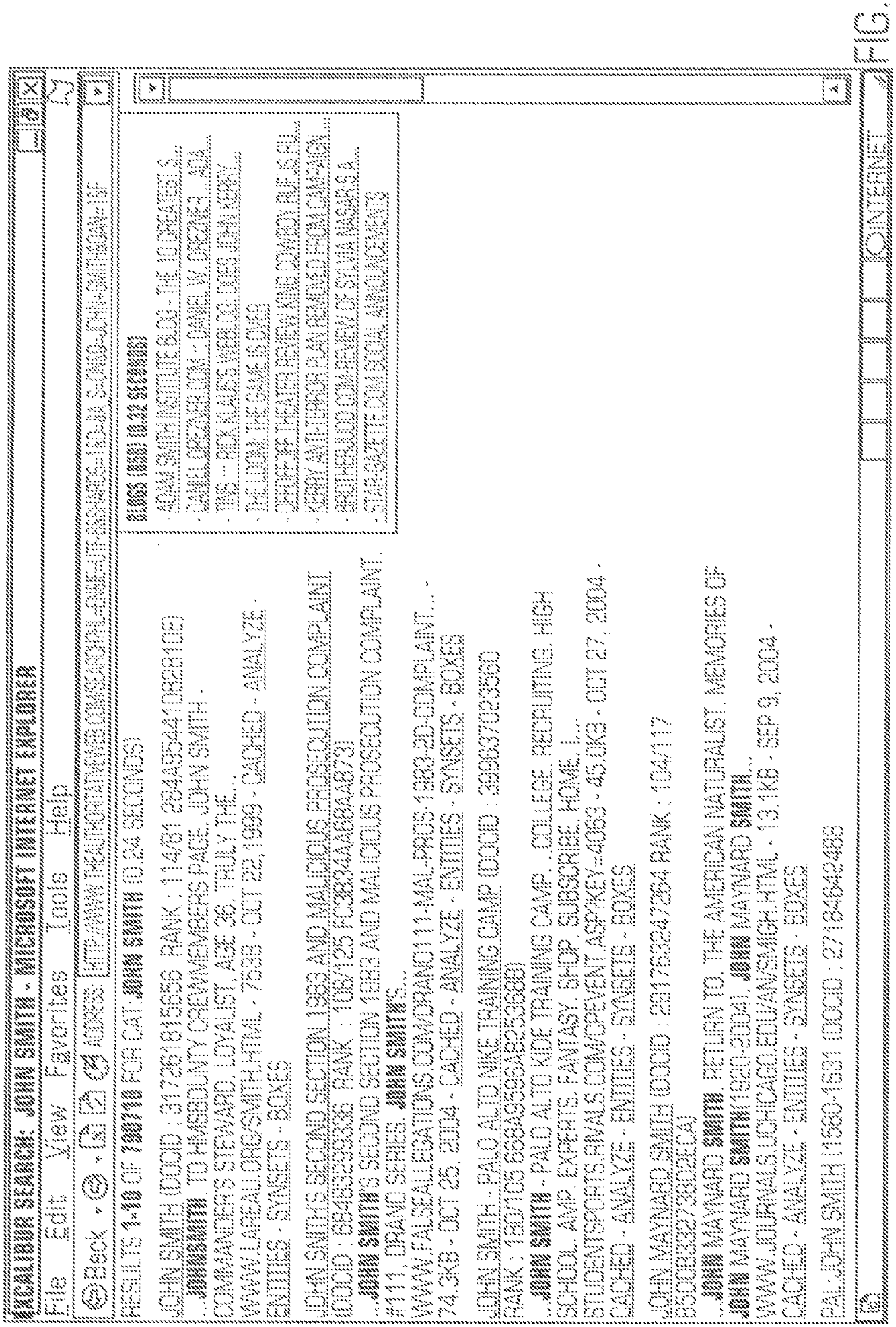
FIG. 42 illustrates an example of the search results generated based on the forced facet shown in FIG. 41.

In accordance with the invention, it is also possible to request a particular facet be displayed for a particular query. For example, a query for "John Smith" results in the default facets being displayed since the system does not have any facets associated with John Smith. FIG. 41 illustrates an example of the search user interface 194 in which a particular facet is selected 260. Thus, the user tells the search system that the user wants the Blogs Facet to be shown (enter "f:blogsF" in the Force Facets field) and query again for [John Smith] as shown in FIG. 41. FIG. 42 illustrates an example of the search results generated based on the forced facet shown in FIG. 41 in which the Blogs Facet is now displayed. Thus the user is not restricted to seeing only the facets previously designated in the ontology.

During the indexing, the search system also determines the authority for a document. The authority attempts to classify the pieces of content since, in the case of web pages for example, all web pages are not created equal. In particular, some are created by young children ("This is my first web page. Do you like it? I hope you do."), while others may come from a more trusted source (e.g. a well-researched academic paper authored by a recognized subject expert). As shown in FIG. 27, each piece of content has an authority score associated with it so that each piece of content may be ranked according to the authority score. In accordance with the invention, all other things being equal, the highest-quality documents will be presented ahead of others. Ultimately, the authority calculation will take into consideration many things including the author's reputation, the reliability of the source of the document, how well it is written, the taxonomic depth and breadth, and other parameters. A document that has high scores in a majority of these areas will likely be an authoritative document that the user should see and not have to dig through pages of search results to locate. In accordance with the invention, each document is put through the above-described indexing steps that will result in the search system providing better search results in response to a query. The querying process of the search system in accordance with the invention will now be described in more detail.

Figure 43:
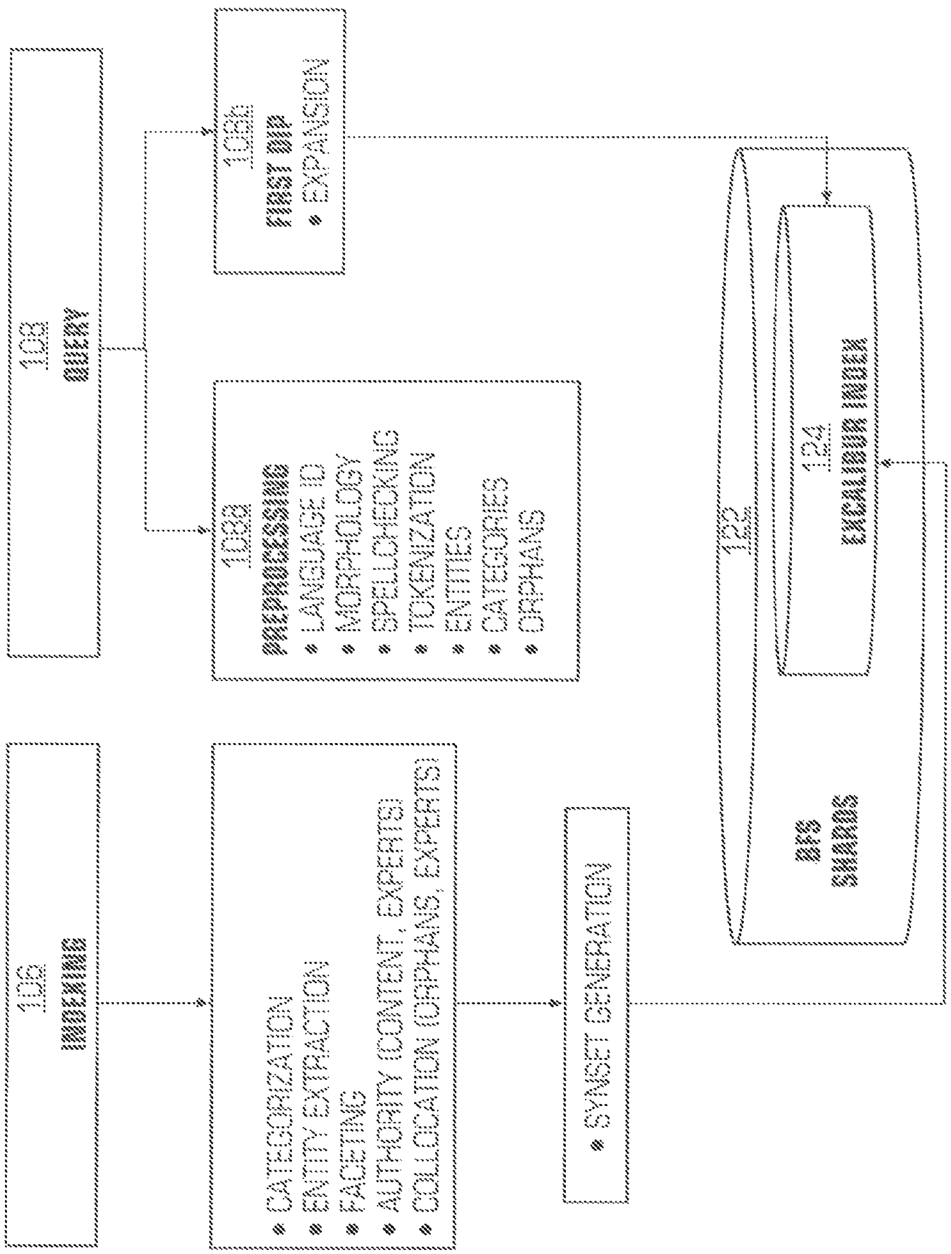
FIG. 43 illustrates more details of an example of a preferred embodiment of the query method in accordance with the invention.

FIG. 43 shows the indexing step 106 as described above and the query step 108. The query step occurs once a query has been entered into the search system and involves one or more different processes including a preprocessing step 108*a* and a first dip step 108*b* as shown. The query step includes one or more processes: query preprocessing and double-dip (first dip and second dip) as described below and shown in FIGS. 43, 45 and 46.

During the preprocessing steps 108*a*, the language of the query is determined (to determine how to properly interpret the query based on the identified language using one or more different language knowledge modules associated with the system), the morphology of the query is determined (the format of the query), spell checking is performed on the query, tokenization is performed, entities within the query are determined, categories of the query are determined and orphan words in the query are identified. Each of these preprocessing sub-steps permit the search system to generate a result list for the query based on the information contained in the database 122 and the index 124.

During the morphology determination step, the search system analyzes the query terms including any Boolean terms. FIG. 44 illustrates several examples of the Boolean-based queries that may be used with the search system. The search system permits Boolean queries including AND, OR, and NOT operators. As additional examples, a query about documents discussing how the Patriot Act affects Homeland Security would be: Query for "homeland security AND patriot act". A query for documents relating to Homeland Security independent of the Patriot Act would be: Query for "homeland security AND NOT patriot act". If one would like to include documents about immigration policy into the mix: Query for "homeland security AND NOT patriot act OR immigration policy". The search system also permits parentheses to be used in the queries. For example, to make sure the previous query is interpreted as intended, add parentheses: Query for [(homeland security AND NOT patriot act) OR immigration policy].

The first dip step involves expansion of the query (using the synsets, taxonomies, etc.) and is described in more detail below with reference to FIG. 46. In a preferred embodiment, the first dip query processing makes use of the document index to make a (probabilistic) determination as to the context of the query and determine the most specific, least ambiguous search results that can be provided. The first dip helps determine the quantity and quality of results that could be a potential match for the alternative interpretations of query in it's various ontological contexts as described above.

Figure 45:
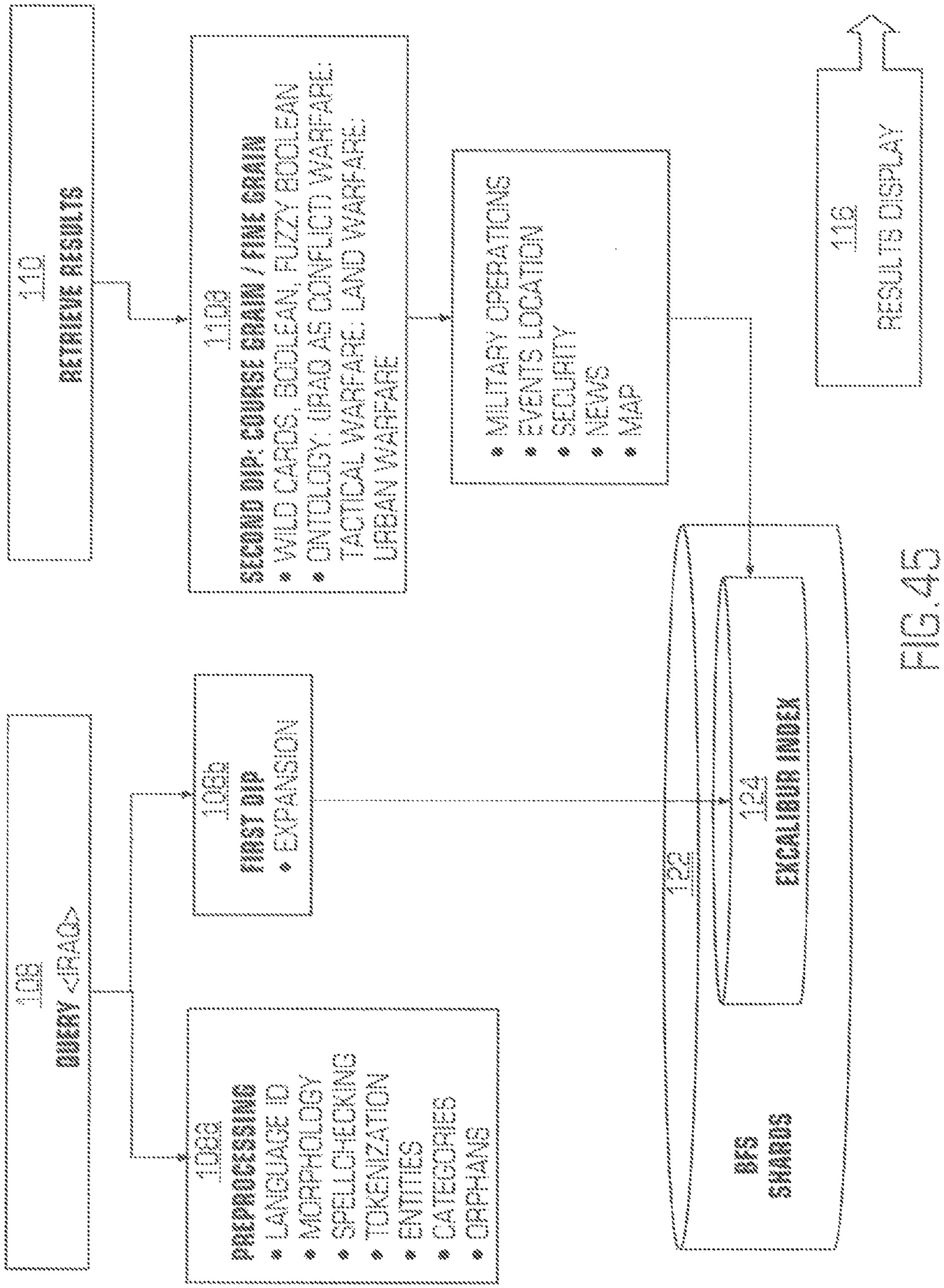
FIG. 45 illustrates further details of an example of a preferred embodiment of the retrieve method in accordance with the invention.

FIG. 45 illustrates further details of an example of a preferred embodiment of the retrieve method 110 in accordance with the invention. In particular, the retrieval step 110 may include a second dip step 110*a* (that is described in more detail below with reference to FIG. 46.) In the second dip step, coarse and fine grain retrieval of search results in performed. The step may involve using wild cards, Boolean and fuzzy Boolean logic to further expand the query and using ontologies to further refine the search and provide results to the user that are indexed against a facet (such as the facets military operations, events location, security, news and maps in the example in FIG. 45) which is also a facet for the query terms. In the example shown in FIG. 45 with the query "Iraq", the ontology of the query term is shown. Based on this ontology, particular facets are shown as shown above in FIGS. 32, 34 and 36.

Figure 46:
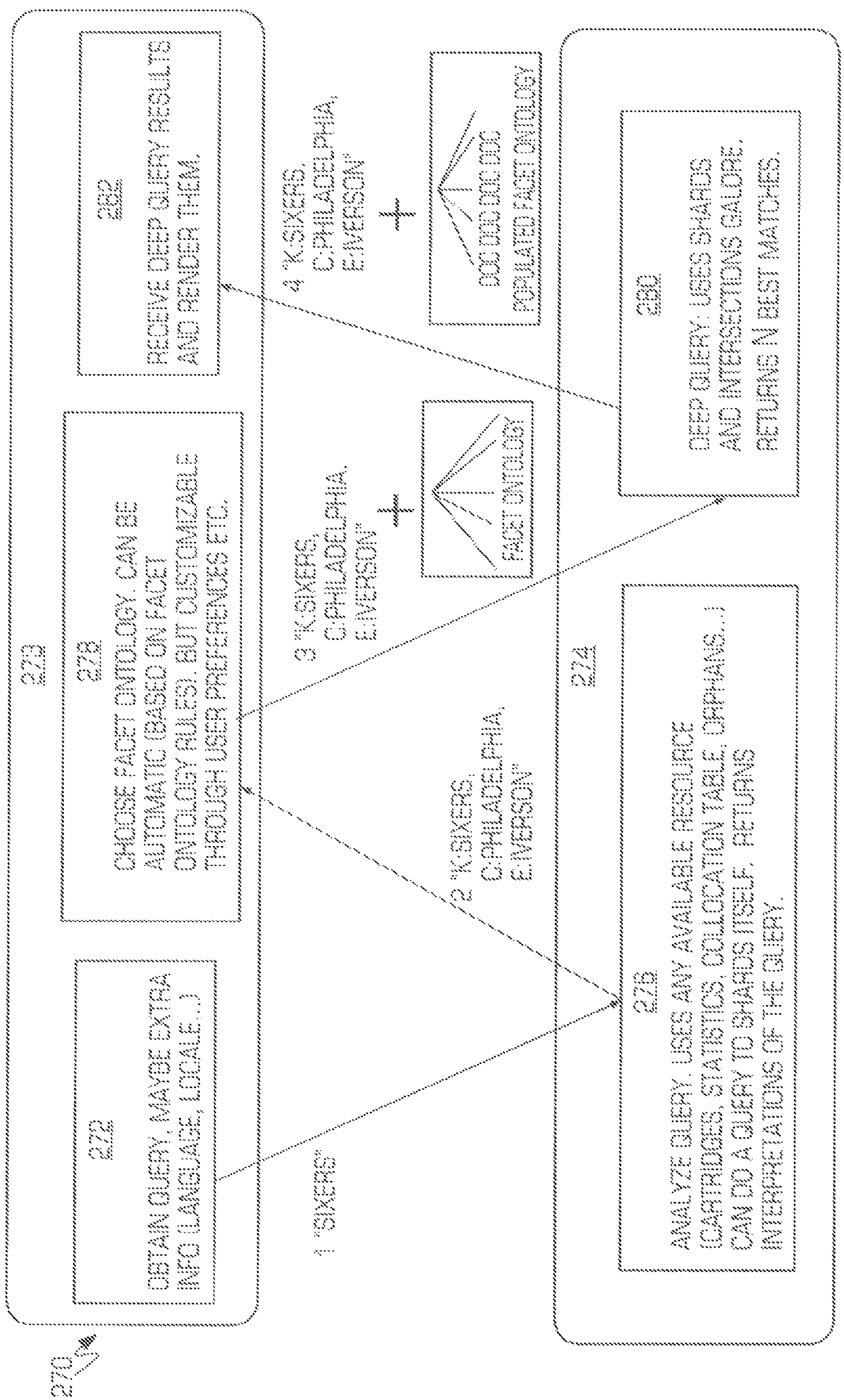
FIG. 46 illustrates further details of an example of a double dip query and retrieval method in accordance with the invention.

FIG. 46 illustrates further details of an example of a double dip query and retrieval method 270 in accordance with the invention which includes the first dip step and the second dip step shown in FIG. 45. During the double dip method, a query ("sixers" is this example) is obtained in step 272. In a preferred embodiment, the query user interface may be provided to the user in a browser window using Java code which is provided by a J2EE/portal 273. The query term is forwarded (over the Internet, intranet or other communications network) into the search system engine 274 which may be one or more pieces of software running on a server computer. In step 276, the query is analyzed and expanded using available resources including taxonomies, entities, statistics, collocation tables, orphans, synset expansion and taxonomy expansion. The search system then returns an interpretation of the query such as athletic team is "Sixers", an associated city entity is "Philadelphia" and an associate celebrity is "Iverson." The portal 273, in step 278, chooses a facet ontology to apply to the interpreted query. The selection of the facet ontology may be automatic (based on facet ontology rules), but customizable by the user and his preferences as described above. Then, the portal forwards the interpreted query and the selected facet ontology onto the engine 274. The engine 274, in step 280, uses the interpreted query and facet ontology to perform a deep query and returns the "n" best matches. The engine 274 then returns the query terms and the populated facet ontology to the portal 273 which, in step 282, graphically renders the search results and displays the results to the user as described and shown above. Using this double dip process, a more comprehensive search is performed with the search system than would be performed with typical search systems.

Figure 47:
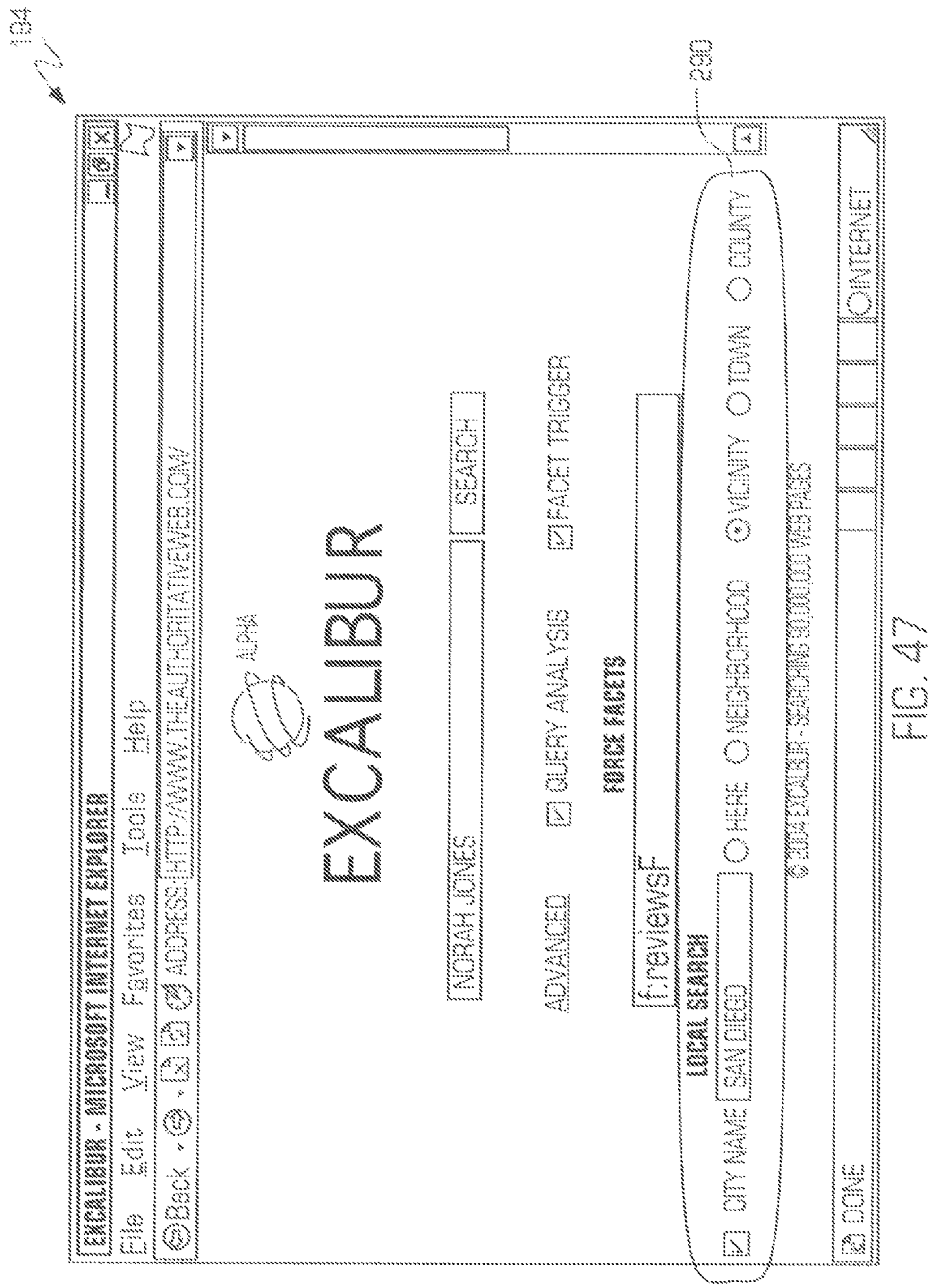
FIG. 47 illustrates the query user interface that permits localization in accordance with the invention.
Figure 48:
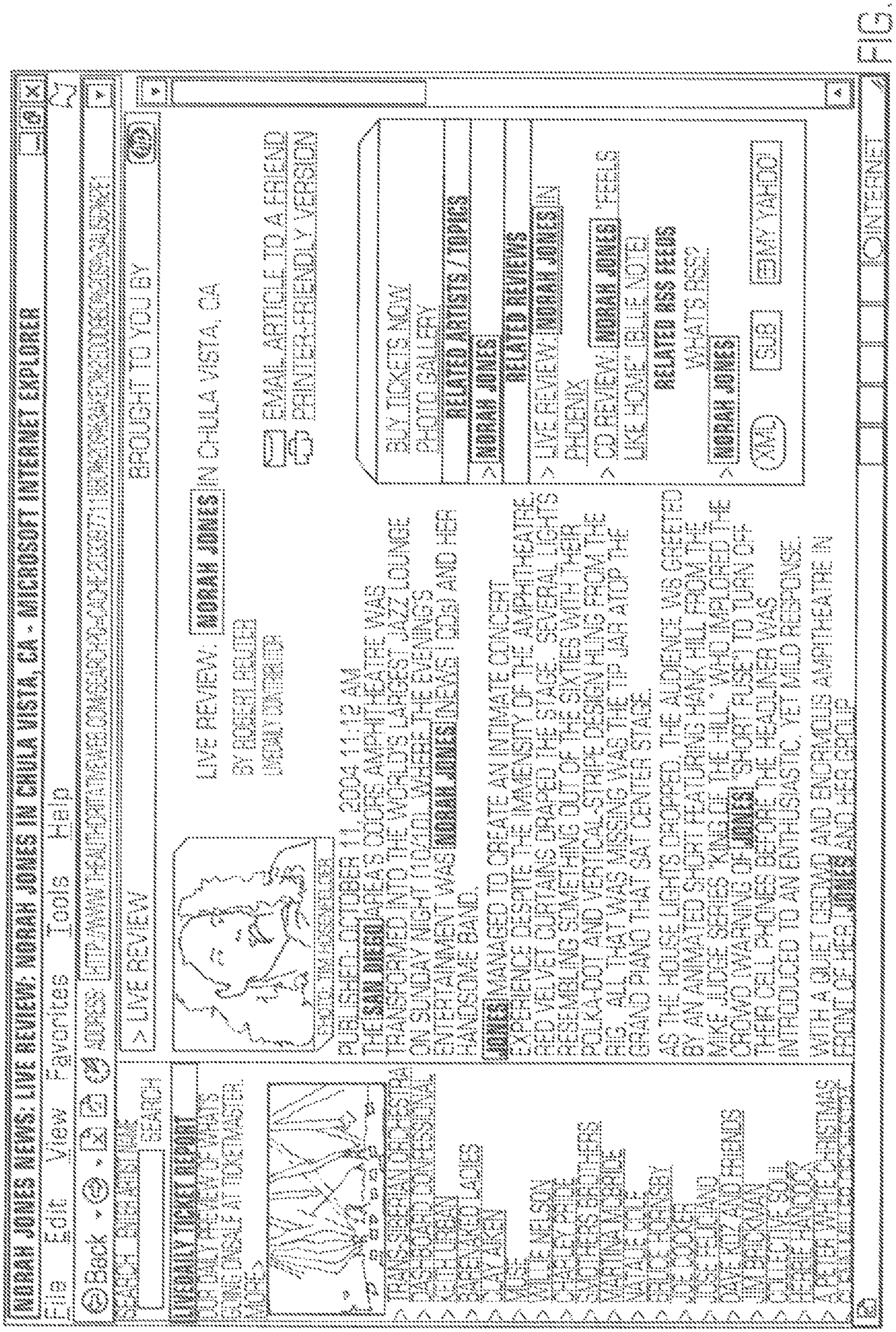
FIG. 48 is an example of a piece of content retrieved using the query shown in FIG. 47.

FIG. 47 illustrates the query user interface 194 that permits localization in accordance with the invention. In particular, the query user interface includes a localization portion 290 that permits the user to specify a particular location for the search results. The level of localization (here, neighborhood, vicinity, town or county) may be adjusted based on the user preferences. For example, the user wants to see the review facet and enters "f:reviewsF" in the Force Facets field as described above. Then, the user can specify search results that mention either San Diego or some location in its vicinity and this is done by enabling the Local Search option, entering San Diego as the city name and choosing the Vicinity option as shown in FIG. 47. Then, when the query of "Norah Jones" is entered into the system, FIG. 48 illustrates an example of a piece of content returned to the user which is a review of a Norah Jones show in Chula Vista which is in the vicinity of San Diego.

Figure 49:
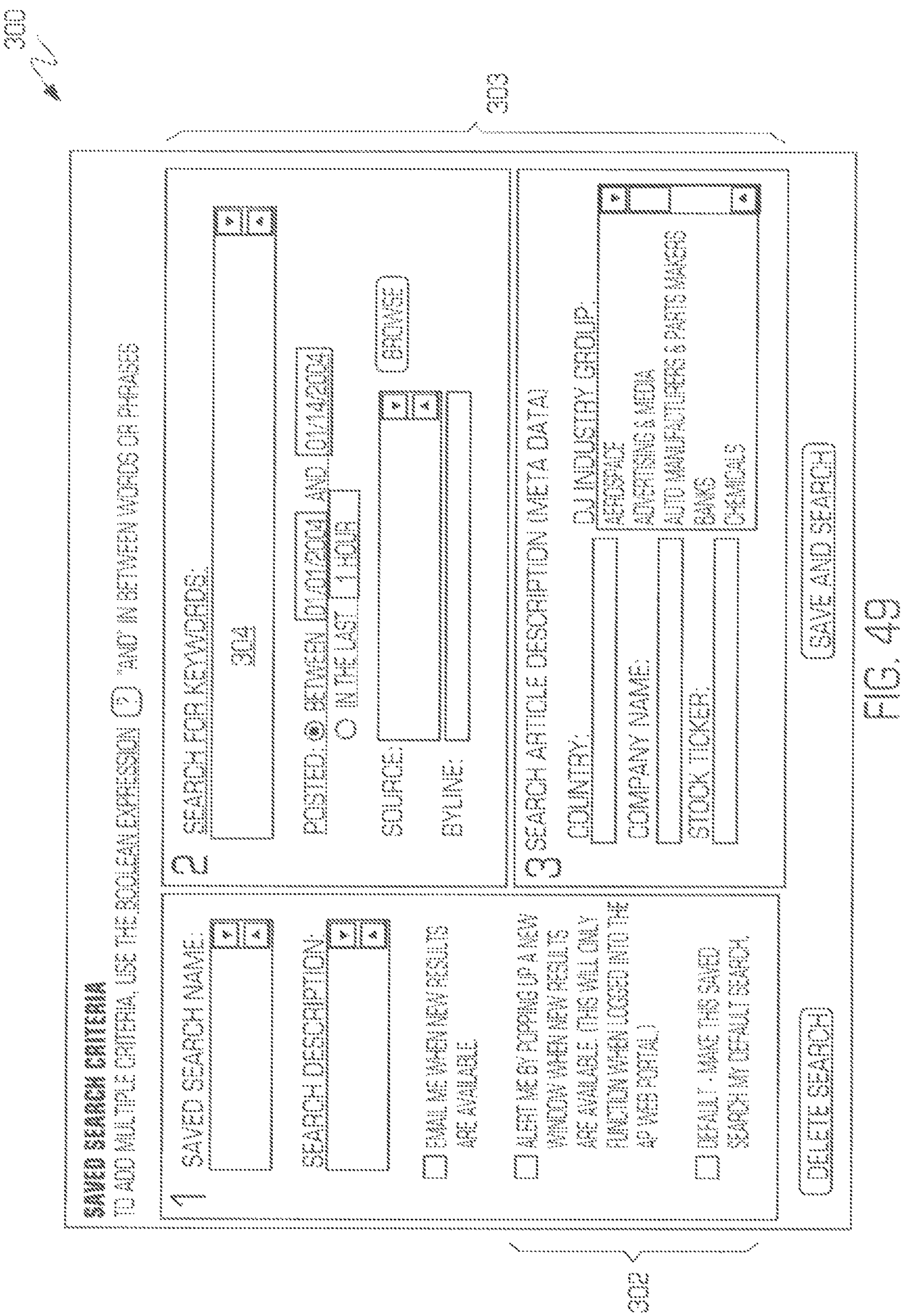
FIG. 49 illustrates more details of the alerts tab shown in FIG. 2.

FIG. 49 illustrates more details of the alerts tab shown in FIG. 2. In particular, the search system user interface 58 shown in FIG. 2 has the alerts tab 57*b* which may be selected by the user. When the user selects the alerts tab 57*b*, a user interface 300 is presented to the user. The alerts user interface permits the user to save one or more search criteria and those searches are automatically performed of a periodic basis. The saved search criteria may be saved under a particular search name and may include a description of the search. The user interface also permits the user to specify in a portion 302 how any new search results for each search criteria are going to be communicated to the user. For example, the user may specify email or an alert with a pop-up window. The user may also specify one of the searches as the default search. The decision about the delivery of the search results and whether it is a default then appear on the user interface shown in FIG. 50. A second portion 303 of the user interface permits the user to specify the search criteria including an area 304 to specify the keywords to be searched. The user may also specify a time period for the search and any particular sources or byline for the search. The user interface also permits the user to specify more specific details such as the country, company name, stock ticker or industry group of the search.

Figure 50:
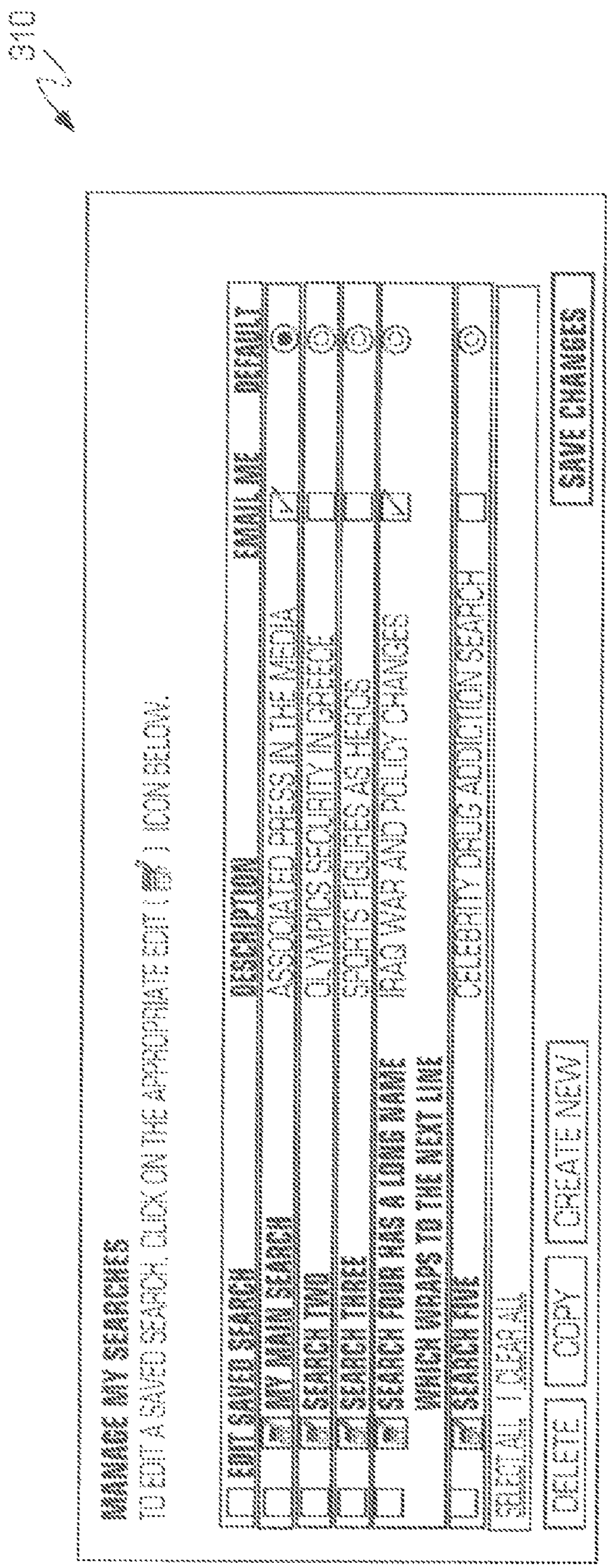
FIG. 50 illustrates more details of the profile tab shown in FIG. 2.

FIG. 50 illustrates more details of the profile tab 57*c* shown in FIG. 2. When the selects the My Profile tab in the user interface shown in FIG. 2, a profile user interface 310 shown in FIG. 50 is displayed to the user. This user interface permits the user to manage the saved searches similar to the alerts user interface 300.

Thus, an indexing system that is able to link formally expressed human knowledge with text, image and video artifacts is provided. Furthermore, a query processing system that is able to link user queries with formally expressed human knowledge is provided. The formally expressed human knowledge may include semantic networks, thesauri and ontologies. The search system in accordance with the invention interprets a query based on formally represented knowledge, indexed content and language-specific features. First, an incoming query term's language is detected, either by explicit user preferences, or by comparing the languages of indexed documents that have that search term. The knowledge base is then consulted. If a term or terms in the knowledge base at least partially matches the query term, this fact is noted. The term is then searched for over the index in its 'raw' form, meaning it is not searched for in the context of one or more knowledge base items. If the documents returned by this raw query are found to possess knowledge base items in their indexes that overlap with those found by the earlier lookup of the search term, then the interpretation of the search term is modified from its raw form to the matching knowledge base item. For a multi-term search, this process is accomplished mutually, so that the interpretations of each term are shared across the returned documents. Several acceptable interpretations of the query are possible, in which case the user is presented the information that there are more than one valid query for their original terms. Once the matching of search terms to the knowledge base is complete, the query terms are compared to the facet ontology triggers. These triggers activate one or more 'facets' which are typically represented as cells or tabs of information related to the query but not exactly matching the query.

To illustrate the above indexing system steps and query processing, two examples are provided that illustrate the series of steps. In the first example, the query is 'kerry bush'. In a first step, the language of the query is identified. In this example, the language of the query is identified as English by observing that the vast majority of documents containing the terms 'kerry' and 'bush' are written in English. Next, the knowledge base is queried and then the following knowledge base items potentially match the query terms: John F. Kerry, Kerry Wood, George W. Bush, George H. W. Bush. Next, the index is queried with the raw terms 'kerry' and 'bush'. The documents frequently returned from the raw term query include documents that contain indexed knowledge base items 'John F. Kerry' and 'George W. Bush' and do not frequently contain 'Kerry Wood' or 'George H. W. Bush'. Based on this initial query, the original query of 'kerry bush' is expanded to 'John F. Kerry' and 'George W. Bush' as these are the most likely intended queries. Next, the knowledge base has information that these two people are politicians so that the facet triggers for politicians lead to the facets: 'Poll Results', 'Biography', 'Scandals' and 'Events'.

In a second example, the query is 'kerry cubs'. Once again, the language of the query is identified. In this example, the language of the query is identified as English by observing that the vast majority of documents containing the terms 'kerry' and 'cubs' are written in English. Next, the knowledge base is queried and the following knowledge base items potentially match the query terms: John F. Kerry, Kerry Wood, Chicago Cubs. Next, the index is queried with the raw terms 'kerry' and 'cubs' and the documents returned frequently contain indexed knowledge base items 'Kerry Wood', 'John F. Kerry' and 'Chicago Cubs'. Based on these returned documents, the system alters the query to be 'Kerry Wood' and 'Chicago Cubs' so that the system refines the search query based on some formal knowledge contained in the system. In this example, the system offers an alternate query of 'John F. Kerry' and 'Chicago Cubs' as another possibility. Next, the knowledge base has the information that the main query contains an athlete and a sports team. The facet triggers for these lead to the facets: 'Statistics', 'Collectibles' and 'Tickets'.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An indexing system for linking formally expressed knowledge with a corpus of content having a plurality of pieces of content, the system comprising:

a knowledge base containing a plurality of pieces of formally expressed knowledge, the formally represented knowledge further comprising one or more synsets wherein each synset contains a group of terms that have a similar meaning, one or more taxonomies wherein each taxonomy contains one or more synsets in a subject matter area that are organized from a synset having a general meaning to a synset having a specific meaning, one or more ontologies wherein each ontology contains one or more synsets associated with an area of interest and one or more facets wherein each facet is associated with a particular ontology and wherein a document is associated with the facet when the document contains the one or more synsets associated with the facet;

a computer system having one or more software pieces each having a plurality of lines of computer instructions wherein the computer instructions are executed by the computer system, the software pieces further comprising an index engine that indexes each piece of content in a corpus to generate one or more indexes for each piece of content, the index engine further comprising an assignment engine that assigns an index to each piece of content based on the formally expressed knowledge contained in the knowledge base.

2. The system of claim 1, wherein the assignment engine further comprises a synset assignment engine that assigns a particular synset to a particular piece of content when a term in the particular piece of content matches a term in the synset.

3. The system of claim 2, wherein the assignment engine disambiguates a particular piece of content to determine an interpretation of the particular piece of content based on the one or more synsets assigned to the particular piece of content.

4. The system of claim 1, wherein the assignment engine further comprises a facet assignment engine that assigns a particular facet to a particular piece of content when a term in the piece of content is contained in the synsets of the facet.

5. The system of claim 4, wherein the assignment engine further comprises a synset assignment engine that assigns a particular synset to a particular piece of content when a term in the particular piece of content matches a term in the synset.

6. The system of claim 1, wherein the formally expressed knowledge further comprises one or more entity lists wherein each entity list contains a list of one or more entities associated with other entities contained in the entity list, and wherein the index engine further comprises an entity extraction engine that extracts an entity contained in an entity list from a particular piece of content in the corpus and associates a particular entity list to the particular piece of content.

7. The system of claim 6, wherein the assignment engine further comprises a facet assignment engine that assigns a particular facet to a particular piece of content when a term in the piece of content is contained in the synsets of the facet.

8. The system of claim 7, wherein the assignment engine further comprises a synset assignment engine that assigns a particular synset to a particular piece of content when a term in the particular piece of content matches a term in the synset.

9. The system of claim 1, wherein the index engine further comprises an authority determining engine that determines an authority score associated with each piece of content, the authority score being based on one or more factors including a reputation of the author of the piece of content and a reliability of the source of the piece of content.

10. The system of claim 9, wherein the formally expressed knowledge further comprises one or more entity lists wherein each entity list contains a list of one or more entities associated with other entities contained in the entity list, and wherein the index engine further comprises an entity extraction engine that extracts an entity contained in an entity list from a particular piece of content in the corpus and associates a particular entity list to the particular piece of content.

11. The system of claim 10, wherein the assignment engine further comprises a facet assignment engine that assigns a particular facet to a particular piece of content when a term in the piece of content is contained in the synsets of the facet.

12. The system of claim 11, wherein the assignment engine further comprises a synset assignment engine that assigns a particular synset to a particular piece of content when a term in the particular piece of content matches a term in the synset.

13. A computer implemented indexing method for linking formally represented knowledge with a corpus of content having a plurality of pieces of content text, image and video artifacts using a knowledge base containing a plurality of pieces of formally represented knowledge, the formally represented knowledge further comprising one or more synsets wherein each synset contains a group of terms that have a similar meaning, one or more taxonomies wherein each taxonomy contains one or more synsets in a subject matter area that are organized from a synset having a general meaning to a synset having a specific meaning, one or more ontologies wherein each ontology contains one or more synsets associated with an area of interest and one or more facets wherein each facet is associated with a particular ontology and wherein a document is associated with the facet when the document contains the one or more synsets associated with the facet, the method comprising:

indexing using a computer implemented index engine, each piece of content in a corpus to generate one or more indexes for each piece of content, wherein the indexing further comprises assigning an index to each piece of content based on the formally represented knowledge contained in the knowledge base.

14. The method of claim 13, wherein assigning an index further comprises assigning a particular synset to a particular piece of content when a term in the particular piece of content matches a term in the synset.

15. The method of claim 14, wherein assigning an index further comprises disambiguating a particular piece of content to determine an interpretation of the particular piece of content based on the one or more synsets assigned to the particular piece of content.

16. The method of claim 13, wherein assigning an index further comprises assigning a particular facet to a particular piece of content when a term in the piece of content is contained in the synsets of the facet.

17. The method of claim 16, wherein assigning an index further comprises assigning a particular synset to a particular piece of content when a term in the particular piece of content matches a term in the synset.

18. The method of claim 13, wherein the formally represented knowledge further comprises one or more entity lists wherein each entity list contains a list of one or more entities associated with other entities contained in the entity list, and wherein assigning the index further comprises extracting an entity contained in an entity list from a particular piece of content in the corpus and associating a particular entity list to the particular piece of content.

19. The method of claim 18, wherein assigning an index further comprises assigning a particular facet to a particular piece of content when a term in the piece of content is contained in the synsets of the facet.

20. The method of claim 19, wherein assigning an index further comprises assigning a particular synset to a particular piece of content when a term in the particular piece of content matches a term in the synset.

21. The method of claim 13, wherein the indexing further comprises determining an authority score associated with each piece of content, the authority score being based on one or more factors including a reputation of the author of the piece of content and a reliability of the source of the piece of content.

22. The method of claim 21, wherein the formally represented knowledge further comprises one or more entity lists wherein each entity list contains a list of one or more entities associated with other entities contained in the entity list, and wherein assigning the index further comprises extracting an entity contained in an entity list from a particular piece of content in the corpus and associating a particular entity list to the particular piece of content.

23. The method of claim 22, wherein assigning an index further comprises assigning a particular facet to a particular piece of content when a term in the piece of content is contained in the synsets of the facet.

24. The method of claim 23, wherein assigning an index further comprises assigning a particular synset to a particular piece of content when a term in the particular piece of content matches a term in the synset.

25. An indexing system capable of linking formally expressed knowledge to a corpus of content, the system comprising:

a corpus of content having a plurality of pieces of content;

a knowledge base containing a plurality of pieces of formally expressed knowledge, the formally represented knowledge further comprising one or more synsets wherein each synset contains a group of terms that have the same meaning, one or more taxonomies wherein each taxonomy contains one or more synsets in a subject matter area that are organized from a synset having a general meaning to a synset having a specific meaning, one or more ontologies wherein each ontology contains one or more synsets associated with an area of interest and one or more facets wherein each facet is associated with a particular ontology and wherein a document is associated with the facet when the document contains the one or more synsets associated with the facet; and an indexing engine, coupled to the knowledge base and the corpus of content, that performs a first level of indexing to generate one or more features for each piece of content in the corpus of content and performs a second level of indexing, using the one or more features for each piece of content, to classify a piece of content to a particular facet based on the one or more facets in the knowledge base and to determine an authority score associated with each piece of content, the authority score being based on one or more factors including a reputation of the author of the piece of content and a reliability of the source of the piece of content.

26. A computer implemented indexing method for linking formally represented knowledge with a corpus of content comprising a plurality of pieces of content using a knowledge base containing a plurality of pieces of formally represented knowledge, the formally represented knowledge further comprising one or more synsets wherein each synset contains a group of terms that have the same meaning, one or more taxonomies wherein each taxonomy contains one or more synsets in a subject matter area that are organized from a synset having a general meaning to a synset having a specific meaning, one or more ontologies wherein each ontology contains one or more synsets associated with an area of interest and one or more facets wherein each facet is associated with a particular ontology and wherein a document is associated with the facet when the document contains the one or more synsets associated with the facet, the method comprising:

performing, using a computer implemented indexing engine, a first level of indexing to generate one or more features for each piece of content in the corpus of content; and performing, using the indexing engine, a second level of indexing, using the one or more features for each piece of content, to classify a piece of content to a particular facet based on the one or more facets in the knowledge base and to determine an authority score associated with each piece of content, the authority score being based on one or more factors including a reputation of the author of the piece of content and a reliability of the source of the piece of content.

27. The method of claim 26, wherein performing the first level of indexing further comprises identifying one or more keywords for each piece of content in the corpus of content and identifying one of one or more synsets and one or more entities for each piece of content in the corpus of content to generate the one or more features for each piece of content in the corpus of content.

28. The method of claim 27, wherein performing the first level of indexing further comprises identifying one or more orphan words in each piece of content in the corpus of content.

* * * * *